United States Patent
Egawa

(10) Patent No.: US 12,181,605 B2
(45) Date of Patent: Dec. 31, 2024

(54) DISTANCE MEASUREMENT MODULE, DISTANCE MEASURE METHOD AND ELECTRONIC APPARATUS

(71) Applicant: Sony Semiconductor Solutions Corporation, Kanagawa (JP)

(72) Inventor: Yoshitaka Egawa, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 840 days.

(21) Appl. No.: 16/964,564

(22) PCT Filed: Jan. 16, 2019

(86) PCT No.: PCT/JP2019/000990
§ 371 (c)(1),
(2) Date: Jul. 23, 2020

(87) PCT Pub. No.: WO2019/150943
PCT Pub. Date: Aug. 8, 2019

(65) Prior Publication Data
US 2021/0041534 A1 Feb. 11, 2021

(30) Foreign Application Priority Data
Jan. 30, 2018 (JP) .................................. 2018-013516

(51) Int. Cl.
*G01S 7/481* (2006.01)
(52) U.S. Cl.
CPC .......... *G01S 7/4813* (2013.01); *G01S 7/4815* (2013.01)
(58) Field of Classification Search
CPC .... G01S 7/4813; G01S 7/4815; G01S 7/4811; G01S 7/481; G01S 7/483; G01S 7/484;
(Continued)

(56) References Cited

U.S. PATENT DOCUMENTS

| 4,851,746 A | * | 7/1989 | Milke | ..................... G01S 17/04 318/467 |
| 6,642,510 B1 | * | 11/2003 | Sugiyama | ................ G01V 8/12 250/221 |

(Continued)

FOREIGN PATENT DOCUMENTS

| CN | 106405525 A | 2/2017 |
| DE | 10 2010 038566 A1 | 2/2012 |

(Continued)

OTHER PUBLICATIONS

International Search Report and Written Opinion mailed Apr. 5, 2019 in connection with International Application No. PCT/JP2019/000990.

*Primary Examiner* — Luke D Ratcliffe
(74) *Attorney, Agent, or Firm* — Wolf, Greenfield & Sacks, P.C.

(57) ABSTRACT

An electronic apparatus for detecting distances from the electronic apparatus to external objects is provided, the apparatus comprising a substrate, a light receiving sensor of a distance measurement sensor arranged over the substrate, one or more light sources arranged over the substrate, a first lens arranged over a first one of the light sources and arranged to direct light emitted by the first light source, a second lens arranged over the light receiving sensor and configured to direct light received by the second lens onto the light receiving sensor of the distance measurement sensor, and a transparent member arranged between the second lens and the light receiving sensor and configured to transmit the light directed by the second lens onto the light receiving sensor, and reflect light from at least one of the light sources onto the light receiving sensor of the distance measurement sensor, a lens holder.

26 Claims, 40 Drawing Sheets

(58) Field of Classification Search
CPC ...... G01S 7/486; G01S 7/4814; G01S 7/4816; G01S 7/4808; G01S 17/00; G01S 17/003; G01S 17/02; G01S 17/06; G01S 17/08; G01S 17/10
See application file for complete search history.

(56) References Cited

U.S. PATENT DOCUMENTS

| | | |
|---|---|---|
| 2007/0272882 A1 | 11/2007 | Ishihara et al. |
| 2011/0204233 A1* | 8/2011 | Costello ................. G01S 17/04 |
| | | 250/338.4 |
| 2012/0013917 A1 | 1/2012 | Ohtomo et al. |
| 2016/0033644 A1* | 2/2016 | Moore .................. G01S 7/4813 |
| | | 356/5.01 |
| 2016/0327639 A1* | 11/2016 | Albert ..................... G01S 17/10 |
| 2017/0038459 A1* | 2/2017 | Kubacki ................ G01J 1/0204 |
| 2017/0090018 A1* | 3/2017 | Buettgen ............... G01S 17/894 |
| 2017/0353649 A1 | 12/2017 | Yang et al. |

FOREIGN PATENT DOCUMENTS

| | | |
|---|---|---|
| EP | 0 501 493 A2 | 9/1992 |
| EP | 3 255 456 A1 | 12/2017 |
| JP | S61-204506 A | 9/1986 |
| JP | 2008-003075 A | 1/2008 |
| JP | 2011258096 A | 12/2011 |

* cited by examiner

DISTANCE MEASUREMENT MODULE, DISTANCE MEASURE METHOD AND ELECTRONIC APPARATUS

TECHNICAL FIELD

The present technology relates to a distance measurement module, a distance measurement method, and an electronic apparatus, and more particularly, to a distance measurement module, a distance measurement method, and an electronic apparatus that perform distance measurement using Time of Flight (ToF).

CROSS-REFERENCE TO RELATED APPLICATIONS

This application claims the benefit under 35 U.S.C. § 371 as a U.S. National Stage Entry of International Application No. PCT/JP 2019/000990, filed in the Japanese Patent Office as a Receiving Office on Jan. 16, 2019, which claims priority to Japanese Patent Application Number JP 2018-013516, filed in the Japanese Patent Office on Jan. 30, 2018, each of which is hereby incorporated by reference in its entirety.

BACKGROUND ART

A distance measurement method using Time of Flight (ToF) has been proposed in which a light emitting element emits light, a first light receiving unit receives measurement light that is light reflected from an object, a second light receiving unit receives reference light transmitted through an optical path connecting the light emitting element and the second light receiving unit, and the distance to the object is measured on the basis of a difference in light reception timing between the reference light and the measurement light (for example, see PTL 1).

CITATION LIST

Patent Literature

PTL 1: Japanese Patent Application Laid-open No. 2008-3075

SUMMARY OF INVENTION

Technical Problem

However, in the technique disclosed in PTL 1, since the reference light and the measurement light are received by different light receiving units, the accuracy of distance measurement is likely to be reduced by, for example, a variation in the performance of each light receiving unit or the delay time of signals between each light receiving unit and other circuits.

The present technology has been made in view of the above-mentioned problems and it is desirable to improve the accuracy of distance measurement using ToF.

Solution to Problem

According to some aspects, an electronic apparatus for detecting distances from the electronic apparatus to external objects is provided, the apparatus comprising a substrate, a light receiving sensor arranged over the substrate, one or more light sources arranged over the substrate, a first lens arranged over a first light source of the one or more light sources and arranged to direct light emitted by the first light source, a second lens arranged over the light receiving sensor and configured to direct light received by the second lens onto the light receiving sensor, and a transparent member arranged between the second lens and the light receiving sensor and configured to transmit the light directed by the second lens onto the light receiving sensor, and reflect light from at least one of the one or more light sources onto the light receiving sensor.

According to some aspects, an electronic apparatus for detecting distances from the electronic apparatus to external objects is provided, the apparatus comprising a substrate, a light receiving sensor arranged over the substrate, one or more light sources arranged over the substrate, the one or more light sources including a first light source and a second light source, a first lens holder, the first lens holder being opaque and comprising a first lens, the first lens holder arranged over the first light source, and the first lens arranged to direct light emitted by the first light source, a second lens holder, the second lens holder being opaque and comprising a second lens, the second lens holder arranged over the light receiving sensor and the second light source, and the second lens configured to direct light received by the second lens onto the light receiving sensor, and a transparent member arranged between the second lens and the light receiving sensor and configured to transmit the light directed by the second lens onto the light receiving sensor, and reflect light from at the second light source onto the light receiving sensor, wherein at least part of the first lens holder and at least part of the second lens holder are arranged between the first lens and the second lens.

According to the first to fourth embodiments of the present technology, it is possible to improve the accuracy of distance measurement using ToF.

DESCRIPTION OF EMBODIMENTS

Hereinafter, embodiments of the present technology will be described in detail with reference to the drawings. Note that the description will be made in the following order.

1. First Embodiment (Case in Which Light Source for Reference Light and Light Source for Measurement Light Are Used in Common)
2. Modification Example of First Embodiment
3. Second Embodiment (Case in Which Light Source for Reference Light and Light Source for Measurement Light Are Separated)
4. Modification Example of Second Embodiment
5. Third embodiment (Case in Which Emitted light Components for Measurement with Different Emission Angles Are Used)
6. Fourth Embodiment (Case 1 in Which Emitted light Components for Measurement with Different Emission Distances Are Used)
7. Fifth Embodiment (Case 2 in Which Emitted light Components for Measurement with Different Emission Distances Are Used)
8. Sixth Embodiment (Case in Which Emitted light Components for Measurement with Different Emission Angles and Different Emission Distances Are Used)
9. Seventh Embodiment (Case in Which Number of Light Sources Is Increased or Reduced According to Measurement Range)
10. Other Modification Example 1. First Embodiment First, a first embodiment of the present technology will be described with reference to FIGS. 1 to 15.

<Example of Configuration of Electronic Apparatus 11>

Figure 1:
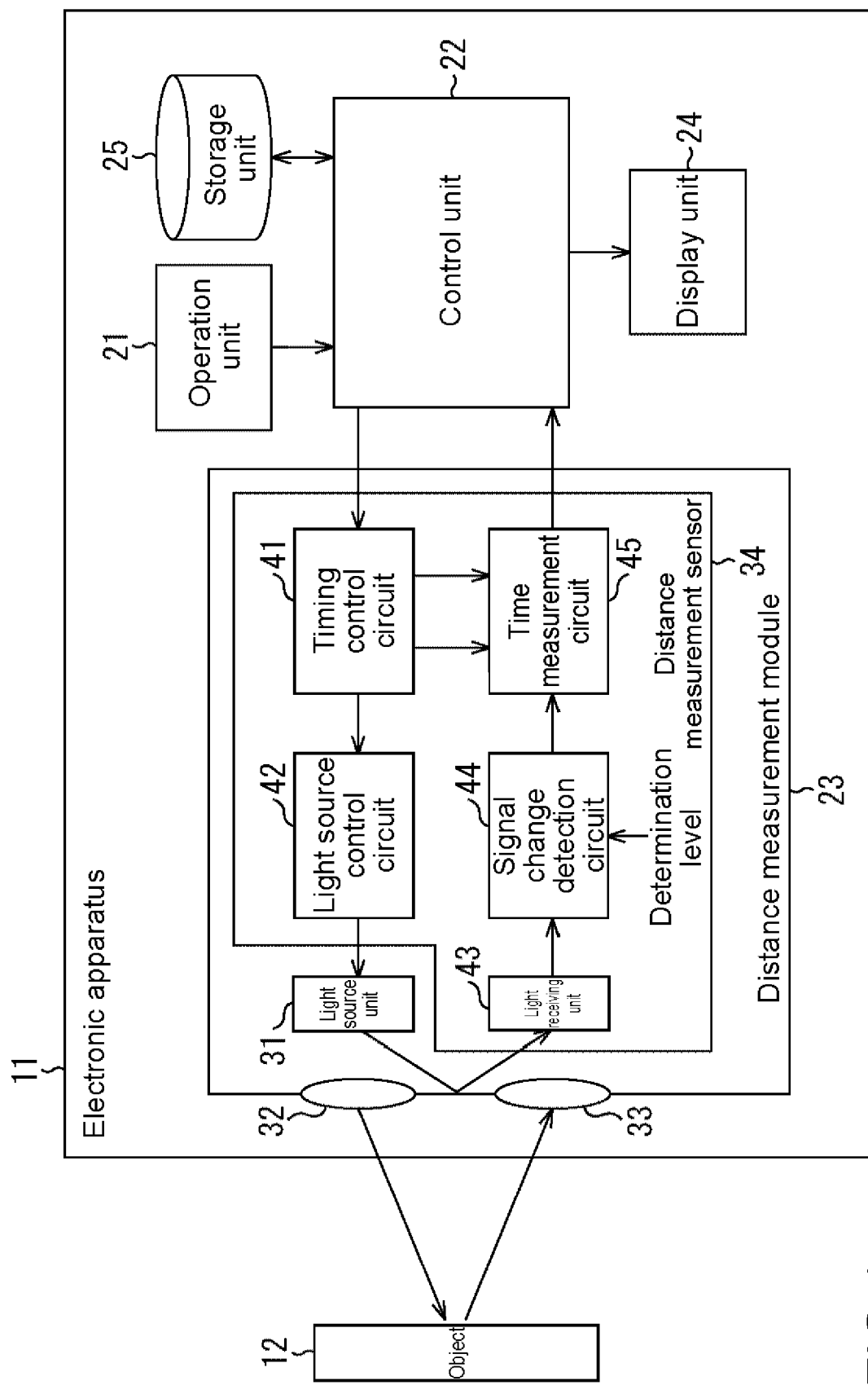
FIG. 1 is a block diagram illustrating an example of the configuration of an electronic apparatus according to a first embodiment of the present technology.

FIG. 1 illustrates an example of the configuration of an electronic apparatus 11 according to the first embodiment of the present technology.

The electronic apparatus 11 has a distance measurement function of measuring a distance to an object 12 which is a measurement target using a ToF method. For example, the electronic apparatus 11 may have only the distance measurement function or may have other functions. In the latter case, the electronic apparatus 11 is a portable electronic apparatus such as a smart phone, a mobile phone, or a digital camera.

The electronic apparatus 11 includes an operation unit 21, a control unit 22, a distance measurement module 23, a display unit 24, and a storage unit 25.

The operation unit 21 includes various operation devices, such as a switch, a button, a keyboard, and a touch panel, for operating the electronic apparatus 11. The operation unit 21 supplies an operation signal indicating the content of an operation to the control unit 22.

The control unit 22 includes a processor such as a central processing unit (CPU). For example, the control unit 22 controls each unit of the electronic apparatus 11, or executes a program stored in the storage unit 25 to perform a predetermined process, on the basis of the operation signal from the operation unit 21. For example, the control unit 22 performs a process based on the measurement result of the distance measurement module 23.

The distance measurement module 23 is a module that measures the distance to the object 12. The distance measurement module 23 includes a light source unit 31, a light source lens 32, an imaging lens 33, and a distance measurement sensor 34.

The light source unit 31 emits light which is pulsed light under the control of a light source control circuit 42 of the distance measurement sensor 34. Part of the emitted light is reflected in the distance measurement module 23 and is incident on a light receiving unit 43 of the distance measurement sensor 34. In addition, part of the emitted light is transmitted through the light source lens 32, is emitted to the object 12, is reflected from the object 12, is transmitted through the imaging lens 33, and is incident on the light receiving unit 43.

Note that light with an arbitrary wavelength, such as visible light or infrared light, is used as the emitted light. For example, the wavelength of the emitted light is arbitrarily selected according to the purpose of the distance measurement module 23.

Hereinafter, the light reflected in the distance measurement module 23 is referred to as reference light and the light reflected from the object 12 is referred to as measurement light.

The light source lens 32 is a lens for the light source unit 31 and is used, for example, to focus or shape the light emitted from the light source unit 31.

The imaging lens 33 is a lens for the light receiving unit 43 and forms an image of the measurement light from the object 12 on a light receiving surface of the light receiving unit 43.

The distance measurement sensor 34 is a sensor that measures the distance to the object 12. The distance measurement sensor 34 includes a timing control circuit 41, the light source control circuit 42, the light receiving unit 43, a signal change detection circuit 44, and a time measurement circuit 45.

The timing control circuit 41 controls the distance measurement timing of the distance measurement module 23 under the control of the control unit 22. For example, the timing control circuit 41 supplies an emission control signal for controlling the emission timing of light from the light source unit 31 to the light source control circuit 42. In addition, for example, the timing control circuit 41 supplies a clock signal, a start signal for starting the measurement of the distance measurement time, and a stop signal for stopping the measurement of the distance measurement time to the time measurement circuit 45.

The light source control circuit 42 controls, for example, the emission timing of light from the light source unit 31 and the amount of light emitted.

The light receiving unit 43 includes a plurality of pixels that are two-dimensionally arranged, which will be described below. Each pixel of the light receiving unit 43 receives, for example, the reference light and the measurement light and supplies a pixel signal corresponding to the amount of light received to the signal change detection circuit 44.

The signal change detection circuit 44 detects the timing (change timing) when the pixel signal is largely changed by the reception of the reference light or the measurement light on the basis of a determination level supplied from the outside and supplies a signal indicating the detection result to the time measurement circuit 45.

The time measurement circuit 45 detects a distance measurement time which is a difference time between the reference light detection time (light reception time) of each pixel of the light receiving unit 43 and the measurement light detection time (light reception time) of each pixel on the basis of the pixel signal change timing detected by the signal change detection circuit 44. The time measurement circuit 45 supplies a signal indicating the detection result of the distance measurement time of each pixel to the control unit 22.

The display unit 24 includes a display device such as a display. The display unit 24 displays, for example, the measurement result of the distance from the object 12 to each unit or an operation screen for distance measurement.

The storage unit 25 stores, for example, data or programs necessary for the processes of the control unit 22 and data obtained by the processes of the control unit 22. For example, the storage unit 25 stores three-dimensional distance data indicating the measurement result of the distance from the object 12 to each unit.

<Example of Configuration of Distance Measurement Module 23>

Figure 2:
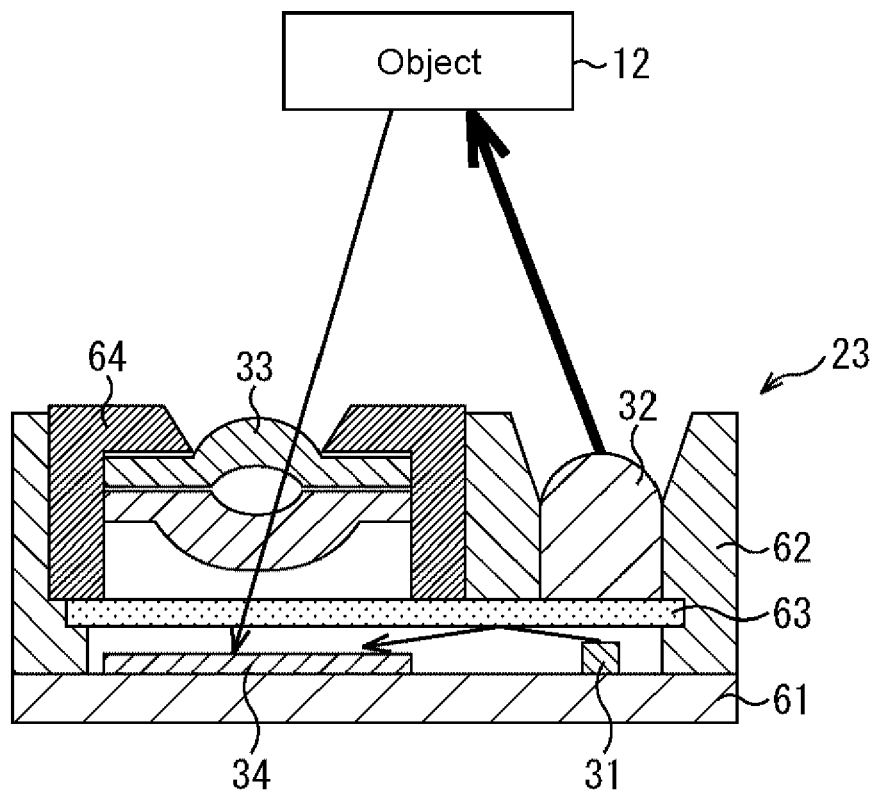
FIG. 2 is a cross-sectional view schematically illustrating an example of the configuration of a distance measurement module illustrated in FIG. 1.

FIG. 2 is a cross-sectional view schematically illustrating an example of the configuration of the distance measurement module 23 illustrated in FIG. 1.

The distance measurement module 23 includes a substrate 61, a lens holder 62, a cover glass 63, and a lens barrel 64 in addition to the light source unit 31, the light source lens 32, the imaging lens 33, and the distance measurement sensor 34 illustrated in FIG. 1.

For example, a printed wiring board (PWB) or a printed circuit board (PCB) on which components including capacitors are mounted is used as the substrate 61. The light source unit 31, the distance measurement sensor 34, and the lens holder 62 are mounted on a mounting surface of the substrate 61. The light source unit 31 and the distance measurement sensor 34 are provided with a predetermined gap therebetween. In addition, the light source unit 31 is provided substantially at the center of a circular opening portion of the lens holder 62 for mounting the light source lens 32. According to some embodiments, the lens holder 62 (and any other examples of a lens holder described herein) may be formed from, or may comprise, one or more plastics, and may be non-transparent or opaque.

The cover glass 63 which is a transparent plate is attached to (supported by) the lens holder 62. The cover glass 63 (and any other examples of a cover glass described herein) may for instance be formed from, or may comprise, borosilicate glass, quartz glass, crystal, sapphire, CZ (Czochralski) silicon, germanium, alumino silicate glass, or combinations thereof. The cover glass 63 faces the mounting surface of the substrate 61 and is provided in parallel to the mounting surface of the substrate 61. In addition, the cover glass 63 is provided above the light source unit 31 and the distance measurement sensor 34 (on the side where light is emitted from the light source unit 31) with a gap therebetween and covers all of the light source unit 31 and (the light receiving unit 43 of) the distance measurement sensor 34.

A space including the light source unit 31 and the distance measurement sensor 34 between the mounting surface of the substrate 61 and a reflecting surface of the cover glass 63 which faces the mounting surface of the substrate 61 is sealed by, for example, the lens holder 62 and a resin. Therefore, for example, dust or dirt is prevented from getting into the space in which the light source unit 31 and the distance measurement sensor 34 are present. In addition, for example, the space is filled with air or nitrogen if necessary. For example, in a case in which the space is filled with nitrogen and the distance measurement module 23 operates at a low temperature, the occurrence of dew condensation is prevented. For example, in a case in which the light source unit 31 emits infrared light, the space is vacuous.

In addition, anti-reflection films (AR coat) are formed on an incident surface of the cover glass 63 on which the measurement light is incident and the reflecting surface opposite to the incident surface by vapor deposition. For example, a film obtained by forming thin film layers made of a material, such as magnesium fluoride, silicon, or silicon dioxide, using multilayer coating is used as the anti-reflection film. Therefore, it is possible to reduce the reflectance of the cover glass 63 with respect to visible light from, for example, 4% to 7% to 1% or less and the occurrence of black floating (flare) and a double image (ghost) in the light receiving unit 43 is prevented. Further, the reflectance of the cover glass 63 is set to, for example, 0.5% or more such that the amount of reference light is sufficient.

The light source lens 32 is attached to (supported by) the lens holder 62 and is provided above the light source unit 31 on the incident surface of the cover glass 63. The optical axis of the light source unit 31 is aligned with the optical axis of the light source lens 32.

The lens barrel 64 is attached to (supported by) the lens holder 62 and is provided above the distance measurement sensor 34 on the incident surface of the cover glass 63. In addition, the imaging lens 33 is attached to (supported by) the lens barrel 64 and is provided above the distance measurement sensor 34.

Part of the light emitted from the light source unit 31 is reflected from the cover glass 63 and part of the reference light which is the reflected light is incident on the light receiving unit 43 of the distance measurement sensor 34. In contrast, part of the emitted light is transmitted through the cover glass 63 and the light source lens 32 and the object 12 is irradiated with the light. Then, part of the measurement light which is light reflected from the object 12 is focused on the light receiving surface of the light receiving unit 43 of the distance measurement sensor 34 by the imaging lens 33.

<Example of Configuration of Light Source Unit 31>

Figure 3:
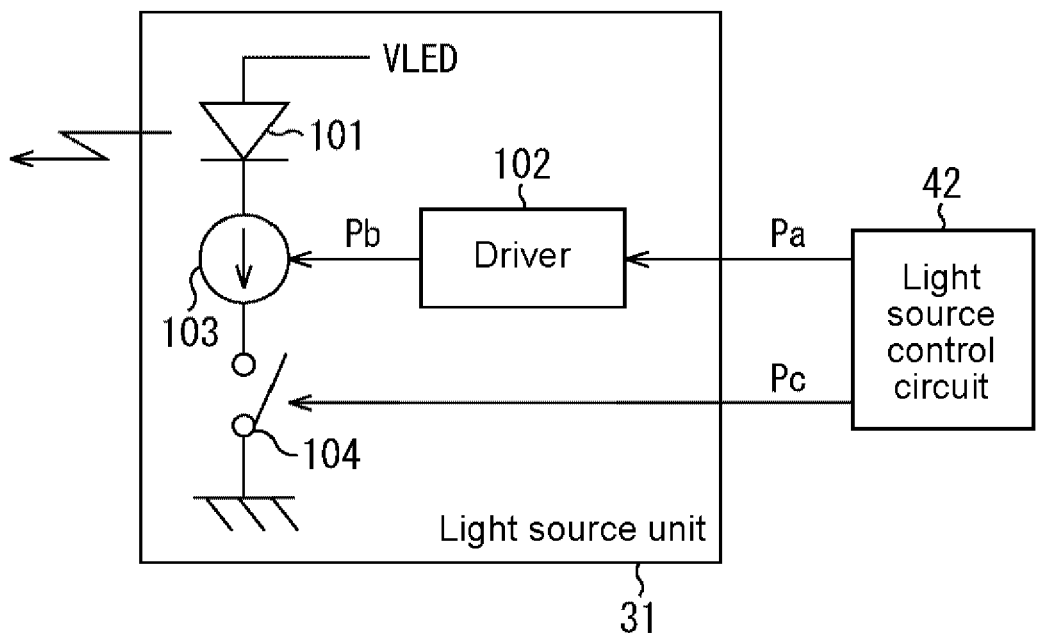
FIG. 3 is a circuit diagram illustrating an example of the configuration of a light source unit illustrated in FIG. 1.

FIG. 3 illustrates an example of the configuration of the light source unit 31 illustrated in FIG. 1.

The light source unit 31 includes a light emitting element 101, a driver 102, a current source 103, and a switch 104.

The light emitting element 101 is a light emission diode (LED) or a laser diode (LD). The light emitting element 101 has an anode to which a voltage VLED is supplied and a cathode connected to one end of the current source 103. The other end of the current source 103 is grounded through the switch 104.

The driver 102 supplies a control signal Pb to the current source 103 on the basis of a control signal Pa from the light source control circuit 42 to drive the current source 103.

The current source 103 is, for example, a metal oxide semiconductor (MOS) transistor and supplies a current with a predetermined value.

The switch 104 is, for example, a MOS transistor and is turned on and off on the basis of a control signal Pc from the light source control circuit 42.

<Example of Configuration of Distance Measurement Sensor 34>

Figure 4:
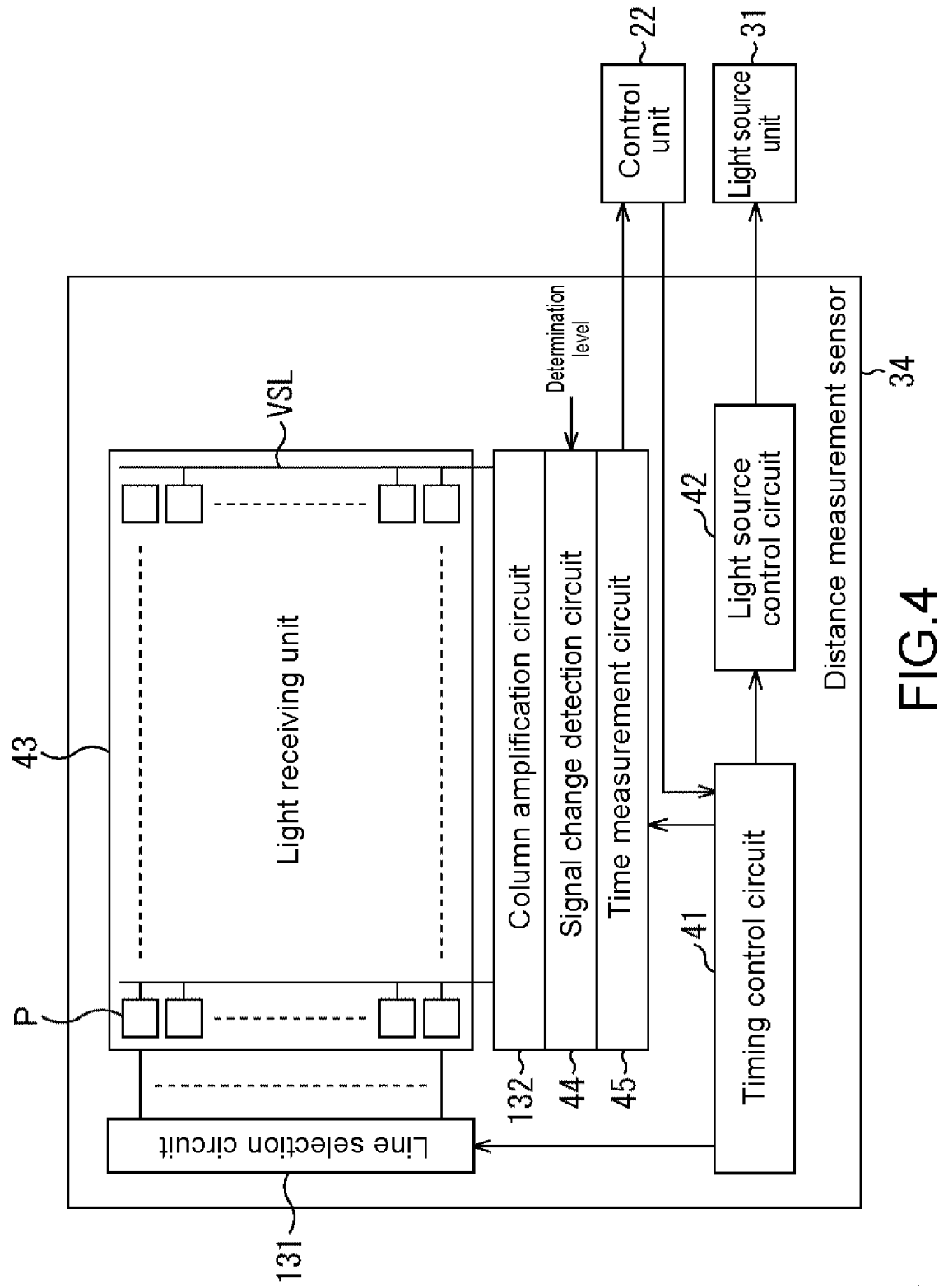
FIG. 4 is a block diagram illustrating an example of the configuration of a distance measurement sensor illustrated in FIG. 1.

FIG. 4 illustrates an example of the configuration of the distance measurement sensor 34 illustrated in FIG. 1.

The distance measurement sensor 34 includes a line selection circuit 131 and a column amplification circuit 132 in addition to the timing control circuit 41 to the time measurement circuit 45 illustrated in FIG. 1.

The timing control circuit 41 generates a clock signal, supplies the clock signal to the line selection circuit 131, generates an emission control signal, supplies the emission control signal to the light source control circuit 42, generates a start signal and a stop signal, and supplies the start signal and the stop signal to the time measurement circuit 45 under the control of the control unit 22.

The light source control circuit 42 generates the control signal Pa and the control signal Pc on the basis of the emission control signal and supplies the control signal Pa and the control signal Pc to the light source unit 31.

In the light receiving unit 43, pixels P are two-dimensionally arranged. Each pixel P independently receives the reference light and the measurement light.

The line selection circuit 131 generates a control signal for each pixel P of the light receiving unit 43 on the basis of the clock signal from the timing control circuit 41 and supplies the control signal to drive all of the pixels P at the same time or to drive, for example, each row of the pixels P.

A pixel signal that is output from each pixel P in the pixel row selected by the control signal supplied from the line selection circuit 131 is supplied to the column amplification circuit 132 through a vertical signal line VSL corresponding to each pixel column.

The column amplification circuit 132 amplifies the pixel signal of each pixel column and supplies the amplified pixel signal to the signal change detection circuit 44.

The signal change detection circuit 44 detects the timing when the pixel signal is largely changed by the reception of the reference light or the measurement light on the basis of the determination level supplied from the outside and supplies a change detection signal to the time measurement circuit 45.

The time measurement circuit 45 detects a distance measurement time which is a difference time between the reference light detection time of each pixel P of the light receiving unit 43 and the measurement light detection time of each pixel P on the basis of the change detection signal from the signal change detection circuit 44. The time measurement circuit 45 supplies a signal indicating the detection result of the distance measurement time of each pixel to the control unit 22.

<Example of Configuration of Pixel P>

Figure 5:
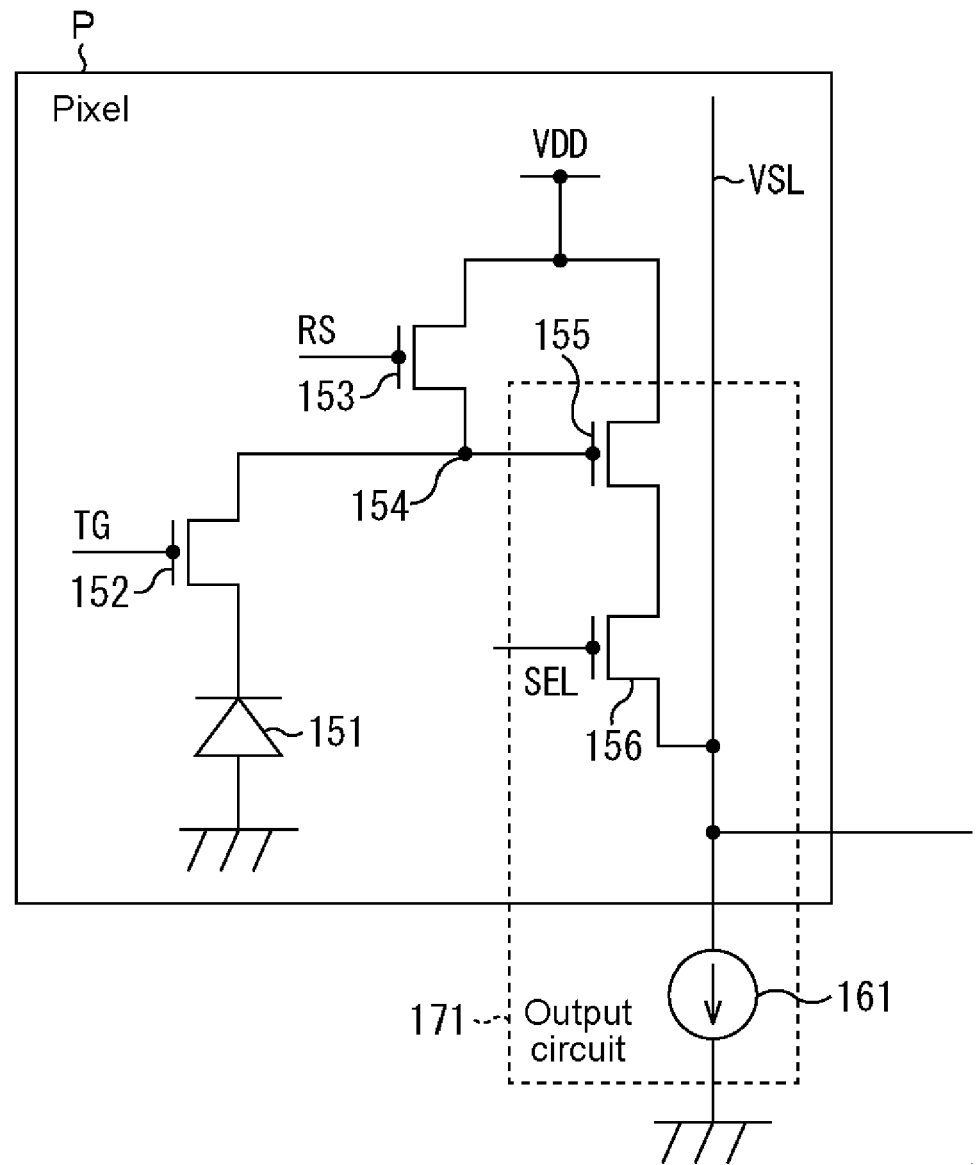
FIG. 5 is a circuit diagram illustrating an example of the configuration of a pixel illustrated in FIG. 4.

FIG. 5 illustrates an example of the configuration of the pixel P of the light receiving unit 43 illustrated in FIG. 4.

The pixel P includes a photoelectric conversion element 151 which is a light receiving element, a read transistor 152, a reset transistor 153, a floating diffusion (FD) unit 154, an amplification transistor 155, and a selection transistor 156. That is, the pixel P is a 4-transistor pixel. Note that each transistor of the pixel P is an N-type MOS transistor in this example.

In addition, for example, a plurality of signal lines are provided for each row of the pixels P. Then, a control signal TG, a control signal RS, and a control signal SEL are supplied from the line selection circuit 131 illustrated in FIG. 4 to each pixel P through the plurality of signal lines. Since each transistor of the pixel P is an N-type MOS transistor, the high-level (for example, a power supply voltage VDD) state of these control signals is an active state and the low-level state (for example, a ground level) thereof is an inactive state.

Note that the control signal in the active state is hereinafter referred to also as a control signal in an on state and the control signal in the inactive state is hereinafter referred to also as a control signal in an off state.

The photoelectric conversion element 151 is, for example, a PN junction photodiode. The photoelectric conversion element 151 generates charge corresponding to the amount of light received and accumulates the charge.

The read transistor 152 is connected between the photoelectric conversion element 151 and the FD unit 154. The control signal TG is applied to a gate electrode of the read transistor 152. When the control signal TG is turned on, the read transistor 152 changes to a conduction state and the charge accumulated in the photoelectric conversion element 151 is transmitted to the FD unit 154 through the read transistor 152.

The reset transistor 153 is connected between a power supply VDD and the FD unit 154. The control signal RS is applied to a gate electrode of the reset transistor 153. When the control signal RS is turned on, the reset transistor 153 changes to a conduction state and the potential of the FD unit 154 is reset to the level of the power supply voltage VDD.

The FD unit 154 converts the accumulated charge into a voltage signal (charge-voltage conversion) and outputs the voltage signal.

The amplification transistor 155 has a gate electrode connected to the FD unit 154 and a drain electrode connected to the power supply VDD and is an input unit of a read circuit for reading the charge held in the FD unit 154, or a so-called source follower circuit. That is, the amplification transistor 155 has a source electrode connected to the vertical signal line VSL through the selection transistor 156 and thus forms an output circuit 171 being the source follower circuit that includes a current source 161 having one end connected to the vertical signal line VSL.

The selection transistor 156 is connected between the source electrode of the amplification transistor 155 and the vertical signal line VSL. The control signal SEL is applied to a gate electrode of the selection transistor 156. When the control signal SEL is turned on, the selection transistor 156 changes to a conduction state and the pixel P is in a selected state. Then, the pixel signal output from the amplification transistor 155 is output to the vertical signal line VSL through the selection transistor 156.

Note that an avalanche-amplification-type photodiode may be used as the photoelectric conversion element 151. In a case in which an avalanche-amplification-type photodiode may be used as the photoelectric conversion element 151, for example, the read transistor 152 can be removed.

In addition, changing each transistor to the conduction state is hereinafter referred to also as turning on the transistor and changing each transistor to a non-conduction state is hereinafter referred to also as turning off the transistor.

<Example of Configuration of Signal Change Detection Circuit 44>

Figure 6:
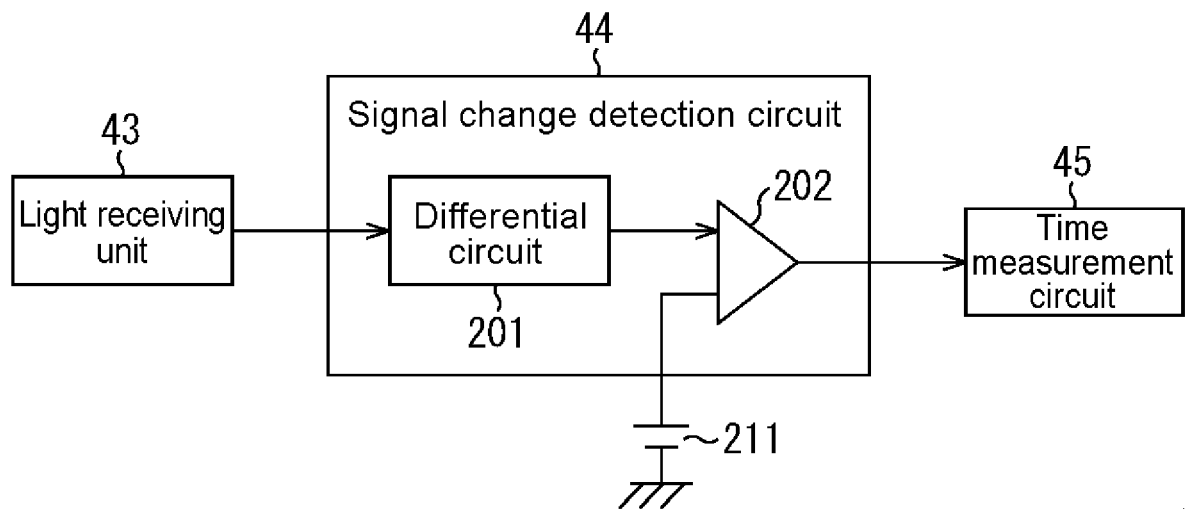
FIG. 6 is a block diagram illustrating an example of the configuration of a signal change detection circuit illustrated in FIG. 1.

FIG. 6 illustrates an example of the configuration of a circuit corresponding to one pixel column of the light receiving unit 43 in the signal change detection circuit 44 illustrated in FIG. 4.

The signal change detection circuit 44 includes a differential circuit 201 and a comparator 202.

The differential circuit 201 differentiates the pixel signal from each pixel P and supplies the obtained differential signal to the comparator 202.

The comparator 202 compares the differential signal with the determination level defined by the power supply 211 to detect the timing (change timing) when the pixel signal is changed largely. The comparator 202 supplies a change detection signal indicating the detection result of the change timing of the pixel signal to the time measurement circuit 45.

<Example of Configuration of Differential Circuit 201>

Figure 7:
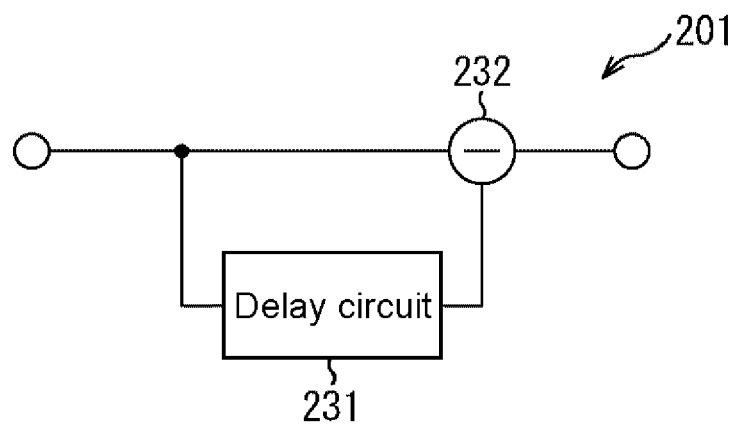
FIG. 7 is a block diagram illustrating an example of the configuration of a differential circuit illustrated in FIG. 6.

FIG. 7 illustrates an example of the configuration of the differential circuit 201 illustrated in FIG. 6.

The differential circuit 201 includes a delay circuit 231 and a subtraction circuit 232.

The delay circuit 231 delays the pixel signal supplied from the pixel P by a predetermined period of time to generate a delay signal and supplies the delay signal to the subtraction circuit 232.

The subtraction circuit 232 calculates the difference between the pixel signal and the delay signal to generate a differential signal indicating the amount of change in the pixel signal and supplies the differential signal to the comparator 202.

<Example of Configuration of Time Measurement Circuit 45>

Figure 8:
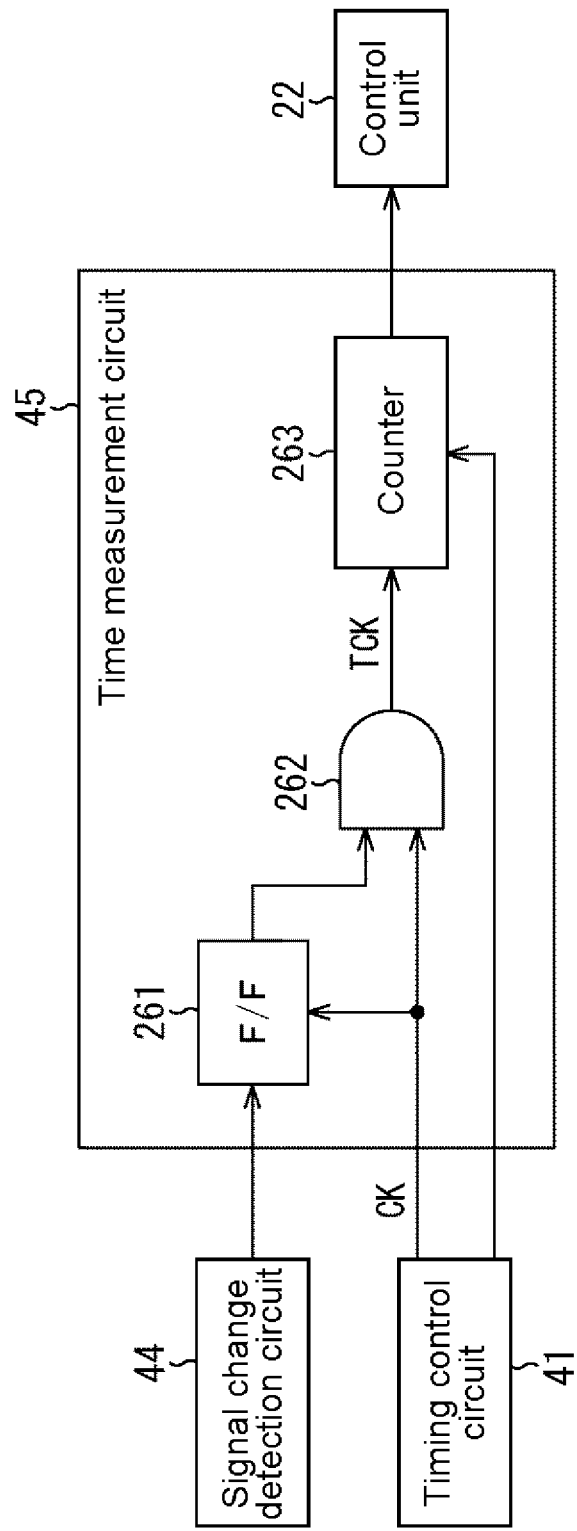
FIG. 8 is a block diagram illustrating an example of the configuration of a time measurement circuit illustrated in FIG. 1.

FIG. 8 illustrates an example of the configuration of a circuit corresponding to one pixel column of the light receiving unit 43 in the time measurement circuit 45 illustrated in FIG. 4.

The time measurement circuit 45 includes a flip-flop circuit 261, an AND circuit 262, and a counter 263.

The flip-flop circuit 261 changes the level of an output signal in synchronization with the clock signal CK supplied from the timing control circuit 41 whenever the change detection signal is input from the signal change detection circuit 44. That is, when the output signal of the flip-flop circuit 261 is at a Low level and the change detection signal is input, the output signal is changed to a Hi level. When the output signal is at a Hi level and the change detection signal is input, the output signal is changed to the Low level.

The AND circuit 262 outputs an output signal TCK indicating the logical junction of the output signal of the flip-flop circuit 261 and the clock signal CK of the timing control circuit 41. That is, when the output signal of the flip-flop circuit 261 is at the Hi level, the AND circuit 262 outputs the output signal TCK synchronized with the clock signal CK.

The counter 263 counts the number of clocks in the output signal TCK of the AND circuit 262 for the period from the input of the start signal to the input of the stop signal from the timing control circuit 41 and supplies a count signal Dcount indicating a count value to the control unit 22.

<Operation of Distance Measurement Module 23>

Next, the operation of the distance measurement module 23 will be described with reference to FIGS. 9 to 14.

Figure 9:
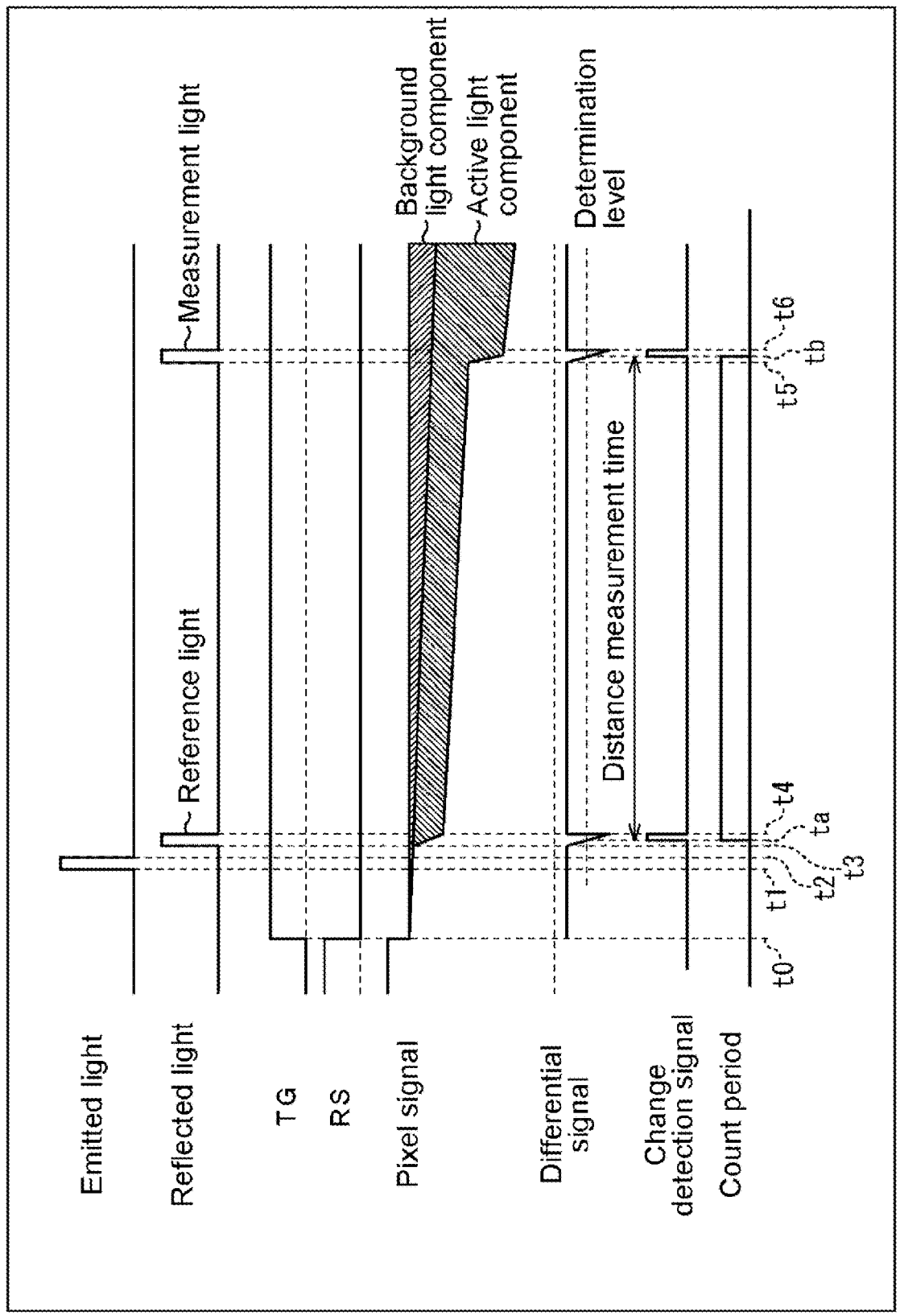
FIG. 9 is a timing chart for describing the operation of the distance measurement module illustrated in FIG. 1.

FIG. 9 is a timing chart illustrating the operation of the distance measurement module 23. Specifically, FIG. 9 is a timing chart illustrating the light emitted from the light source unit 31, the reflected light (the reference light and the measurement light) received by the pixel P, the control signals TG and RS output from the line selection circuit 131, the pixel signal output from the pixel P, the differential signal output from the differential circuit 201, the change detection signal output from the signal change detection circuit 44, and the count period of the counter 263.

At a time t0, the line selection circuit 131 of the light receiving unit 43 turns on the control signal TG and turns off the control signal RS. Then, the read transistor 152 in each pixel P of the light receiving unit 43 is turned on, the reset transistor 153 is turned off, and the light receiving period of each pixel P starts. Then, the charge generated by the photoelectric conversion element 151 is transmitted to the FD unit 154 through the read transistor 152 and is accumulated in the FD unit 154.

For a period from a time t1 to a time t2, the light source unit 31 emits light under the control of the light source control circuit 42.

Here, an example of the operation of the light source unit 31 and the light source control circuit 42 will be described with reference to FIG. 10.

Figure 10:
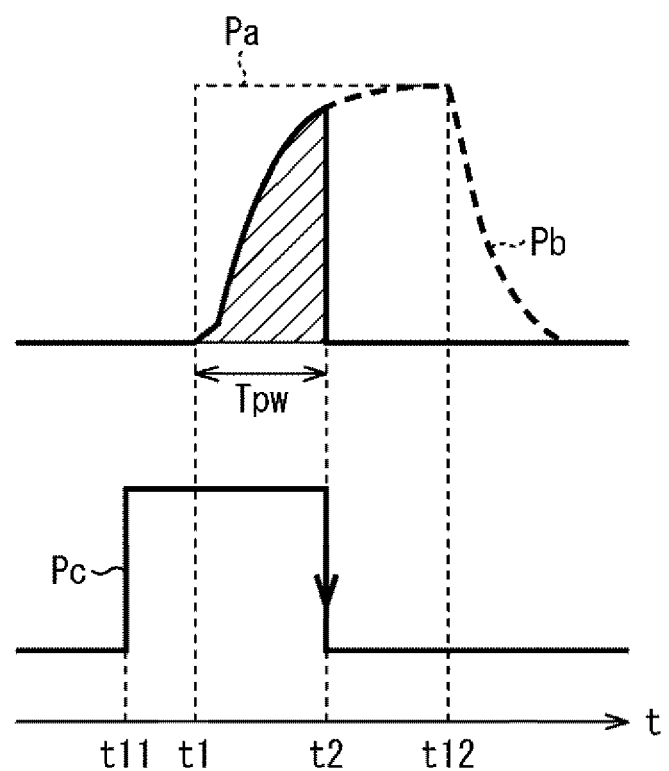
FIG. 10 is a timing chart for describing the operation of the light source unit and a light source control circuit.

FIG. 10 is a timing chart illustrating an example of the operation of the light source unit 31 and the light source control circuit 42 in the vicinity of the period from the time t1 to the time t2 illustrated in FIG. 9.

At a time t1 before the time t1, the light source control circuit 42 changes the control signal Pc from a Low level to a Hi level. Then, the switch 104 of the light source unit 31 is changed from an off state to an on state.

At the time t1, the light source control circuit 42 changes the control signal Pa from a Low level to a Hi level. The driver 102 outputs the control signal Pb on the basis of the control signal Pa. The control signal Pb rises later than the control signal Pa according to, for example, the responsiveness of the driver 102 and the current source 103 or the load capacity of the light emitting element 101. The current source 103 supplies a current in response to the control signal Pb. Then, the light emitting element 101 starts light emission (the emission of light).

Part of the light emitted from the light emitting element 101 is reflected from the cover glass 63. Part of the emitted light is transmitted through the light source lens 32 and the object 12 is irradiated with the light.

At the time t2, the light source control circuit 42 changes the control signal Pc from a Hi level to a Low level. Then, the switch 104 is changed from the on state to the off state at a high speed (is cut off at a high speed). Then, the light emitting element 101 stops light emission (the emission of light).

In this way, the pulse width of the light emitted from the light source unit 31 is controlled to Tpw. In addition, the amount of light at the rear end of the emitted light changes rapidly. Therefore, for example, the distance to the object 12 is measured using the rear end of the reference light reflected from the cover glass 63 and the rear end of the measurement light reflected from the object 12. As a result, it is possible to improve the accuracy of distance measurement.

At a time t12, the light source control circuit 42 changes the control signal Pa from the Hi level to the Low level. The driver 102 stops the output of the control signal Pb on the basis of the control signal Pa. The control signal Pb falls later than the control signal Pa according to, for example, the responsiveness of the driver 102 and the current source 103 or the load capacity of the light emitting element 101.

Returning to FIG. 9, for a period from a time t3 to a time t4, the pixel P of the light receiving unit 43 receives the reference light which is reflected light obtained by the reflection of the emitted light from the cover glass 63.

Then, for a period from a time t5 to a time t6, the pixel P of the light receiving unit 43 receives the measurement light which is reflected light obtained by the reflection of the emitted light from the object 12.

Figure 11:
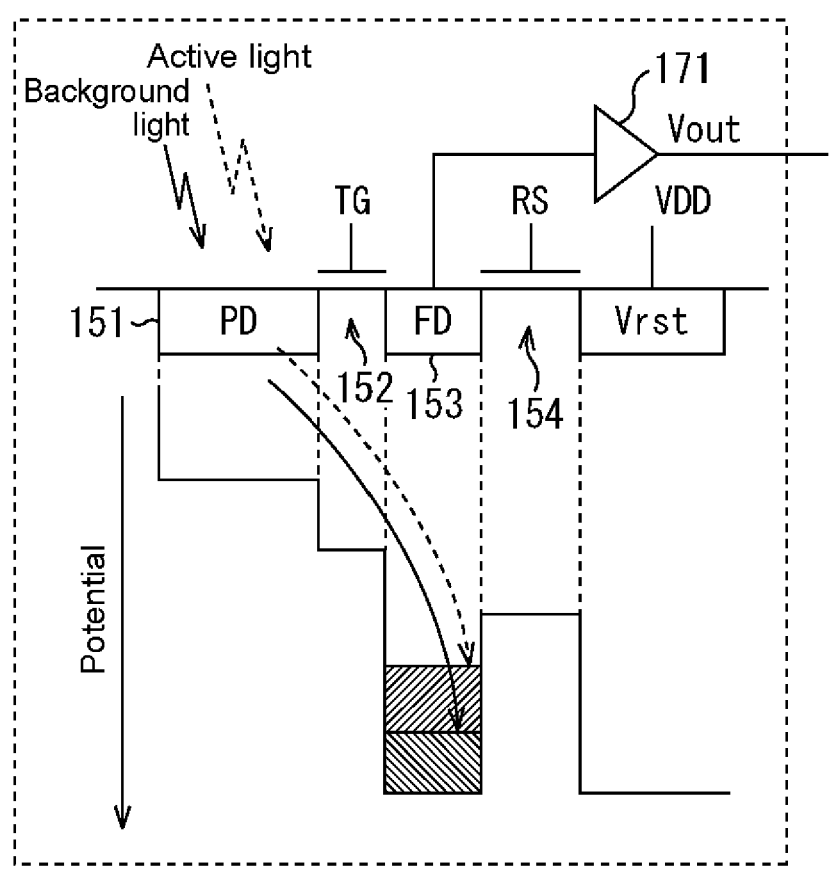
FIG. 11 is a diagram schematically illustrating the potential state of an FD unit in the pixel.

FIG. 11 schematically illustrates the potential state of the FD unit 154 of the pixel P at that time.

Since background light is incident on the photoelectric conversion element 151 in addition to the active light (the reference light or the measurement light), the photoelectric conversion element 151 generates charge with the active light and the background light. The charge generated by the photoelectric conversion element 151 is transmitted to the FD unit 154 and is then accumulated in the FD unit 154 since the read transistor 152 is turned on and the reset transistor 153 is turned off at the time t0.

Therefore, after the time t0, the charge generated by the background light and the active light in the photoelectric conversion element 151 is continuously transmitted to the FD unit 154. The FD unit 154 continuously accumulates the charge without being reset regardless of the sampling timing of the pixel signal. An output circuit 171 outputs a pixel signal indicating a voltage based on the charge accumulated in the FD unit 154. That is, the pixel P performs a charge integration operation and the pixel signal becomes an integral signal.

Here, the amount of background light is substantially constant. As illustrated in FIG. 9, a background light component of the pixel signal increases gently in a substantially linear shape after the read transistor 152 is turned on and the reset transistor 153 is turned off at the time t0.

In contrast, an active light component of the pixel signal increases largely for the period from the time t3 when the reference light is received to the time t4 and the period from the time t5 when the measurement light is received to the time t6.

Therefore, the differential signal output from the differential circuit 201 of the signal change detection circuit 44 changes largely for the period from the time t3 to the time t4 and the period from the time t5 to the time t6 and is substantially constant for the other periods.

When the differential signal is lower than the determination level at a time ta between the time t3 and the time t4, the signal change detection circuit 44 starts the output of the change detection signal. Then, when the reception of the reference light ends and the differential signal is equal to or higher than the determination level at the time t4, the signal change detection circuit 44 stops the output of the change detection signal. That is, in this example, the rising of the reference light is detected.

Further, when the differential signal is lower than the determination level at a time tb between the time t5 and the time t6, the signal change detection circuit 44 starts the output of the change detection signal. Then, when the reception of the measurement light ends and the differential signal is equal to or higher than the determination level at the time t6, the signal change detection circuit 44 stops the output of the change detection signal. That is, in this example, the rising of the measurement light is detected.

Note that, for example, the signal change detection circuit 44 may output a pulsed change detection signal when the differential signal is equal to or higher than the determination level at the time t4 and the time t6. In this case, the falling of the reference light and the measurement light is detected.

Here, the operation of the time measurement circuit 45 illustrated in FIG. 8 in the vicinity of the period from the time ta to the time t6 illustrated in FIG. 9 will be described in detail with reference to FIG. 12.

Figure 12:
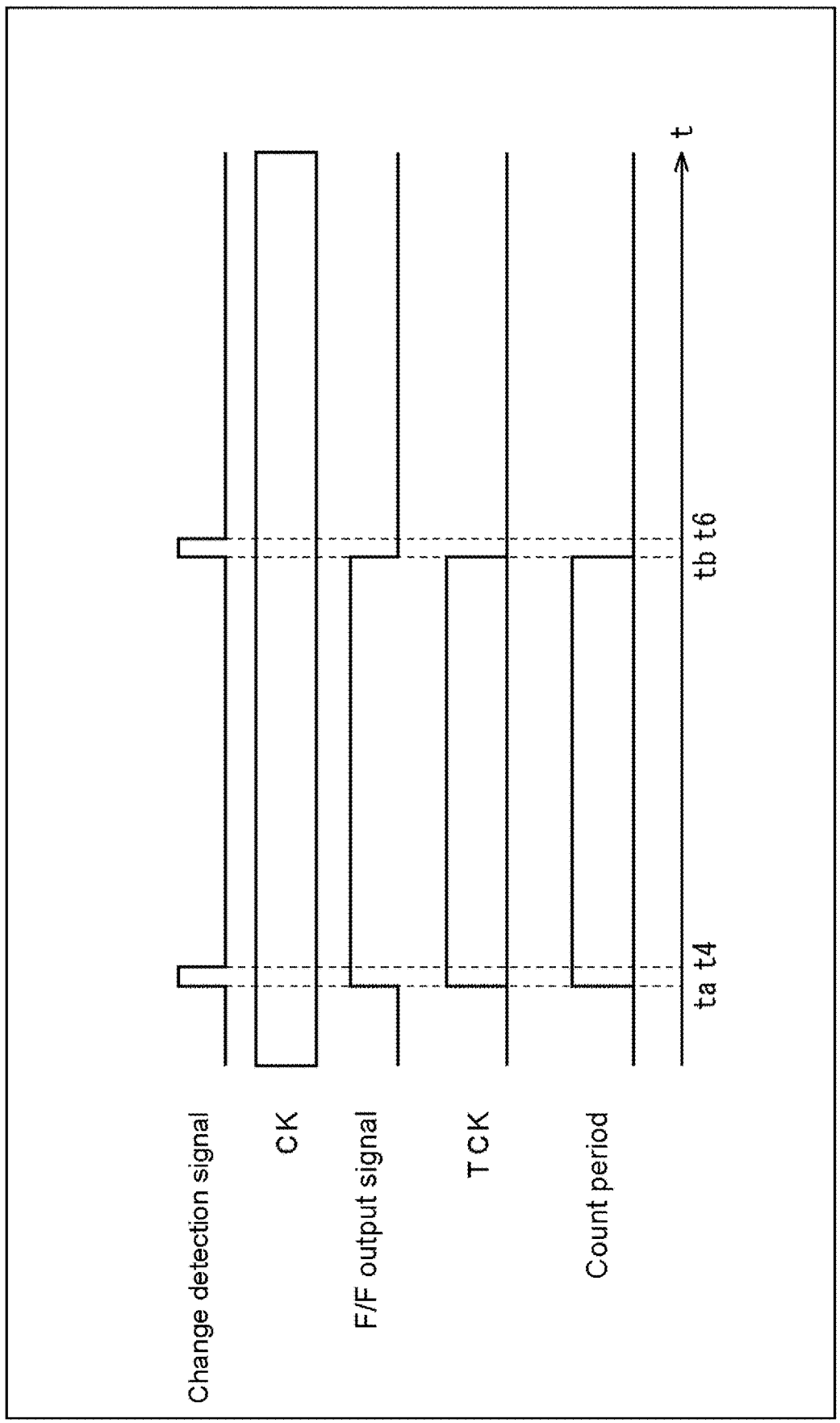
FIG. 12 is a timing chart for describing the operation of the time measurement circuit.

FIG. 12 is a timing chart illustrating the change detection signal output from the signal change detection circuit 44, the clock signal CK output from the timing control circuit 41, an F/F output signal from the flip-flop circuit 261, the output signal TCK from the AND circuit 262, and the count period of the counter 263.

At the time ta, the output of the change detection signal starts in correspondence with the reception of the reference light as described above with reference to FIG. 9. Then, the F/F output signal changes from a Low level to a Hi level and the output of the output signal TCK starts.

At the time t4, the output of the change detection signal is stopped in correspondence with the stop of the reception of the reference light as described above with reference to FIG. 9.

At the time tb, the output of the change detection signal starts in correspondence with the reception of the measurement light as described above with reference to FIG. 9. Then, the F/F output signal changes from the Hi level to the Low level and the output of the output signal TCK is stopped.

For example, at the time t1 when light is emitted, the timing control circuit 41 supplies the start signal to the counter 263. Then, the counter 263 starts to count the number of clocks in the output signal TCK. However, the output signal TCK is actually output for the period from the time ta to the time tb and the counter 263 counts the number of clocks in the output signal TCK for the period from the time ta to the time tb.

Then, before the next light is emitted, the timing control circuit 41 supplies the stop signal to the counter 263. Then, the counter 263 stops the counting of the number of clocks in the output signal TCK and supplies the count signal Dcount indicating the count value up to that time to the control unit 22.

The count value of the count signal Dcount is the count value of the number of clocks in the output signal TCK for the count period from the time ta to the time tb. In addition, the clock interval of the output signal TCK is the same as that of the clock signal CK. Therefore, the control unit 22 calculates the distance measurement time that is the period from the time ta to the time tb on the basis of the count value of the count signal Dcount and the clock interval of the clock signal CK. That is, the distance measurement time is substantially equal to the time from the reception of the reference light by the pixel P to the reception of the measurement light by the pixel P.

Then, the control unit 22 calculates the distance measurement time for each pixel P of the light receiving unit 43 and calculates the distance to the object on the basis of the calculated distance measurement time.

Here, the response characteristics of the pixel signals of the pixels P of the light receiving unit 43 are different from each other.

For example, the response characteristics of the pixel signal of each pixel P vary depending on a resistance component of the vertical signal line VSL between each pixel P and the column amplification circuit 132. For example, the pixel P in the upper part of the light receiving unit 43 is far away from the column amplification circuit 132 and the resistance value of the vertical signal line VSL is large. Therefore, the delay time of the pixel signal of the pixel P is long. In contrast, the pixel P in the lower part of the light receiving unit 43 is close to the column amplification circuit 132 and the resistance value of the vertical signal line VSL is small. Therefore, the delay time of the pixel signal of the pixel P is short. In addition, a variation in the response characteristics of the pixel signal in the vertical signal line VSL is increased by, for example, a change in the power supply voltage, a change in environmental temperature, or a variation in manufacture. For example, a variation in the response characteristics of the pixel signals between the pixels P is in the range of 10 nS to 100 nS and is in the range of 1.5 m to 15 m in terms of distance.

In addition, for example, the circuit characteristics of the column amplification circuit 132 and the signal change detection circuit 44 vary depending on the pixel column.

Furthermore, for example, the operation of the time measurement circuit 45 varies depending on the pixel column. For example, the delay time of the clock signal CK varies depending on a difference in the length of wires between the timing control circuit 41 and the time measurement circuit 45 of each pixel column and the operation of the time measurement circuit 45 varies depending on the pixel column.

In contrast, the configuration in which the same pixel P receives the reference light and the measurement light and the difference between the detection time of the reference light and the detection time of the measurement light is calculated makes it possible to reduce the influence of the variation in the response characteristics and the circuit characteristics between the pixels P. Then, the distance to the object 12 is measured on the basis of the distance measurement time between the detection time of the reference light and the detection time of the measurement light. Therefore, the accuracy of distance measurement is improved.

At the time t6, the output of the change detection signal is stopped in correspondence with the stop of the reception of the measurement light as described above with reference to FIG. 9.

Returning to FIG. 9, then, the control signal TG is turned off, the control signal RS is turned on, and the potential of the FD unit 154 is reset, which is not illustrated in the drawings. Then, the process after the time t0 is repeatedly performed.

Here, the effect of an integration operation which continuously accumulates the charge generated by the photoelectric conversion element 151 in the FD unit 154 regardless of the sampling timing of the pixel signal and outputs a pixel signal based on the accumulated charge (the integrated value of the charge) will be described with reference to FIGS. 13 and 14.

Figure 13:
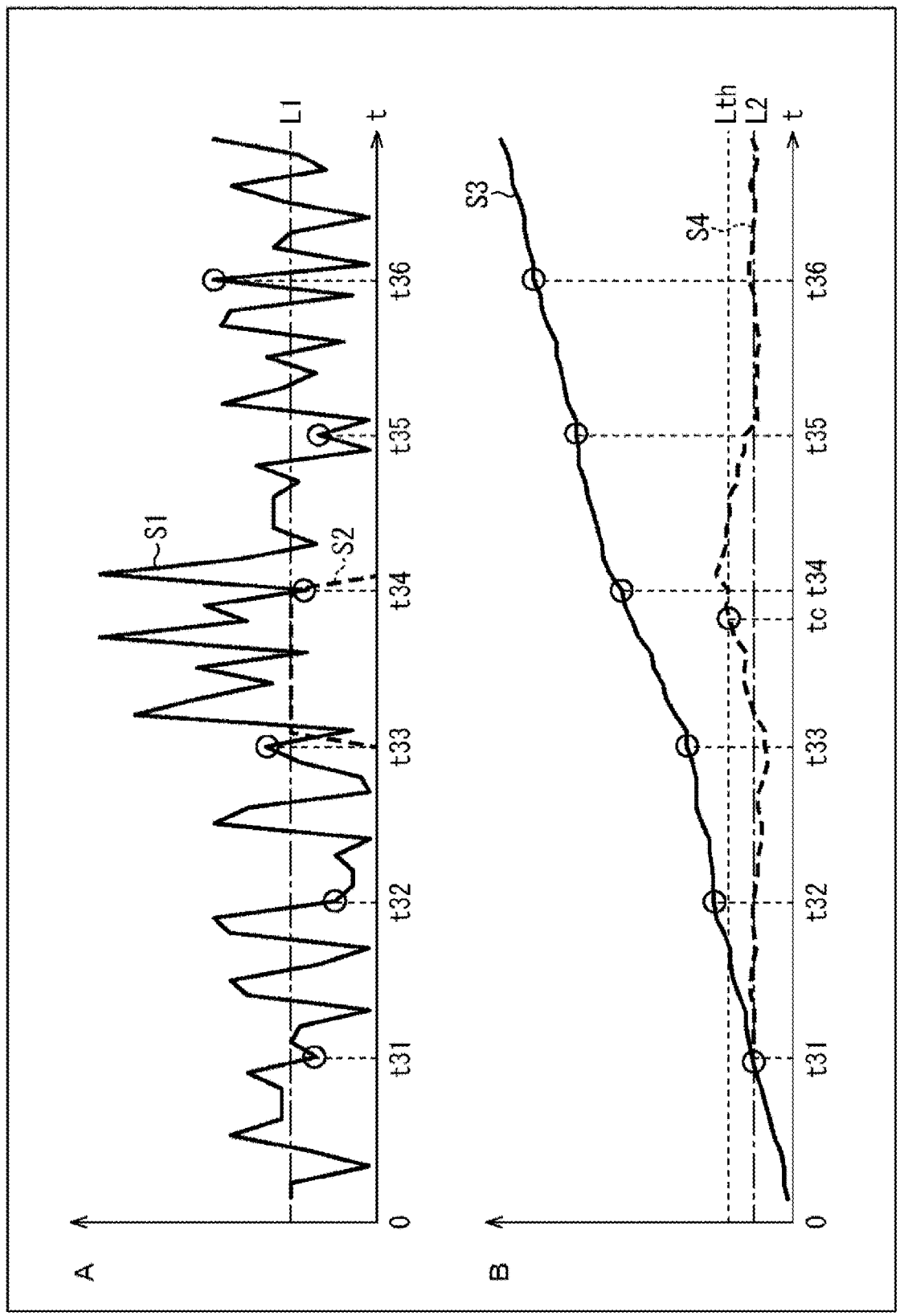
FIG. 13 is a diagram for describing an effect obtained by using a differential signal.

A of FIG. 13 illustrates a time-series change in the pixel signal in a case in which the integration operation is not performed. The horizontal axis of the graph indicates time and the vertical axis indicates the level of a signal and the amount of light. A waveform S1 indicates the waveform of the pixel signal and a waveform S2 indicates the waveform of the measurement light. Hereinafter, the average level of the background light component included in the pixel signal S1 is represented by L1. A period from a time t31 to a time t36 is the time when the signal change detection circuit 44 detects a change in the pixel signal.

The amplitude of the pixel signal S1 is sharply changed by random noise which is mainly optical shot noise included in background light.

Here, for a period from a time t33 to a time t34, in a case in which the measurement light S2 whose amount is substantially the same as the average level of the background light is received, the level of the pixel signal S1 increases slightly as a whole. However, since the components of the measurement light S2 and the background light included in the pixel signal S1 are substantially at the same level, it is difficult to accurately detect the reception timing of the measurement light S2 with the sampling value of the pixel signal S1 for the period from the time t31 to the time t36 as illustrated in FIG. 13.

In contrast, B of FIG. 13 illustrates a time-series change in the pixel signal and the differential signal in a case in which the integration operation is performed. The horizontal axis of the graph indicates time and the vertical axis indicates a signal level. A waveform S3 indicates the waveform of the pixel signal (integral signal) and a waveform S4 indicates the waveform of a differential signal of the pixel signal S3. Hereinafter, the average level of the background light component included in the differential signal S4 is represented by L2.

In the pixel signal S3, a variation in random noise included in the background is averaged and prevented by the integration of the background light component. As a result, the pixel signal S3 increases gently.

In contrast, for the period from the time t33 to the time t34, the amount of change in the differential signal S4 is significantly changed by the reception of the measurement light. Then, the peak value of the differential signal S4 is about twice the signal level L2 and the differential signal S4 is higher than a determination level Lth at a time tc between the time t33 and the time t34. Then, at the time t34, the reception of the measurement light S2 is detected.

As such, even in a case in which the amount of measurement light is significantly less than the amount of background light, the reception timing of the measurement light is accurately detected by using the integral signal S3 and the differential signal S4.

Figure 14:
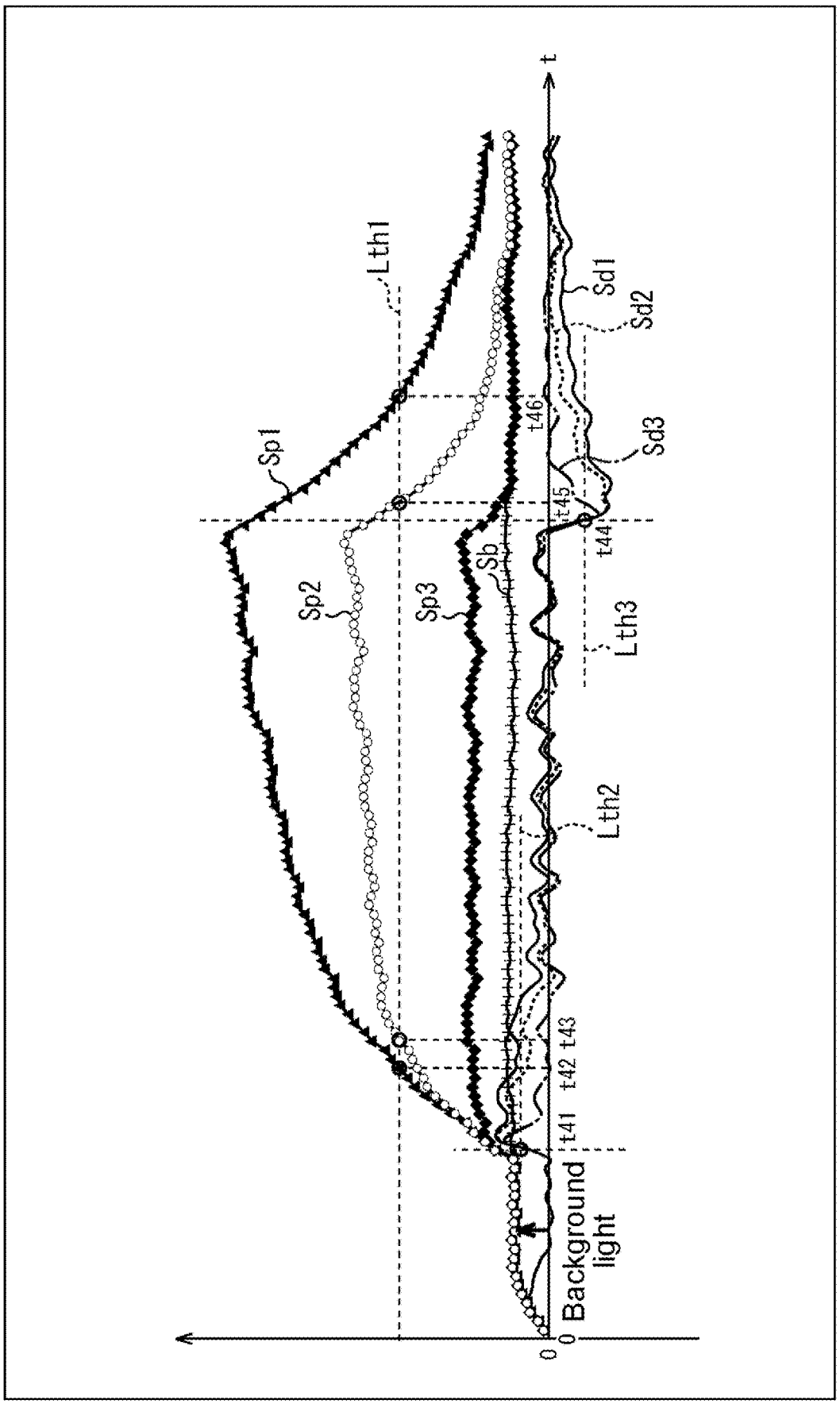
FIG. 14 is a diagram for describing an effect obtained by using the differential signal.

FIG. 14 illustrates an example of the pixel signal which is the integral signal and the differential signal of the pixel signal. The horizontal axis of the graph indicates time and the vertical axis indicates a signal level. Waveforms Sp1 to Sp3 indicate pixel signals. Waveforms Sd1 to Sd3 indicate differential signals of the pixel signals Sp1 to Sp3. A waveform Sb indicates the waveform of the background light.

Note that, in this example, it is assumed that, for a period from the time slightly before a time t41 to the time slightly before a time t44, the measurement light is received. In addition, it is assumed that the amounts of measurement light are different from each other and the following relationship is satisfied: the pixel signal Sp1> the pixel signal Sp2> the pixel signal Sp3.

First, a case in which the reception of the measurement light is detected using the pixel signals Sp1 to Sp3 and a determination level Lth1 when the level of the pixel signal rises due to the measurement light will be described.

In a case in which the pixel signal Sp1 is used, the pixel signal Sp1 is higher than the determination level Lth1 at a time t42 and the reception of the measurement light is detected. In a case in which the pixel signal Sp2 is used, the pixel signal Sp2 is higher than the determination level Lth1 at a time t43 and the reception of the measurement light is detected. In contrast, in a case in which the pixel signal Sp3 is used, the pixel signal Sp3 is not higher than the determination level Lth1. Therefore, the reception of the measurement light is not detected.

Next, a case in which the reception of the measurement light is detected using the pixel signals Sp1 to Sp3 and the determination level Lth1 when the level of the pixel signal falls due to the measurement light will be described.

In a case in which the pixel signal Sp1 is used, the pixel signal Sp1 is equal to or lower than the determination level Lth1 at a time t45 and the reception of the measurement light is detected. In a case in which the pixel signal Sp2 is used, the pixel signal Sp2 is equal to or lower than the determination level Lth1 at a time t46 and the reception of the measurement light is detected. In contrast, in a case in which the pixel signal Sp3 is used, the pixel signal Sp3 is not higher than the determination level Lth1. Therefore, the reception of the measurement light is not detected.

As such, in a case in which the pixel signals Sp1 to Sp3 which are integral signals are used, the detection timing varies depending on the amount of measurement light or the measurement light is not detected according to the amount of measurement light.

Next, a case in which the reception of the measurement light is detected using the differential signals Sd1 to Sd3 and a determination level Lth2 when the level of the differential signal rises due to the measurement light will be described.

In a case in which the differential signals Sd1 to Sd3 are used, each of the differential signals Sd1 to Sd3 is higher than the determination level Lth2 at the time t41 and the reception of the measurement light is detected.

Next, a case in which the reception of the measurement light is detected using the differential signals Sd1 to Sd3 and a determination level Lth3 when the level of the differential signal falls due to the measurement light will be described.

In a case in which the differential signals Sd1 to Sd3 are used, the differential signals Sd1 to Sd3 are equal to or lower than the determination level Lth3 at the time t44 and the reception of the measurement light is detected.

As such, the use of the differential signals Sd1 to Sd3 makes it possible to detect the reception of the measurement light substantially at the same timing, regardless of the amount of measurement light.

The above-mentioned configuration makes it possible to improve the accuracy of distance measurement using ToF. That is, it is possible to reduce a variation in the detection result of the distance to the object 12 depending on the amount of measurement light or the position of the pixel P in the light receiving unit 43. In addition, even in a case in which the amount of measurement light is very small or the amount of background light is large, it is possible to accurately detect the distance to the object 12.

In addition, since the cover glass 63 is made of glass or plastic and is unlikely to be deformed according to temperature, it is possible to stably measure the distance with high accuracy, regardless of a temperature change.

Furthermore, as the cover glass 63, for example, a cover glass on the market can be used without being processed. Therefore, it is possible to easily obtain the cover glass 63 at a low cost. In addition, for example, the distance measurement module 23 may be formed only by adding the light source unit 31 and the light source lens 32 to a module with the structure according to the related art. Further, the necessary assembly accuracy level of the light source lens 32 is lower than that of the imaging lens 33. In addition, it is not necessary to provide a light receiving unit only for the reference light. Therefore, the distance measurement module 23 can prevent an increase in number of materials and manufacturing costs and an increase in size, as compared to the distance measurement module according to the related art.

<Example of Performance of Distance Measurement Module 23>

Next, an example of the performance of the distance measurement module 23 will be described.

The distance measurement resolution of the distance measurement module 23 is determined by the period of the clock signal CK of the timing control circuit 41 and the maximum distance measurement range is determined by the period of the clock signal CK and the maximum count value of the counter 263 in the time measurement circuit 45.

For example, in a case in which the distance measurement module 23 is used to prevent vehicle collision, the necessary accuracy of distance measurement is not very high. Therefore, for example, the period of the clock signal CK is set to 200 picoseconds and the distance measurement resolution is set to 30 mm. In this case, in a case in which the maximum count value of the counter 263 is set to 100 counts, the maximum distance measurement range is 3 m and the maximum count time is 20 nanoseconds. In a case in which the maximum count value of the counter 263 is set to 1,000 counts, the maximum distance measurement range is 30 m and the maximum count time is 200 nanoseconds.

In contrast, for example, a higher distance resolution is necessary in the case in which design drawing data for construction which needs precise 3D data is created or a 3D drawing for a bronze status or a doll is created. Therefore, for example, the period of the clock signal CK is set to 20 picoseconds and the distance measurement resolution is set to 3 mm. In this case, in a case in which the maximum count value of the counter 263 is set to 100 counts, the maximum distance measurement range is 0.3 m and the maximum count time is 20 nanoseconds. In a case in which the maximum count value of the counter 263 is set to 1,000 counts, the maximum distance measurement range is 3 m and the maximum count time is 200 nanoseconds.

In addition, for example, in a case in which the object 12 at a longer distance is detected, the period of the clock signal CK is set to 2 nanoseconds and the maximum count value of the counter 263 is set to 1,000 counts. In this case, the distance measurement resolution is 300 mm, the maximum distance measurement range is 300 m, and the maximum count time is 2 microseconds.

Here, it is necessary to increase the amount of emitted light in order to irradiate an object at a long distance with the emitted light. For example, in a case in which the pulse width Tpw of the emitted light is set to 20 nanoseconds, the amount of emitted light is 100 times more than that in a case in which the pulse width Tpw is set to 200 picoseconds. In contrast, since the amount of emitted light is attenuated by a multiple of (1/the square root of a flight distance), the emission distance of the emitted light is about 10 times longer than that in the comparative example.

In contrast, in a case in which the pulse width Tpw increases and the amount of emitted light increases, it is assumed that the amount of reference light is too large and the FD unit 154 is saturated at the time when the reference light is received, which makes it difficult to measure the distance.

Here, an example of a measure to the saturation of the FD unit 154 caused by the reference light will be described with reference to FIG. 15.

Figure 15:
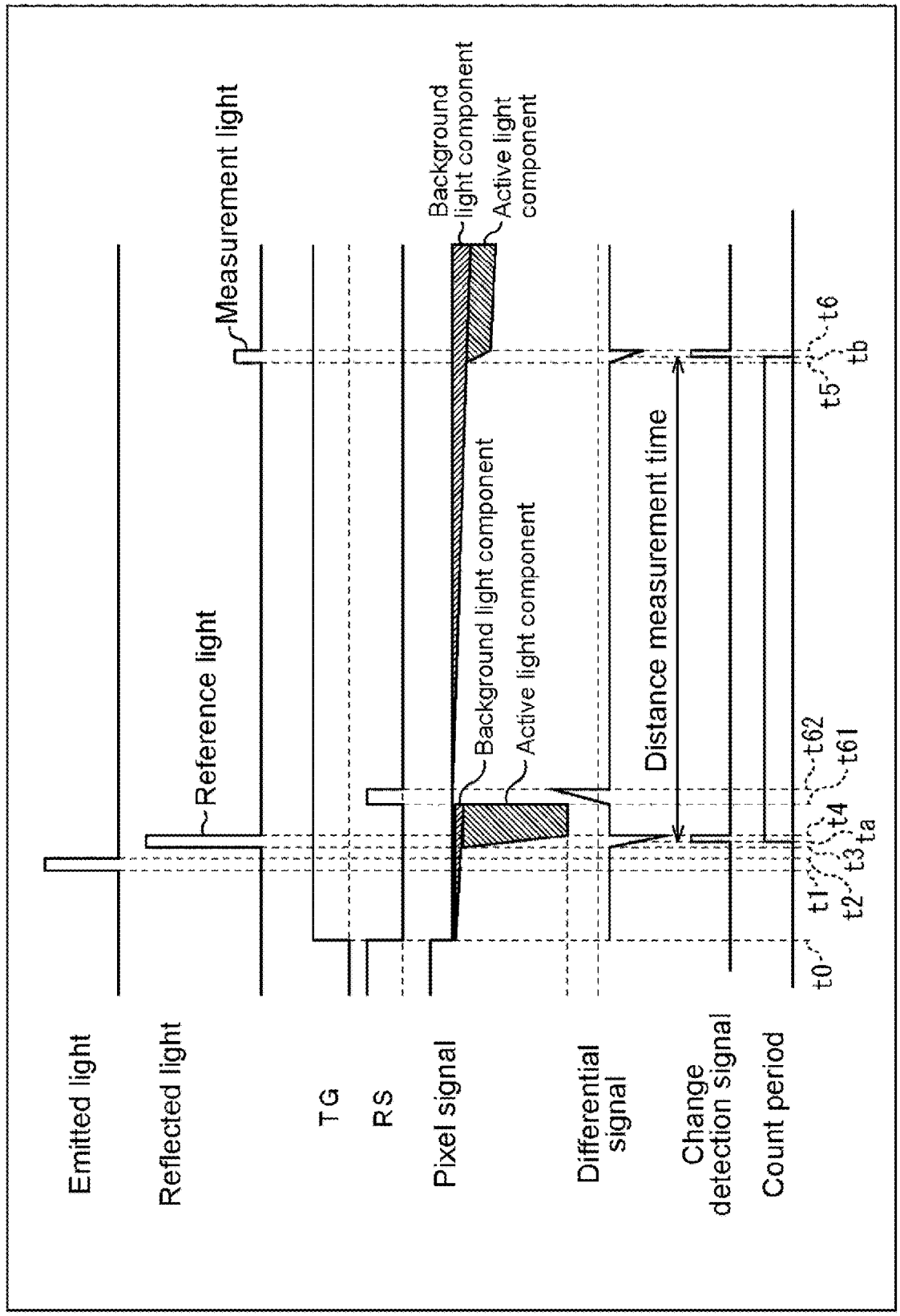
FIG. 15 is a timing chart for describing a modification example of the operation of the distance measurement module illustrated in FIG. 1.

FIG. 15 is a timing chart illustrating a modification example of the operation of the distance measurement module 23.

The timing chart illustrated in FIG. 15 differs from the timing chart illustrated in FIG. 9 in a process for the period from the reception of the reference light to the reception of the measurement light.

Specifically, after the reception of the reference light ends at a time t4, the control signal RS is turned on at a time t61. Then, the charge in the FD unit 154 is transmitted to the power supply VDD and the potential of the FD unit 154 is reset.

Then, at a time t62, the control signal RS is turned off and the accumulation of charge to the FD unit 154 is resumed.

Therefore, even in a case in which the FD unit 154 is saturated by the reference light, it is possible to detect the reception of the measurement light since the FD unit 154 is reset before the measurement light is received.

However, in this method, for the period from the time t1 to the time t62, it is difficult to detect the reception of the measurement light. However, as described above, since this method is intended to increase the amount of emitted light and to measure the distance to the object 12 at a long distance, there are no practical problems.

Note that, in any case, the pulse width Tpw of the emitted light is set to be equal to or less than the period of the clock signal CK to prevent the period for which light is emitted from being extended over the output period of a plurality of clock signals CK. As a result, it is possible to significantly reduce a variation in the result of distance measurement.

2. Modification Examples of First Embodiment

Next, modification examples of the first embodiment of the present technology will be described with reference to FIGS. 16 to 25.

<Modification Examples of Cover Glass 63>

First, modification examples of the cover glass 63 will be described with reference to FIGS. 16 and 17.

Figure 16:
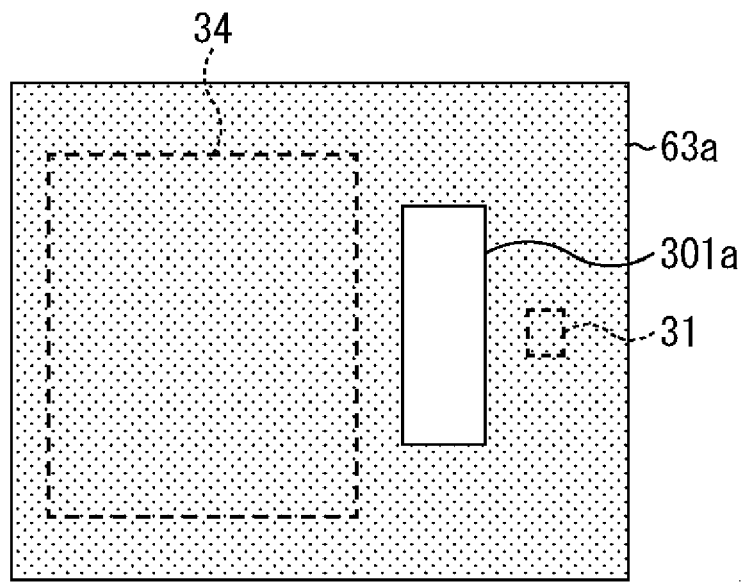
FIG. 16 is a diagram illustrating a first modification example of a cover glass illustrated in FIG. 2.

FIG. 16 illustrates an example of the configuration of a cover glass 63a which is a first modification example of the cover glass 63.

In the cover glass 63a, a reflective portion 301a is provided between the light source unit 31 and the distance measurement sensor 34. The reflective portion 301a is provided in the vicinity of a region in which the reference light incident on the light receiving unit 43 of the distance measurement sensor 34 is reflected. In the reflective portion 301a, no anti-reflection films are provided on an incident surface and a reflecting surface of the cover glass 63a.

Therefore, the amount of light reflected from the reflective portion 301a is more than that in a case in which the anti-reflection film is provided. As a result, the amount of reference light incident on the light receiving unit 43 of the distance measurement sensor 34 increases and the accuracy of detecting the reference light is improved.

In addition, for example, in the reflective portion 301a, at least one of the incident surface and the reflecting surface of the cover glass 63a may be unevenly processed in a frosted glass form. In this case, since the reference light reflected from the reflective portion 301a is diffused, the reference light is reliably incident on the entire light receiving unit 43 of the distance measurement sensor 34.

Figure 17:
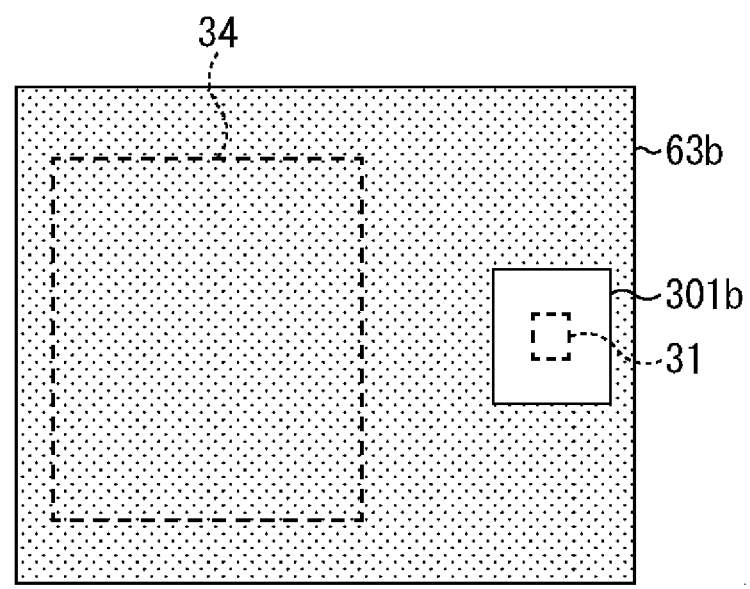
FIG. 17 is a diagram illustrating a second modification example of the cover glass illustrated in FIG. 2.

FIG. 17 illustrates an example of the configuration of a cover glass 63b which is a second modification example of the cover glass 63.

In the cover glass 63b, a reflective portion 301b is provided above the light source unit 31. The reflective portion 301b is disposed so as to surround the light source unit 31 and the periphery thereof. In the reflective portion 301b, no anti-reflection films are provided on an incident surface and a reflecting surface of the cover glass 63b.

In a case in which the directionality of the emitted light is strong (the emission angle is narrow), most of the reference light incident on the light receiving unit 43 of the distance measurement sensor 34 is reflected by the cover glass 63b above the light source unit 31. Therefore, the reflective portion 301b is provided above the light source unit 31.

Note that, for example, in the reflective portion 301b, at least one of the incident surface and the reflecting surface of the cover glass 63b may be unevenly processed in a frosted glass form. In this case, since the reference light reflected from the reflective portion 301b is diffused, the reference light is reliably incident on the entire light receiving unit 43 of the distance measurement sensor 34.

It will be appreciated that the illustrative cover glasses 63a and 63b shown in FIGS. 16 and 17, respectively, may be employed as a cover glass in any of the electronic apparatus described herein. As two examples, either of cover glass 63a or 63b may be employed as cover glass 63 in the apparatus of FIG. 1, or may be employed as cover glass 553 in the apparatus of FIG. 27. Moreover, in some embodiments, a cover glass 63a or 63b may be employed as shown in FIGS. 16 and 17 but without including a reflective portion 301a or 301b on the glass.

<Modification Examples of Distance Measurement Module 23>

Next, modification examples of the distance measurement module 23 will be described with reference to FIGS. 18 and 19.

Figure 18:
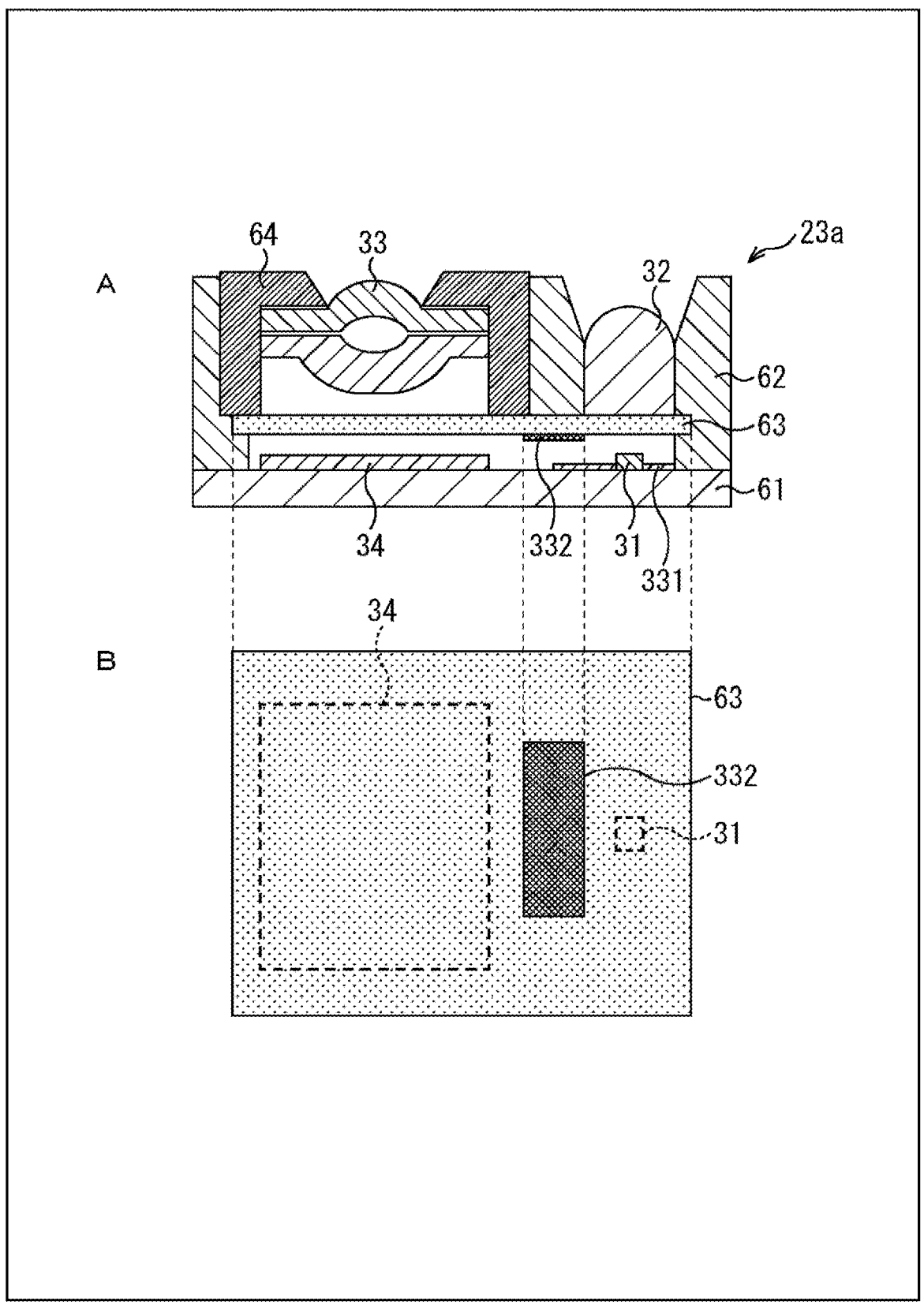
FIG. 18 is a diagram illustrating a first modification example of the distance measurement module illustrated in FIG. 2.

FIG. 18 schematically illustrates an example of the configuration of the cross section of a distance measurement module 23a which is a first modification example of the distance measurement module 23. Note that, in FIG. 18, portions corresponding to those of the distance measurement module 23 illustrated in FIG. 2 are denoted by the same reference numerals.

The distance measurement module 23a differs from the distance measurement module 23 in that an anti-reflection film 331 and a reflective film 332 are provided.

The anti-reflection film 331 is made of, for example, the same material as the anti-reflection film of the cover glass 63. In addition, the anti-reflection film 331 is disposed so as to surround the periphery of the light source unit 31 on the mounting surface of the substrate 61.

In a case in which strong light is incident on the light source lens 32 from the outside, the anti-reflection film 331 prevents the incident light from being reflected from the mounting surface of the substrate 61 and from being propagated to the light receiving unit 43 of the distance measurement sensor 34. Therefore, the background light incident on the light receiving unit 43 is reduced and the accuracy of detecting the reference light and the measurement light is improved.

For example, the reflective film 332 is disposed on the reflecting surface of the cover glass 63 substantially at the same position as the reflective portion 301a illustrated in FIG. 16. For example, the reflective film 332 is obtained by forming a metal film on the reflecting surface of the cover glass 63 using vapor deposition and has, for example, a reflectance of 80% or more. Therefore, the amount of reference light incident on the light receiving unit 43 of the distance measurement sensor 34 increases and the accuracy of detecting the reference light is improved.

Figure 19:
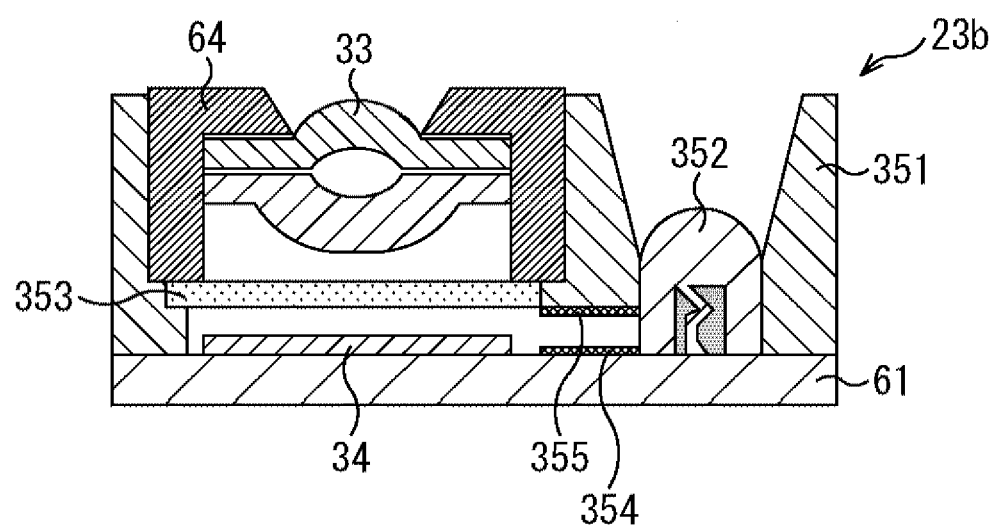
FIG. 19 is a diagram illustrating a second modification example of the distance measurement module illustrated in FIG. 2.

FIG. 19 schematically illustrates an example of the configuration of the cross section of a distance measurement module 23b which is a second modification example of the distance measurement module 23. Note that, in FIG. 19, portions corresponding to those of the distance measurement module 23 illustrated in FIG. 2 are denoted by the same reference numerals.

The distance measurement module 23b differs from the distance measurement module 23 in that a light emitting diode 352 is provided instead of the light source unit 31 and the light source lens 32, a lens holder 351 and a cover glass 353 are provided instead of the lens holder 62 and the cover glass 63, and a reflective film 354 and a reflective film 355 are added.

The lens holder 351 and the cover glass 353 have substantially the same shape as the lens holder 62 and the cover glass 63 illustrated in FIG. 2. However, the cover glass 353 is provided above the distance measurement sensor 34 so as to cover (the light receiving unit 43 of) the entire distance measurement sensor 34 with a gap therebetween, but does not cover the light emitting diode 352. The shape of the lens holder 351 is slightly different from the shape of the lens holder 62 by a difference in the cover range of the cover glass 353.

The light emitting diode 352 is attached to (supported by) the lens holder 351 and is mounted on the mounting surface of the substrate 61. In addition, the light emitting diode 352 is formed by molding a light emitting element with a transparent resin. The molding resin is formed in a convex shape and also functions as a light source lens.

In addition, a cavity is formed between the light emitting diode 352 of the lens holder 351 and the distance measurement sensor 34 and the light emitting diode 352 and the distance measurement sensor 34 are spatially connected to form a light guide path. In the light guide path between the light emitting diode 352 and the distance measurement sensor 34, the reflective film 354 is formed on the mounting surface of the substrate 61 and the reflective film 355 is formed on a lower surface of the lens holder 351 which faces the mounting surface of the substrate 61. The reflective film 354 and the reflective film 355 are formed by coating with paint or metal having high reflectance.

Then, part of the emitted light irregularly reflected in the transparent resin of the light emitting diode 352 is transmitted in the light guide path between the light emitting diode 352 and the distance measurement sensor 34 and is then incident as the reference light on the light receiving unit 43 of the distance measurement sensor 34. In this case, the reference light is easily transmitted in the light guide path by the reflective film 354 and the reflective film 355 which cover the upper and lower sides of the light guide path.

In addition, a space including the distance measurement sensor 34 between the mounting surface of the substrate 61 and a reflecting surface of the cover glass 353 which faces the mounting surface of the substrate 61 is sealed by, for example, the lens holder 351, the light emitting diode 352, and a resin. Therefore, for example, dust or dirt is prevented from getting into the space in which the distance measurement sensor 34 is present. In addition, for example, the space is filled with air or nitrogen if necessary.

Note that, for example, the same reflective films as the reflective film 354 and the reflective film 355 illustrated in FIG. 19 may be provided between the light source unit 31 and the distance measurement sensor 34 of the distance measurement module 23 illustrated in FIG. 2.

<Modification Example of Pixel P>

Next, a modification example of the pixel P will be described with reference to FIGS. 20 and 21.

Figure 20:
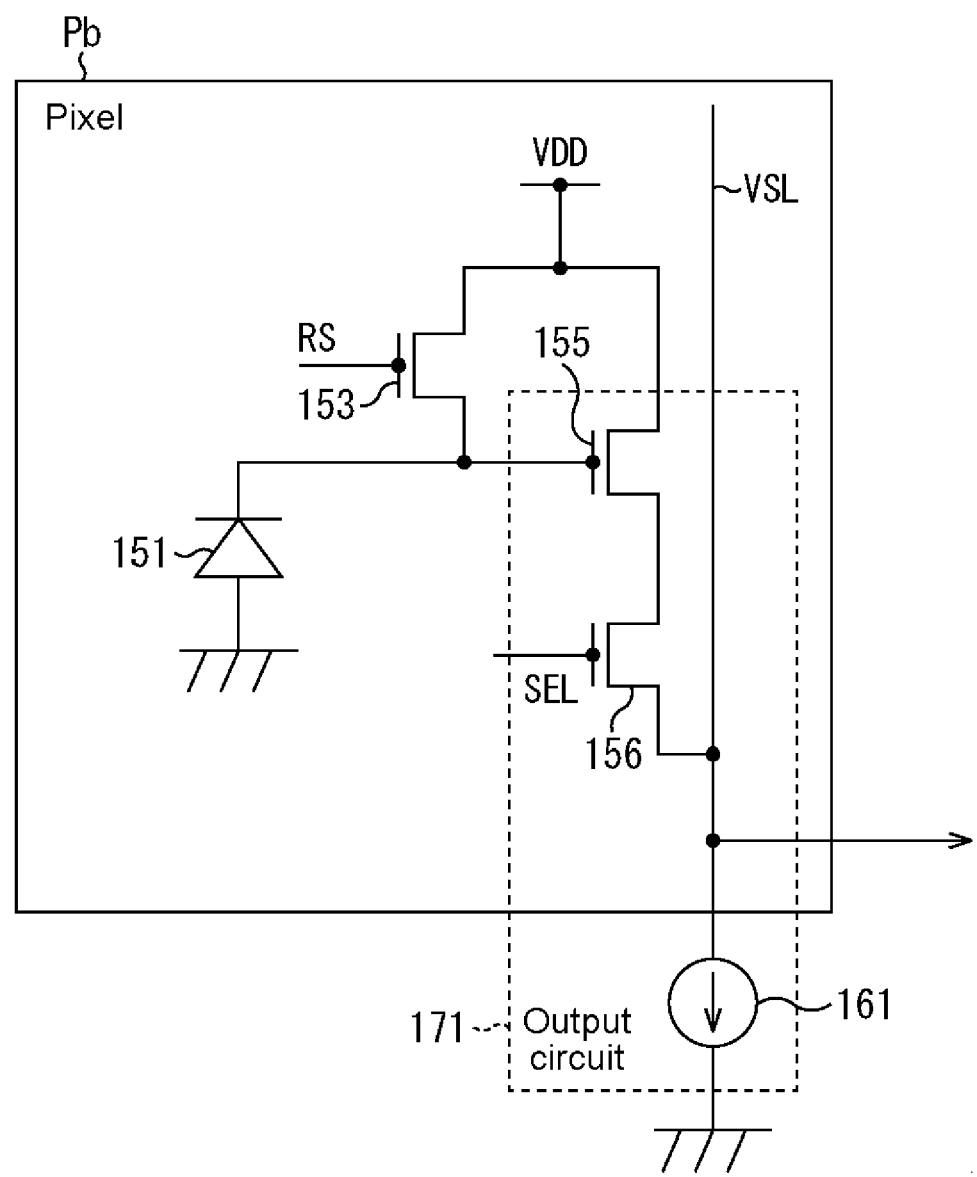
FIG. 20 is a circuit diagram illustrating a modification example of the pixel.

FIG. 20 illustrates an example of the configuration of a pixel Pa which is a modification example of the pixel P. Note that, in FIG. 20, portions corresponding to those of the pixel P illustrated in FIG. 5 are denoted by the same reference numerals.

The pixel Pa differs from the pixel P in that the read transistor 152 is removed. That is, the pixel Pa is a pixel with a 3-transistor configuration.

In the pixel Pa, the charge generated and accumulated by the photoelectric conversion element 151 is directly converted into a voltage and the voltage is output as the pixel signal to the vertical signal line VSL.

Figure 21:
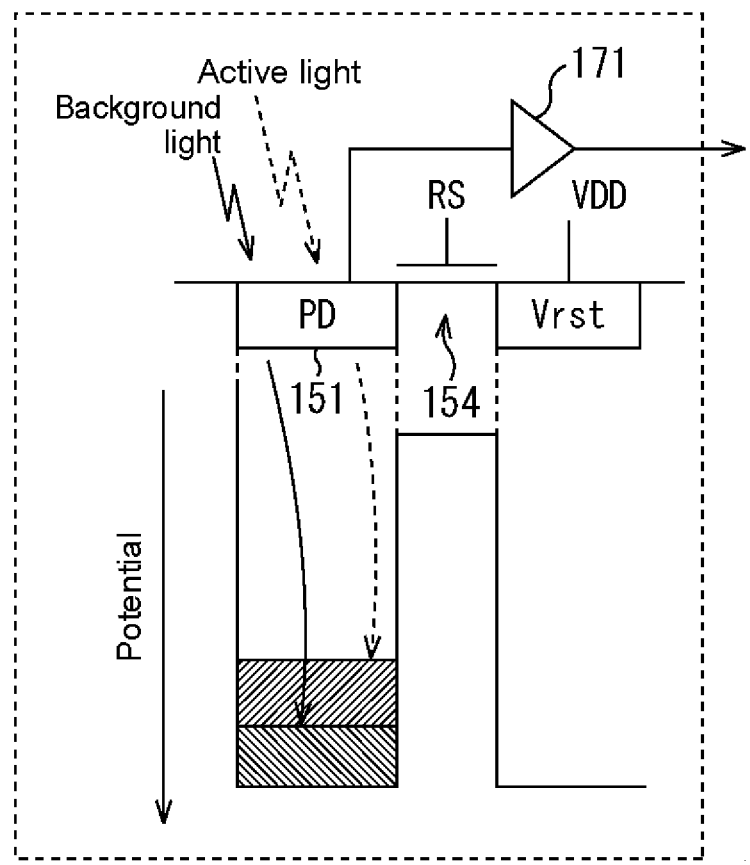
FIG. 21 is a diagram schematically illustrating the potential state of an FD unit in the pixel illustrated in FIG. 20.

FIG. 21 schematically illustrates the potential state of the photoelectric conversion element 151 of the pixel Pa.

The photoelectric conversion element 151 converts incident active light (the reference light or the measurement light) and background light into charge. In a case in which the reset transistor 153 is turned off, the generated charge is accumulated in the photoelectric conversion element 151 without any change. The output circuit 171 outputs a pixel signal indicating the voltage based on the charge accumulated in the photoelectric conversion element 151. Similarly to the pixel P, the pixel Pa performs a charge integration operation and the pixel signal is an integral signal.

In contrast, when the reset transistor 153 is turned on, the charge accumulated in the photoelectric conversion element 151 is transmitted to the power supply VDD and the potential of the photoelectric conversion element 151 is reset.

<Modification Examples of Differential Circuit 201>

Next, modification examples of the differential circuit 201 in the signal change detection circuit 44 illustrated in FIG. 6 will be described with reference to FIGS. 22 to 25.

Figure 22:
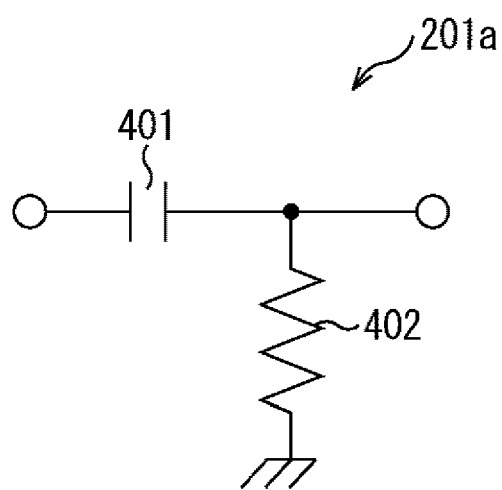
FIG. 22 is a circuit diagram illustrating a first modification example of the differential circuit illustrated in FIG. 6.

FIG. 22 illustrates an example of the configuration of a differential circuit 201a which is a first modification example of the differential circuit 201. The differential circuit 201a is a passive differential circuit using a capacitor 401 and a resistor 402.

Figure 23:
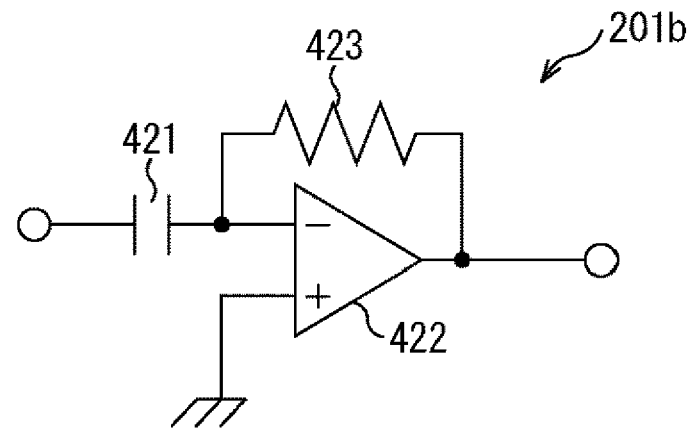
FIG. 23 is a circuit diagram illustrating a second modification example of the differential circuit illustrated in FIG. 6.

FIG. 23 illustrates an example of the configuration of a differential circuit 201b which is a second modification example of the differential circuit 201. The differential circuit 201b is an active differential circuit including a capacitor 421, an amplifier 422, and a resistor 423.

Figure 24:
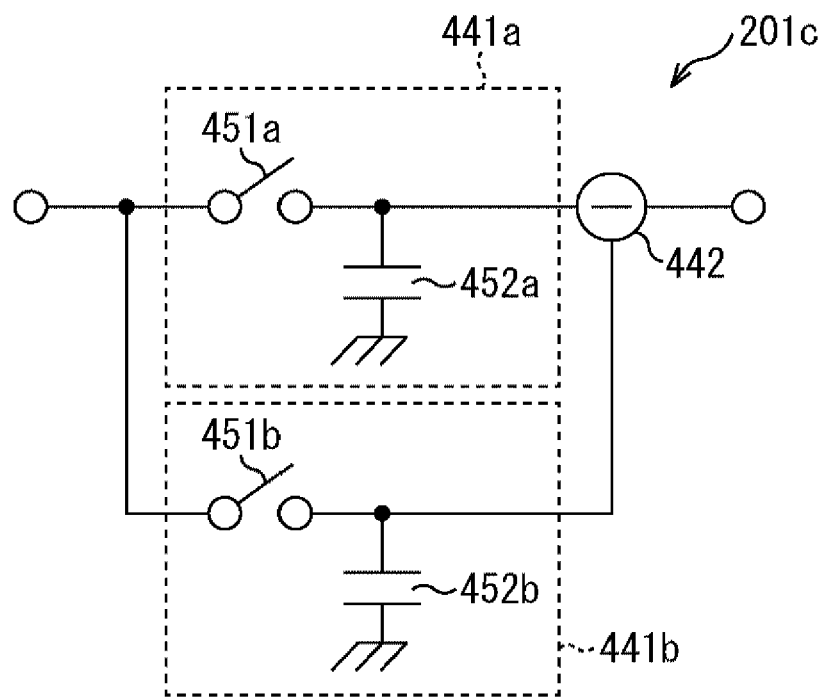
FIG. 24 is a circuit diagram illustrating a third modification example of the differential circuit illustrated in FIG. 6.

FIG. 24 illustrates an example of the configuration of a differential circuit 201c which is a third modification example of the differential circuit 201.

The differential circuit 201c is a difference circuit including a sample-and-hold circuit 441a, a sample-and-hold circuit 441b, and a subtraction circuit 442. The sample-and-hold circuit 441a includes a switch 451a and a capacitor 452a. The sample-and-hold circuit 441b includes a switch 451b and a capacitor 452b.

There is a predetermined time deviation between the on-time of the switch 451a of the sample-and-hold circuit 441a and the on-time of the switch 451b of the sample-and-hold circuit 441b. The differential circuit 201c calculates a difference between the signal values at two timings when the pixel signals are separated from each other by a predetermined period of time to generate a differential signal.

Figure 25:
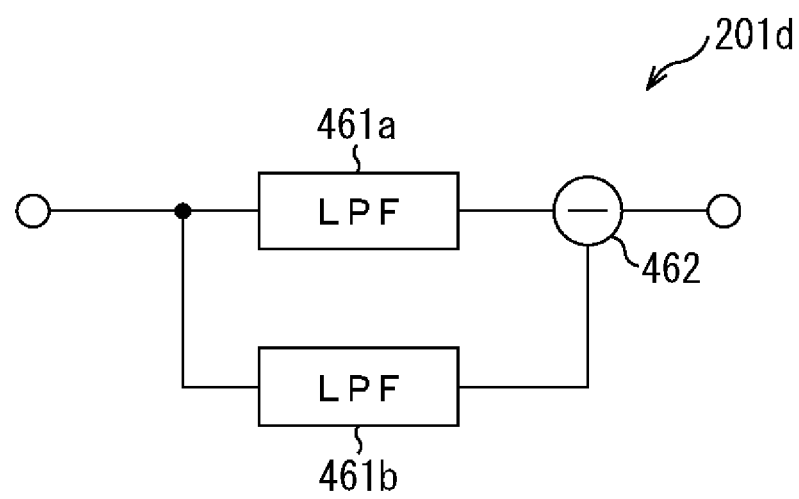
FIG. 25 is a circuit diagram illustrating a fourth modification example of the differential circuit illustrated in FIG. 6.

FIG. 25 illustrates an example of the configuration of a differential circuit 201d which is a fourth modification example of the differential circuit 201.

The differential circuit 201d is a difference circuit including a low-pass filter (LPF) 461a, an LPF 461b, and a subtraction circuit 462.

A time constant of the LPF 461b is set to be longer than a time constant of the LPF 461a. Therefore, the phase of the output signal of the LPF 461b lags the phase of the output signal of the LPF 461a. As a result, the subtraction circuit 462 calculates a difference between the signal values at two timings when the pixel signals are separated from each other by a predetermined period of time to generate a differential signal.

Note that the two LPFs 461a and 461b are provided in this example, but the present technology is not limited thereto, and, for example, the LPF 461a may be omitted.

3. Second Embodiment

Next, a second embodiment of the present technology will be described with reference to FIGS. 26 to 29.

The second embodiment differs from the first embodiment in that a light source unit for reference light and a light source unit for measurement light are provided.

<Example of Configuration of Electronic Apparatus 501>

Figure 26:
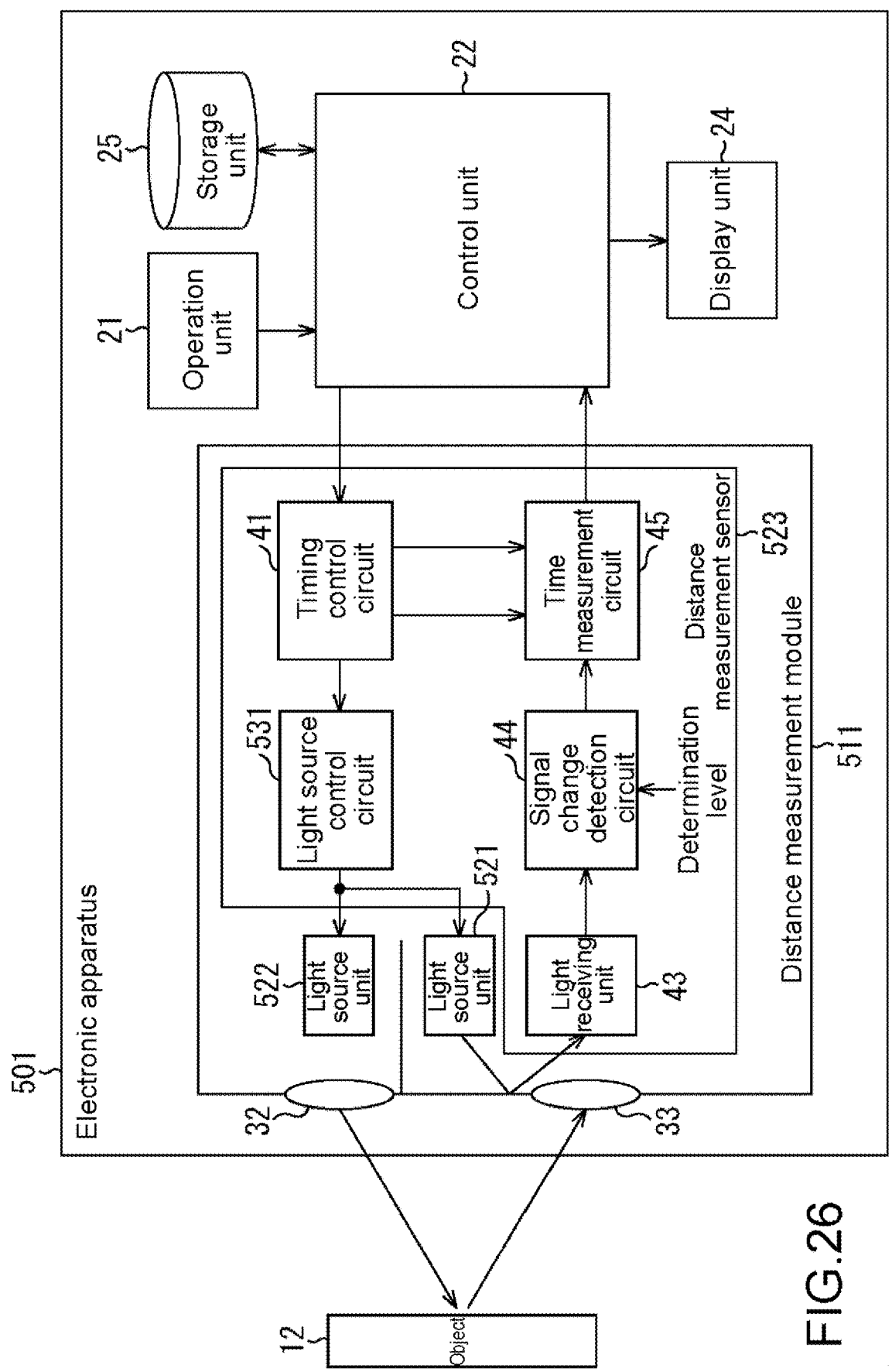
FIG. 26 is a block diagram illustrating an example of the configuration of an electronic apparatus according to a second embodiment of the present technology.

FIG. 26 illustrates an example of the configuration of an electronic apparatus 501 according to the second embodiment of the present technology. Note that, in FIG. 26, portions corresponding to those of the electronic apparatus 11 illustrated in FIG. 1 are denoted by the same reference numerals and the description thereof will be appropriately omitted.

The electronic apparatus 501 differs from the electronic apparatus 11 in that a distance measurement module 511 is provided instead of the distance measurement module 23.

The distance measurement module 511 differs from the distance measurement module 23 in that a light source unit 521 and a light source unit 522 are provided instead of the light source unit 31 and a distance measurement sensor 523 is provided instead of the distance measurement sensor 34.

The distance measurement sensor 523 differs from the distance measurement sensor 34 in that a light source control circuit 531 is provided instead of the light source control circuit 42.

The light source unit 521 emits pulsed light (hereinafter, referred to as emitted light for reference) under the control of the light source control circuit 531 of the distance measurement sensor 523. The emitted light for reference is reflected in the distance measurement module 511 and part of the reference light which is the reflected light is incident on the light receiving unit 43 of the distance measurement sensor 523.

The light source unit 522 emits pulsed light (hereinafter, referred to as emitted light for measurement) under the control of the light source control circuit 531 of the distance measurement sensor 523. The emitted light for measurement is transmitted through the light source lens 32, is emitted to the object 12, and is reflected from the object 12. Part of the measurement light which is the reflected light is transmitted through the imaging lens 33 and is incident on the light receiving unit 43.

<Example of Configuration of Distance Measurement Module 511>

Figure 27:
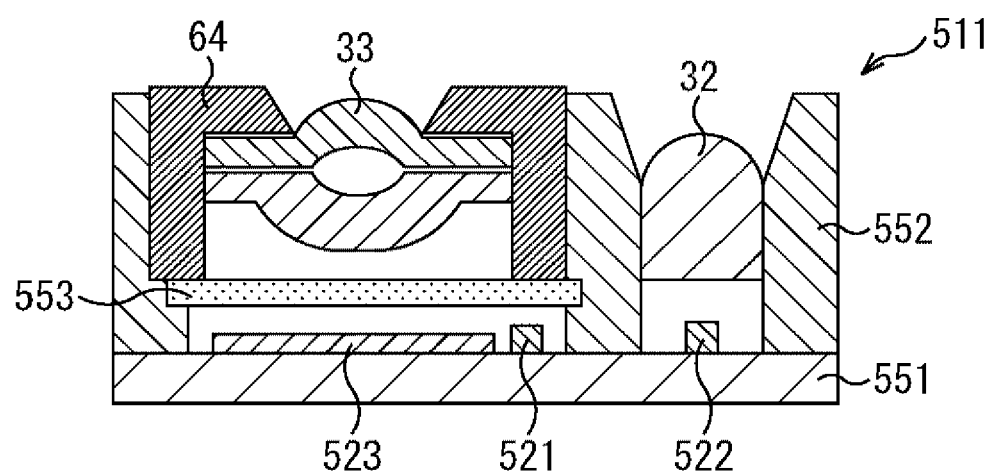
FIG. 27 is a cross-sectional view schematically illustrating an example of the configuration of a distance measurement module illustrated in FIG. 26.

FIG. 27 is a cross-sectional view schematically illustrating an example of the configuration of the distance measurement module 511 illustrated in FIG. 26. Note that, in FIG. 27, portions corresponding to those of the distance measurement module 23 illustrated in FIG. 2 are denoted by the same reference numerals and the description thereof will be appropriately omitted.

As described above, the distance measurement module 511 differs from the distance measurement module 23 in that the light source unit 521, the light source unit 522, and the distance measurement sensor 523 are provided instead of the light source unit 31 and the distance measurement sensor 34. In addition, the distance measurement module 511 differs from the distance measurement module 23 in that a substrate 551, a lens holder 552, and a cover glass 553 are provided instead of the substrate 61, the lens holder 62, and the cover glass 63.

Similarly to the substrate 61 of the distance measurement module 23, a printed wiring board or a printed circuit board is used as the substrate 551. The light source unit 521, the light source unit 522, the distance measurement sensor 523, and the lens holder 552 are mounted on a mounting surface of the substrate 551. The light source unit 522 and the distance measurement sensor 523 are provided with a predetermined gap therebetween. The light source unit 521 is provided between the light source unit 522 and the distance measurement sensor 523. The light source unit 522 is provided substantially at the center of a circular opening portion of the lens holder 552 for mounting the light source lens 32. The light source unit 522 is shielded and separated from the light source unit 521 and the distance measurement sensor 523 by the lens holder 552.

Similarly to the cover glass 63 illustrated in FIG. 2, the cover glass 553 is attached to (supported by) the lens holder 552. The cover glass 553 faces the mounting surface of the substrate 551 and is provided in parallel to the mounting surface of the substrate 551. In addition, the cover glass 553 is provided above the light source unit 521 and the distance measurement sensor 523 (on the side where light for reference is emitted from the light source unit 521) with a gap therebetween and covers all of the light source unit 521 and (the light receiving unit 43 of) the distance measurement sensor 523.

A space including the light source unit 521 and the distance measurement sensor 523 between the mounting surface of the substrate 551 and a reflecting surface of the cover glass 553 which faces the mounting surface of the substrate 551 is sealed by, for example, the lens holder 552 and a resin. Therefore, for example, dust or dirt is prevented from getting into the space in which the light source unit 521 and the distance measurement sensor 523 are present. In addition, for example, the space is filled with air or nitrogen or is vacuous, if necessary.

The light source lens 32 is attached to (supported by) the lens holder 552 and is provided above the light source unit 522. The optical axis of the light source unit 522 is aligned with the optical axis of the light source lens 32.

The lens barrel 64 is attached to (supported by) the lens holder 552 and is provided above the distance measurement sensor 523 on the incident surface of the cover glass 553. In addition, the imaging lens 33 is attached to (supported by) the lens barrel 64 and is provided above the distance measurement sensor 523.

Then, part of the light for reference emitted from the light source unit 521 is reflected from the cover glass 553 and part of reference light which is the reflected light is incident on the light receiving unit 43 of the distance measurement sensor 523. In contrast, part of the light for measurement emitted from the light source unit 522 is transmitted through the light source lens 32 and the object 12 (not illustrated) which is a measurement target is irradiated with the light. Then, part of the measurement light which is light reflected from the object 12 is focused on the light receiving surface of the light receiving unit 43 of the distance measurement sensor 523 by the imaging lens 33.

<Example of Configuration of Light Source Unit 521 and Light Source Unit 522>

Figure 28:
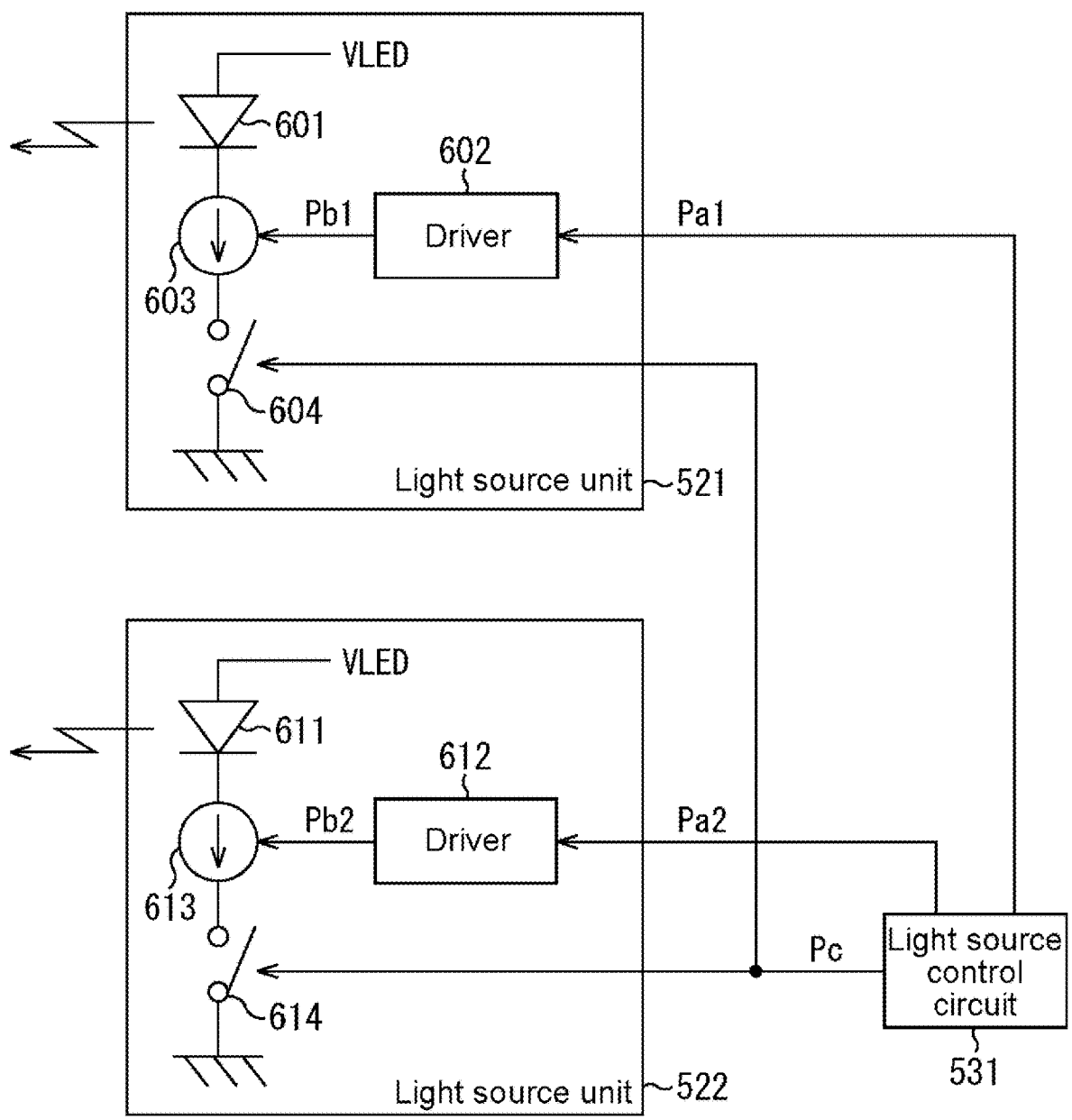
FIG. 28 is a circuit diagram illustrating an example of the configuration of a light source unit illustrated in FIG. 26.

FIG. 28 illustrates an example of the configuration of the light source unit 521 and the light source unit 522.

The light source unit 521 and the light source unit 522 have the same configuration as the light source unit 31 illustrated in FIG. 3.

Specifically, the light source unit 521 includes a light emitting element 601, a driver 602, a current source 603, and a switch 604.

The light emitting element 601 is an LED or an LD and emits the light for reference. The light emitting element 601 has an anode to which a voltage VLED is supplied and a cathode connected to one end of the current source 603. The other end of the current source 603 is grounded through the switch 604.

The driver 602 supplies a control signal Pb1 to the current source 603 on the basis of a control signal Pa1 from the light source control circuit 531 to drive the current source 603.

The current source 603 is, for example, a MOS transistor and supplies a current with a predetermined value.

The switch 604 is, for example, a MOS transistor and is turned on and off on the basis of a control signal Pc from the light source control circuit 531.

The light source unit 522 includes a light emitting element 611, a driver 612, a current source 613, and a switch 614.

The light emitting element 611 is an LED or an LD and emits the light for measurement. The light emitting element 611 has an anode to which the voltage VLED is supplied and a cathode connected to one end of the current source 613. The other end of the current source 613 is grounded through the switch 614.

The driver 612 supplies a control signal Pb2 to the current source 613 on the basis of a control signal Pa2 from the light source control circuit 531 to drive the current source 613.

The current source 613 is, for example, a MOS transistor and supplies a current with a predetermined value.

The switch 614 is, for example, a MOS transistor and is turned on and off on the basis of the control signal Pc from the light source control circuit 531.

Note that the control signal Pa1 and the control signal Pa2 are basically supplied to the driver 602 and the driver 612 at the same timing. In addition, the common control signal Pc is supplied to the switch 604 and the switch 614. Therefore, the light for reference and the light for measurement are emitted at the same timing. In addition, since the control signal is divided into the control signal Pa1 and the control signal Pa2, it is possible to separately control the amount of emitted light for reference and the amount of emitted light for measurement. Furthermore, since the common control signal Pc is used, it is possible to simultaneously cut off the emitted light for reference and the emitted light for measurement at a high speed.

<Operation of Distance Measurement Module 511>

Figure 29:
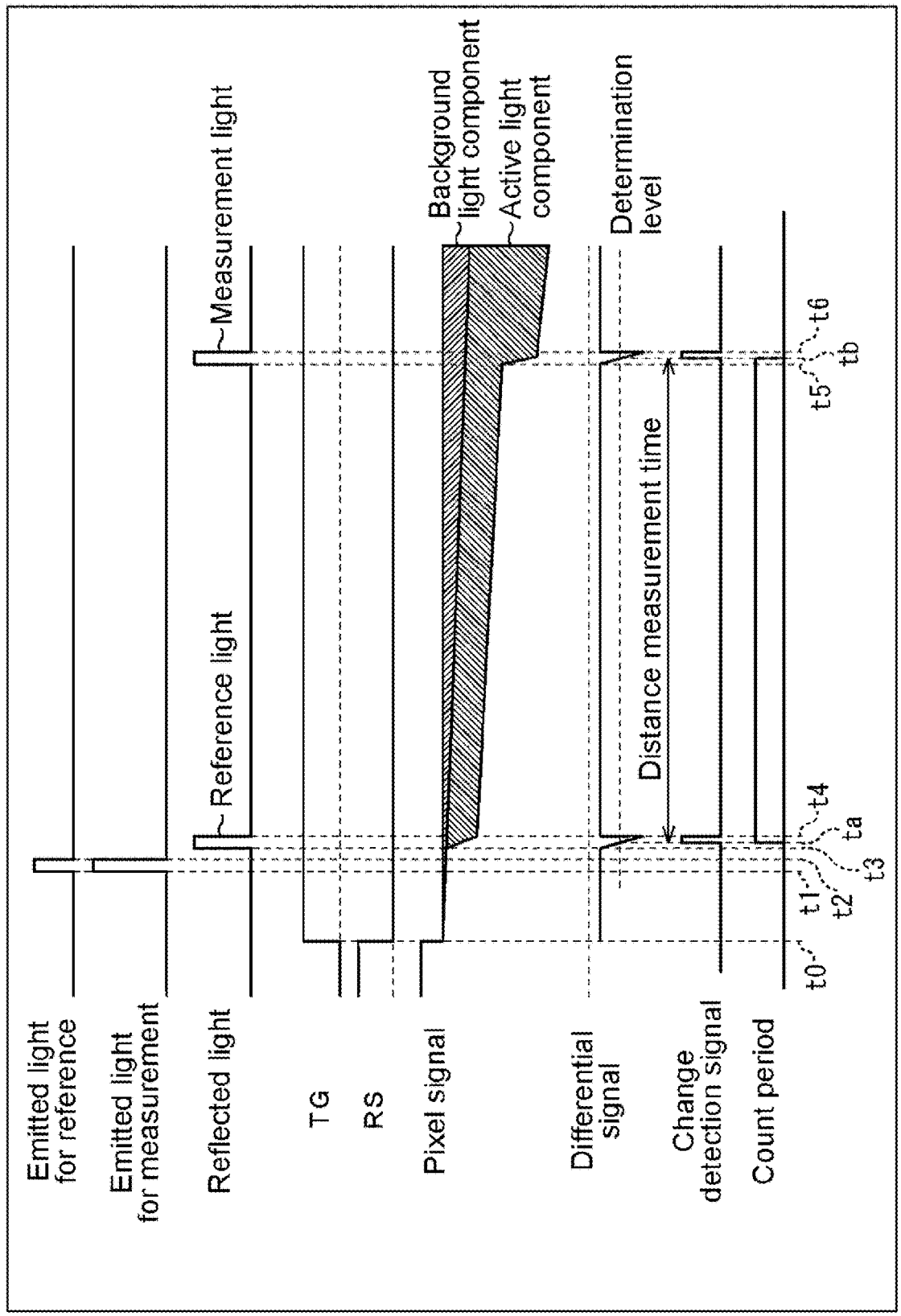
FIG. 29 is a timing chart for describing the operation of the distance measurement module illustrated in FIG. 26.

Next, the operation of the distance measurement module 511 will be described with reference to a timing chart illustrated in FIG. 29.

The timing chart differs from the timing chart illustrated in FIG. 9 in that the light for reference and the light for measurement are individually emitted in synchronization with each other for the period from the time t1 to the time t2 and is the same as the timing chart illustrated in FIG. 9 in the operation for the subsequent period.

4. Modification Examples of Second Embodiment

Next, modification examples of the second embodiment of the present technology will be described with reference to FIGS. 30 to 34.

<Modification Example of Light Source Unit 522>

First, a modification example of the light source unit 522 for measurement light will be described with reference to FIG. 30.

Figure 30:
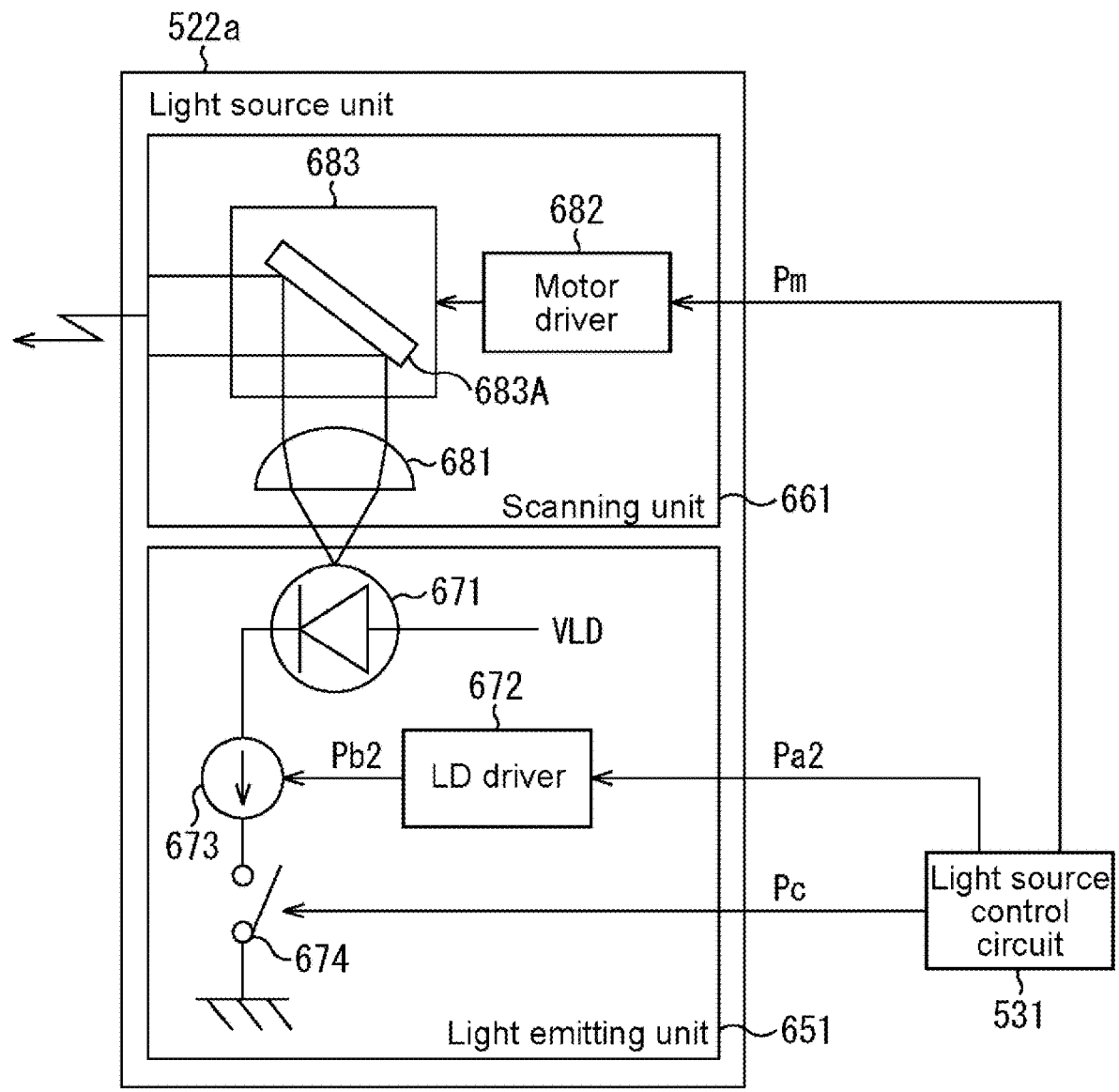
FIG. 30 is a circuit diagram illustrating a modification example of the light source unit illustrated in FIG. 26.

FIG. 30 illustrates an example of the configuration of a mirror-scanning-type light source unit 522a which is a modification example of the light source unit 522.

The light source unit 522a includes a light emitting unit 651 and a scanning unit 661.

The light emitting unit 651 includes a light emitting element 671, an LD driver 672, a current source 673, and a switch 674.

The light emitting element 671 is an LD. The light emitting element 671 has an anode to which a voltage VLD is supplied and a cathode connected to one end of the current source 673. The other end of the current source 673 is grounded through the switch 674.

The LD driver 672 supplies the control signal Pb2 to the current source 673 on the basis of the control signal Pa2 from the light source control circuit 531 to drive the current source 673.

The current source 673 is, for example, a MOS transistor and supplies a current with a predetermined value.

The switch 674 is, for example, a MOS transistor and is turned on and off on the basis of the control signal Pc from the light source control circuit 531.

The scanning unit 661 includes an LD lens 681, a motor driver 682, and a scanner 683.

The LD lens 681 converts the light for measurement emitted from the light emitting element 671 into parallel light such that the parallel light is incident on the scanner 683.

The motor driver 682 drives a mirror 683A of the scanner 683 in a two-dimensional direction in response to a control signal Pm supplied from the light source control circuit 531.

The light for measurement emitted from the light emitting element 671 is converted into parallel light by the LD lens 681 and is incident on the mirror 683A of the scanner 683. Then, in a case in which the mirror 683A is driven in the two-dimensional direction by the motor driver 682, scanning is performed in the two-dimensional direction with the emitted light for measurement reflected from the mirror 683A. That is, the light source unit 522a can perform two-dimensional scanning with the emitted light for measurement.

<Modification Example of Distance Measurement Module 511>

Next, a modification example of the distance measurement module 511 will be described with reference to FIGS. 31 to 34.

Figure 31:
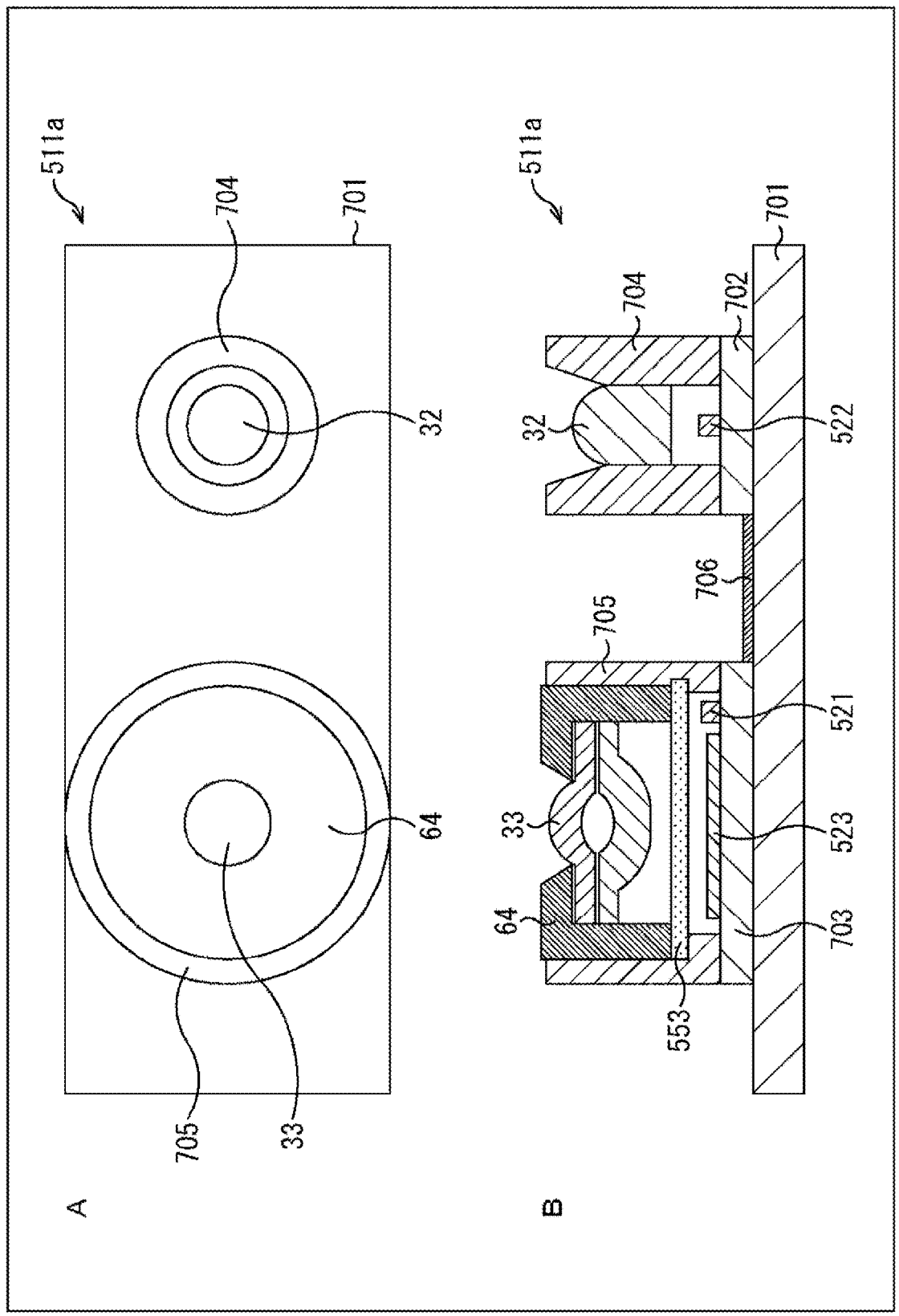
FIG. 31 is a diagram illustrating a first modification example of the distance measurement module illustrated in FIG. 27.

FIG. 31 schematically illustrates an example of the configuration of the cross section of a distance measurement module 511a which is a first modification example of the distance measurement module 511. Note that, in FIG. 31, portions corresponding to those of the distance measurement module 511 illustrated in FIG. 27 are denoted by the same reference numerals and the description thereof will be appropriately omitted.

The distance measurement module 511a differs from the distance measurement module 511 in that substrates 701 to 703 and lens holders 704 and 705 are provided instead of the substrate 551 and the lens holder 552 and an anti-reflection film 706 is added. According to some embodiments, the anti-reflection film 706 (and any other examples of an anti-reflection film described herein) may comprise a film produced by forming a multilayer coating (e.g., layers of magnesium fluoride) on silicon; a film comprising a black sponge material and/or black urethane; a film comprise a black plastic sheet; or combinations thereof.

The substrate 702 and the substrate 703 are provided on a mounting surface of the substrate 701 at a predetermined gap therebetween.

The light source unit 522 and the lens holder 704 are mounted on a mounting surface of the substrate 702. The light source unit 522 is provided substantially at the center of a circular opening portion of the lens holder 704 for mounting the light source lens 32, is surrounded by the lens holder 704, and is shielded and separated from the surroundings.

The light source lens 32 is attached to (supported by) the lens holder 704 and is provided above the light source unit 522. The optical axis of the light source unit 522 is aligned with the optical axis of the light source lens 32.

The light source unit 521, the distance measurement sensor 523, and the lens holder 705 are mounted on a mounting surface of the substrate 703. The light source unit 521 and the distance measurement sensor 523 are provided on the mounting surface of the substrate 703 with a predetermined gap therebetween, are surrounded by the lens holder 705, and are shielded and separated from the surroundings.

The cover glass 553 is attached to (supported by) the lens holder 705. The cover glass 553 faces the mounting surface of the substrate 703 and is provided in parallel to the mounting surface of the substrate 703. In addition, the cover glass 553 is provided above the light source unit 521 and the distance measurement sensor 523 (on the side where light for reference is emitted from the light source unit 521) with a gap therebetween and covers all of the light source unit 521 and (the light receiving unit 43 of) the distance measurement sensor 523.

A space including the light source unit 521 and the distance measurement sensor 523 between the mounting surface of the substrate 703 and the reflecting surface of the cover glass 553 is sealed by, for example, the lens holder 705 and a resin. Therefore, for example, dust or dirt is prevented from getting into the space in which the light source unit 521 and the distance measurement sensor 523 are present. In addition, for example, the space is filled with air or nitrogen or is vacuous, if necessary.

The lens barrel 64 is attached to (supported by) the lens holder 705 and is provided above the distance measurement sensor 523 on the incident surface of the cover glass 553. In addition, the imaging lens 33 is attached to (supported by) the lens barrel 64 and is provided above the distance measurement sensor 523.

The anti-reflection film 706 is provided between the substrate 702 and the substrate 703 on the mounting surface of the substrate 701.

Part of the light for reference emitted from the light source unit 521 is reflected from the cover glass 553 and part of the reference light which is the reflected light is incident on the light receiving unit 43 of the distance measurement sensor 523.

In contrast, part of the light for measurement emitted from the light source unit 522 is transmitted through the light source lens 32 and the object 12 is irradiated with the light. Then, part of the measurement light which is light reflected from the object 12 is focused on the light receiving surface of the light receiving unit 43 of the distance measurement sensor 523 by the imaging lens 33.

Figure 32:
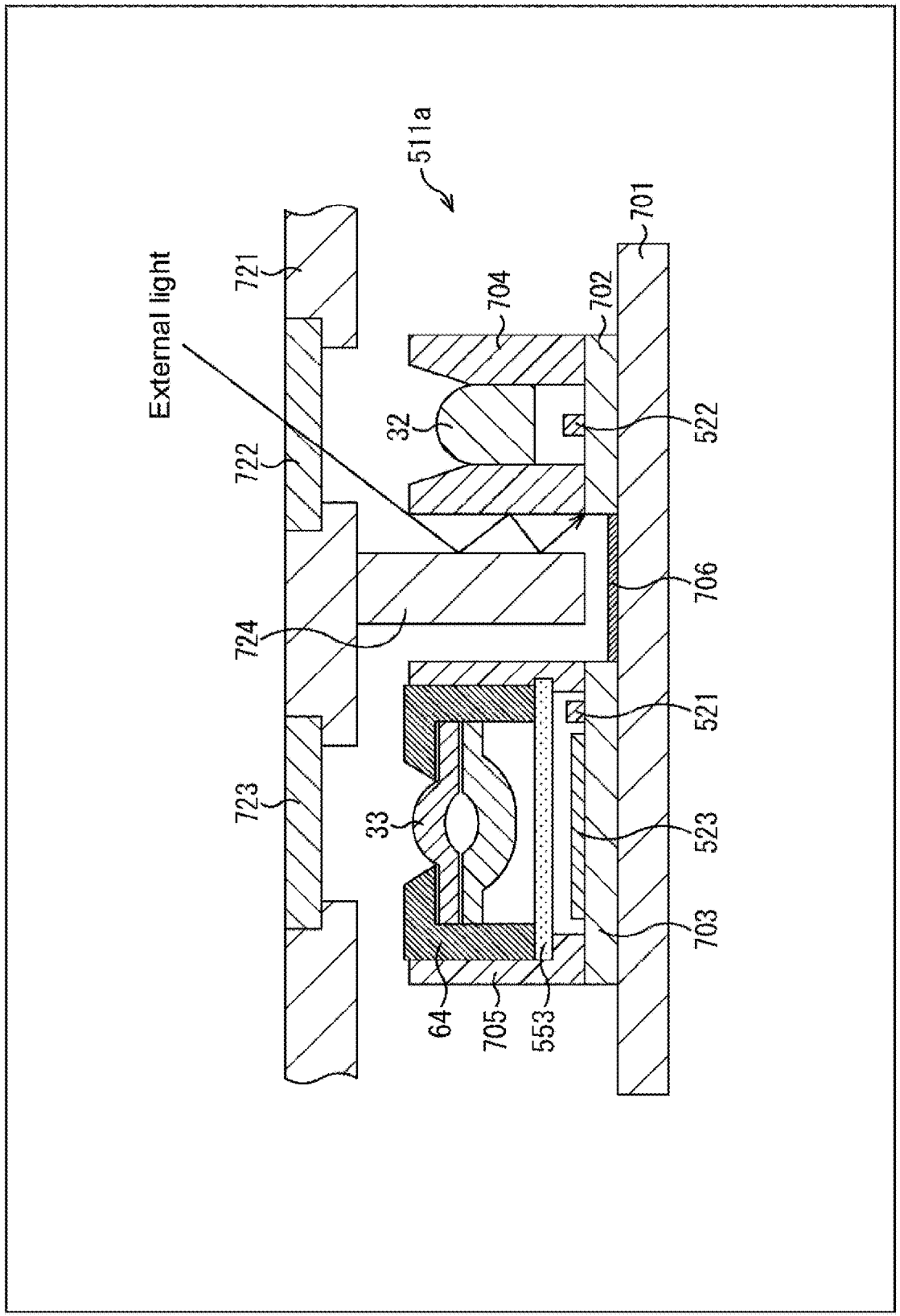
FIG. 32 is a diagram illustrating an example in which the distance measurement module illustrated in FIG. 31 is incorporated into an electronic apparatus.

FIG. 32 schematically illustrates an example of the configuration of the cross section of the distance measurement module 511a in a case in which the distance measurement module 511a is provided in a housing of the electronic apparatus 501.

The housing of the electronic apparatus 501 includes a case 721, a cover glass 722, a cover glass 723, and a light shielding wall 724.

The case 721 surrounds the distance measurement module 511a. In addition, the cover glass 722 and the cover glass 723 are attached to (supported by) the case 721. The cover glass 722 is provided above the light source lens 32. The light for measurement emitted from the light source unit 522 is transmitted through the cover glass 722 and is emitted to the outside of the case 721. The cover glass 723 is provided above the imaging lens 33. The measurement light reflected from the object 12 is transmitted through the cover glass 723, the imaging lens 33, and the cover glass 553 and is incident on the distance measurement sensor 523.

In addition, the light shielding wall 724 is formed on an inner surface of the case 721 such that it is perpendicular to the inner surface and the lens holder 704 and the lens holder 705 are shielded and separated by the light shielding wall 724.

The light shielding wall 724 prevents external light incident into the case 721 through the cover glass 722 from being incident on the distance measurement sensor 523. In addition, the anti-reflection film 706 prevents the external light incident into the case 721 through the cover glass 722 from being reflected from the substrate 701 and being incident on the distance measurement sensor 523. Therefore, background light is prevented from being incident on the light receiving unit 43 of the distance measurement sensor 523 and the accuracy of detecting the reference light and the measurement light is improved. Note that the light shielding structure is not limited to the light shielding wall 724 and may be provided in the distance measurement module or the electronic apparatus.

Figure 33:
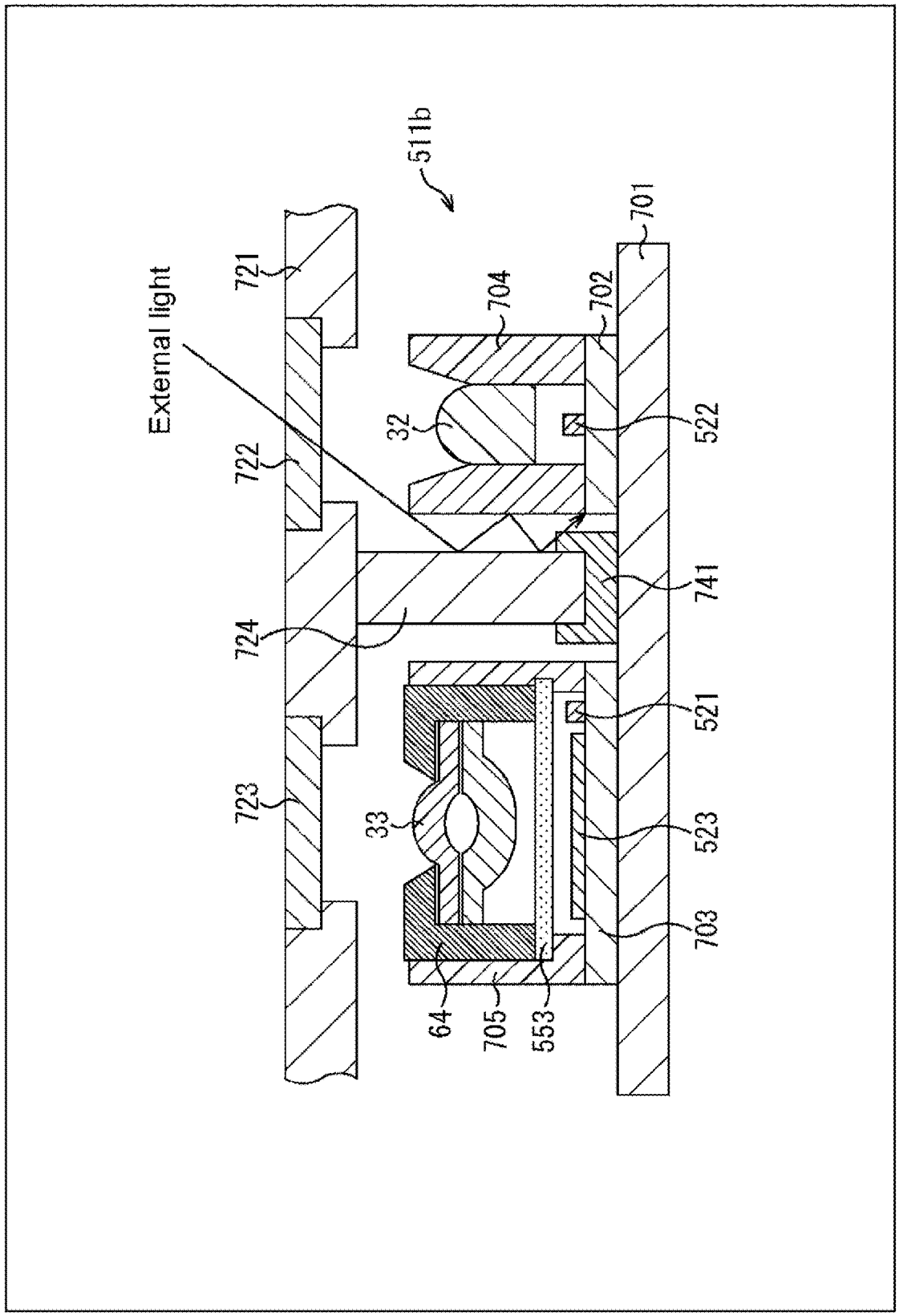
FIG. 33 is a diagram illustrating an example in which a second modification example of the distance measurement module illustrated in FIG. 27 is incorporated into an electronic apparatus.

FIG. 33 schematically illustrates an example of the configuration of the cross section of a distance measurement module 511b which is a second modification example of the distance measurement module 511. Note that, in FIG. 33, portions corresponding to those of the distance measurement module 511a illustrated in FIG. 32 are denoted by the same reference numerals and the description thereof will be appropriately omitted.

The distance measurement module 511b differs from the distance measurement module 511a in that a light shielding cushion member 741 is provided instead of the anti-reflection film 706. According to some embodiments, the light shielding cushion member 741 (and any other examples of a light shielding cushion member described herein) may comprise a black sponge material and/or a black urethane.

The light shielding cushion member 741 is mounted between the substrate 702 and the substrate 703 on the mounting surface of the substrate 701 at a position matched with the position of the light shielding wall 724. In a case in which the distance measurement module 511b is accommodated in the case 721, a lower end of the light shielding wall 724 comes into contact with the light shielding cushion member 741. Therefore, the lens holder 704 and the lens holder 705 are completely shielded and separated by the light shielding wall 724 and the light shielding cushion member 741. External light incident into the case 721 through the cover glass 722 is reliably prevented from being incident on the distance measurement sensor 523.

Figure 34:
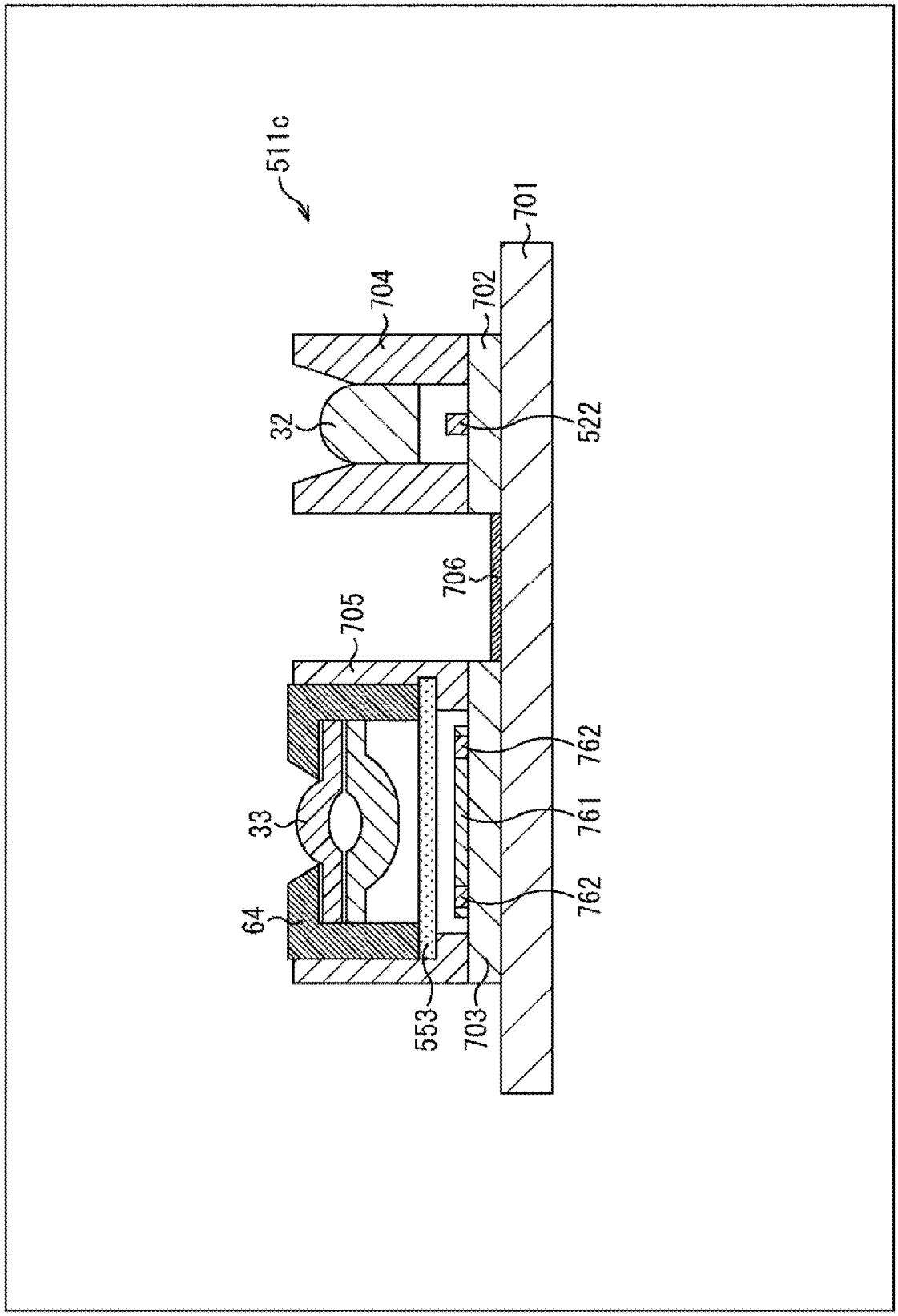
FIG. 34 is a diagram illustrating a third modification example of the distance measurement module illustrated in FIG. 27.

FIG. 34 schematically illustrates an example of the configuration of the cross section of a distance measurement module 511c which is a third modification example of the distance measurement module 511. Note that, in FIG. 34, portions corresponding to those of the distance measurement module 511a illustrated in FIG. 31 are denoted by the same reference numerals and the description thereof will be appropriately omitted.

The distance measurement module 511c differs from the distance measurement module 511a in that a distance measurement sensor 761 is provided instead of the distance measurement sensor 523.

The distance measurement sensor 761 has the same function as the distance measurement sensor 523 and differs from the distance measurement sensor 523 in that it includes a light source unit 762. That is, the distance measurement sensor 761 and the light source unit 762 are integrated.

The light source unit 762 is provided, for example, around the light receiving unit 43 (not illustrated) of the distance measurement sensor 761. Note that the number of light source units 762 is not particularly limited and may be set to any value. For example, four light source units 762 are provided in the vicinity of four corners of the light receiving unit 43 or in the vicinity of four corners of a chip forming the distance measurement sensor 761.

With this configuration, the light receiving unit of the distance measurement sensor 761 and the light source unit 762 become closer to each other and the light receiving unit 43 receives a larger amount of reference light which is the reflected light of the light for reference emitted from the light source unit 762. As a result, the accuracy of detecting the reference light is improved. Alternatively, for example, it is possible to reduce the amount of emitted light for reference.

Note that, for example, a thin light shielding film may be used as the light shielding walls 724 illustrated in FIG. 32 and FIG. 33. In this case, the gap between the substrate 702 and the lens holder 704, and the substrate 703 and the lens holder 705 can be set to, for example, about 0.1 mm to 3 mm. In this case, it is possible to reduce the size of the distance measurement module 511a and the distance measurement module 511b.

It will be appreciated that, in the examples of FIGS. 31, 32, 33 and 34, either or both of the substrates 702 and 703 on which the light source unit 522 and distance measurement sensor 523, respectively, are disposed, may be omitted in some embodiments. For instance, the light source unit 522 may be disposed directly on substrate 701, and/or the light source unit 521 and distance measurement sensor 523 may be disposed directly on substrate 701.

5. Third Embodiment

Next, a third embodiment of the present technology will be described with reference to FIGS. 35 and 36.

<Example of Configuration of Distance Measurement Module 801>

Figure 35:
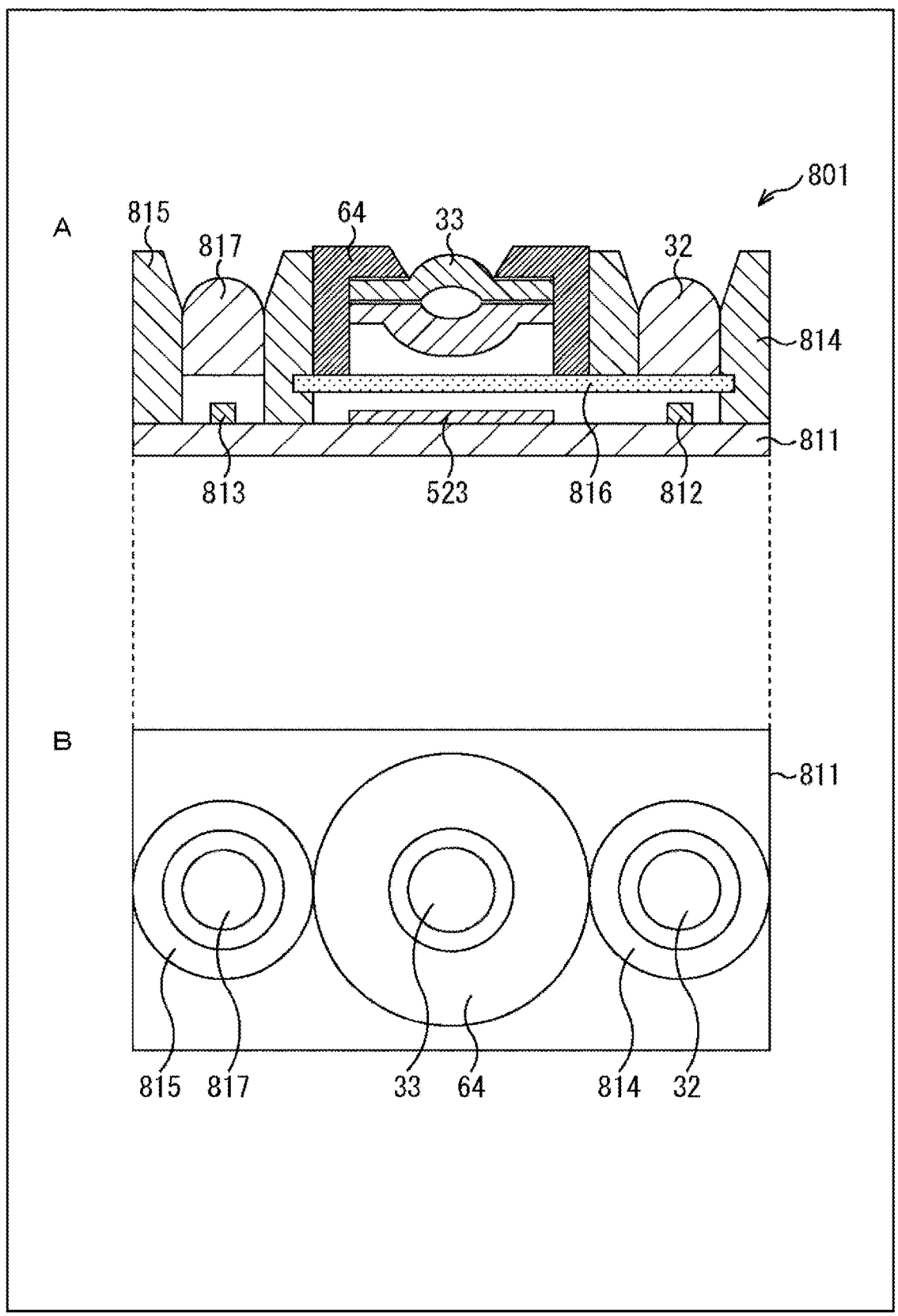
FIG. 35 is a cross-sectional view schematically illustrating an example of the configuration of a distance measurement module according to a third embodiment of the present technology.

FIG. 35 is a diagram illustrating an example of the configuration of a distance measurement module 801 according to the third embodiment of the present technology. A of FIG. 35 is a cross-sectional view schematically illustrating the distance measurement module 801 and B of FIG. 35 is a plan view schematically illustrating the distance measurement module 801. Note that, in FIG. 35, portions corresponding to those of the distance measurement module 511 illustrated in FIG. 27 are denoted by the same reference numerals and the description thereof will be appropriately omitted.

The distance measurement module 801 differs from the distance measurement module 511 in that a light source unit 812, a light source unit 813, a substrate 811, a lens holder 814, and a cover glass 816 are provided instead of the light source unit 521, the light source unit 522, the substrate 551, the lens holder 552, and the cover glass 553 and a lens holder 815 and a light source lens 817 are added.

Similarly to the substrate 551 of the distance measurement module 511, a printed wiring board or a printed circuit board is used as the substrate 811. The distance measurement sensor 523, the light source unit 812, the light source unit 813, the lens holder 814, and the lens holder 815 are mounted on a mounting surface of the substrate 811. The distance measurement sensor 523 is provided between the light source unit 812 and the light source unit 813 with a predetermined gap from the light source unit 812 and the light source unit 813.

The light source unit 812 includes a wide-angle light source having a wider light emission angle (for example, about 60 degrees) than the light source unit 813. The light source unit 812 is provided substantially at the center of a circular opening portion of the lens holder 814 for mounting the light source lens 32. The distance measurement sensor 523 and the light source unit 812 are not blocked by the lens holder 814 and are spatially connected to each other.

The light source unit 813 includes a narrow-angle light source having a narrower light emission angle (for example, about 20 degrees) than the light source unit 812. The light source unit 813 is provided substantially at the center of a circular opening portion of the lens holder 815 for mounting the light source lens 817. The light source unit 813 is surrounded by the lens holder 815 and the distance measurement sensor 523 and the light source unit 813 are shielded and separated by the lens holder 815.

The same cover glass 816 as the cover glass 553 illustrated in FIG. 27 is attached to (supported by) the lens holder 814. The cover glass 816 faces the mounting surface of the substrate 811 and is provided in parallel to the mounting surface of the substrate 811. In addition, the cover glass 816 is provided above the light source unit 812 and the distance measurement sensor 523 (on the side where light is emitted from the light source unit 812) with a gap therebetween and covers all of the light source unit 812 and (the light receiving unit 43 of) the distance measurement sensor 523.

A space including the light source unit 812 and the distance measurement sensor 523 between the mounting surface of the substrate 811 and a reflecting surface of the cover glass 816 which faces the mounting surface of the substrate 811 is sealed by, for example, the lens holder 814 and a resin. Therefore, for example, dust or dirt is prevented from getting into the space in which the light source unit 812 and the distance measurement sensor 523 are present. In addition, for example, the space is filled with air or nitrogen or is vacuous, if necessary.

The light source lens 32 is attached to (supported by) the lens holder 814 and is provided above the light source unit 812 on the incident surface of the cover glass 816. The optical axis of the light source unit 812 is aligned with the optical axis of the light source lens 32.

The lens barrel 64 is attached to (supported by) the lens holder 814 and is provided above the distance measurement sensor 523 on the incident surface of the cover glass 816. In addition, the imaging lens 33 is attached to (supported by) the lens barrel 64 and is provided above the distance measurement sensor 523.

The light source lens 817 is attached to (supported by) the lens holder 815 and is provided above the light source unit 813. The optical axis of the light source unit 813 is aligned with the optical axis of the light source lens 817.

Part of the light (hereinafter, referred to as wide-angle light) emitted from the light source unit 812 is reflected from a reflecting surface of the cover glass 816 and part of the reference light which is the reflected light is incident on the light receiving unit 43 of the distance measurement sensor 523. In addition, part of the wide-angle emitted light is transmitted through the cover glass 816 and the light source lens 32 and is emitted to the outside and the object 12 (not illustrated) is irradiated with the light. The imaging lens 33 focuses part of the measurement light (hereinafter, referred to as wide-angle measurement light) which is light obtained by the reflection of the wide-angle emitted light from the object 12 on the light receiving surface of the light receiving unit 43 of the distance measurement sensor 523.

Part of the light (hereinafter, referred to as narrow-angle light) emitted from the light source unit 813 is transmitted through the light source lens 817 and is emitted to the outside and the object 12 (not illustrated) is irradiated with the light. The imaging lens 33 focuses part of the measurement light (hereinafter, referred to as narrow-angle measurement light) which is light obtained by the reflection of the narrow-angle emitted light from the object 12 on the light receiving surface of the light receiving unit 43 of the distance measurement sensor 523.

Figure 36:
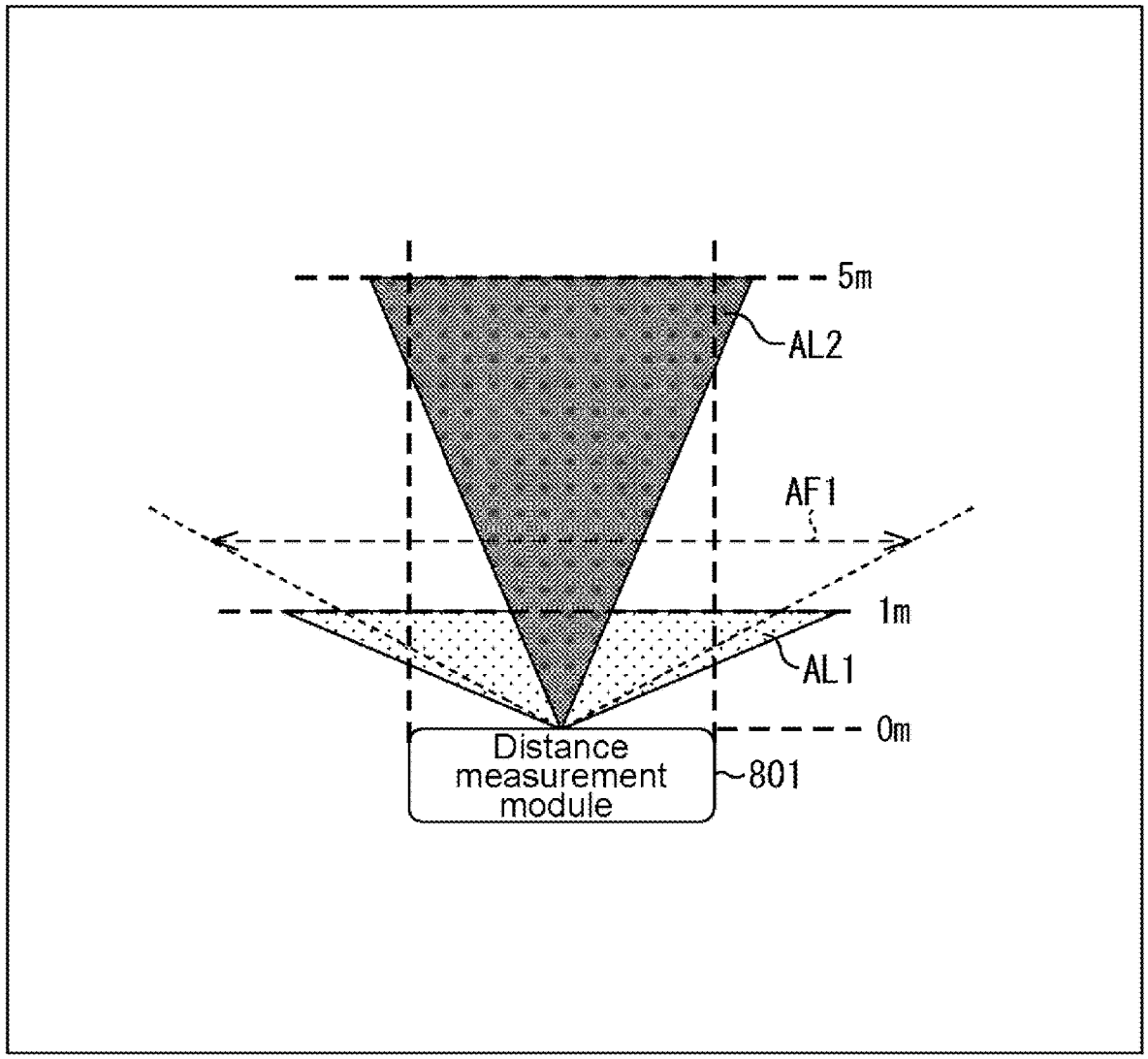
FIG. 36 is a diagram illustrating an example of an emission range of emitted light for measurement.

FIG. 36 illustrates an example of the emission range of the wide-angle emitted light and the narrow-angle emitted light in the horizontal direction (width direction (lateral direction) and a distance direction (depth direction)). Specifically, an emission range AL1 indicates an example of the emission range of the wide-angle emitted light and an emission range AL2 indicates an example of the emission range of the narrow-angle emitted light. In addition, a dotted arrow AF1 indicates the angle of view of the imaging lens 33.

The emission angle of the wide-angle emitted light is wider than the emission angle of the narrow-angle emitted light. However, the amount of diffusion of the wide-angle emitted light is increased by the difference in the emission angle and the emission distance of the wide-angle emitted light is reduced. Therefore, the emission range AL1 is wider than the emission range AL2 in the width direction and is shorter than the emission range AL2 in the distance direction.

Therefore, for example, the wide-angle emitted light and the narrow-angle emitted light are differently used according to the distance (distance measurement range) to the object which is a measurement target.

For example, in a case in which the distance measurement range is equal to or less than 1 m, the wide-angle emitted light is used. In contrast, in a case in which the distance measurement range is from 1 m to 5 m, the narrow-angle emitted light is used. Note that, for example, the wide-angle emitted light and the narrow-angle emitted light may be used at the same time or may be differently used according to the purpose of use.

For example, the distance measurement module 801 is used to achieve a collision prevention function in a self-propelled robot or an automatic transport vehicle that automatically transports baggage.

For example, the use of the wide-angle emitted light makes it possible to detect the distance to the object in a wider range in the width direction. Therefore, for example, it is possible to avoid the collision or contact of the side of an apparatus using the distance measurement module 801 with a moving body or the collision or contact of an apparatus with the surrounding objects in a case in which the apparatus is rotated.

In contrast, the use of the narrow-angle emitted light makes it possible to detect the distance to an object that is further away in the traveling direction. Therefore, for example, it is possible to avoid the collision or contact of the apparatus using the distance measurement module 801 with objects in the traveling direction.

As such, since the light source unit 812 and the light source unit 813 with different emission ranges (emission angles and emission distances) are used, it is possible to easily extend the distance measurement range in the width direction and the distance direction. In addition, since the light source unit 812 and the light source unit 813 are differently used according to the purpose of use, it is possible to prevent an increase in power consumption or to reduce the amount of heat generated from the distance measurement module 801.

6. Fourth Embodiment

Next, a fourth embodiment of the present technology will be described with reference to FIGS. 37 to 39.
<Example of Configuration of Distance Measurement Module 901>

Figure 37:
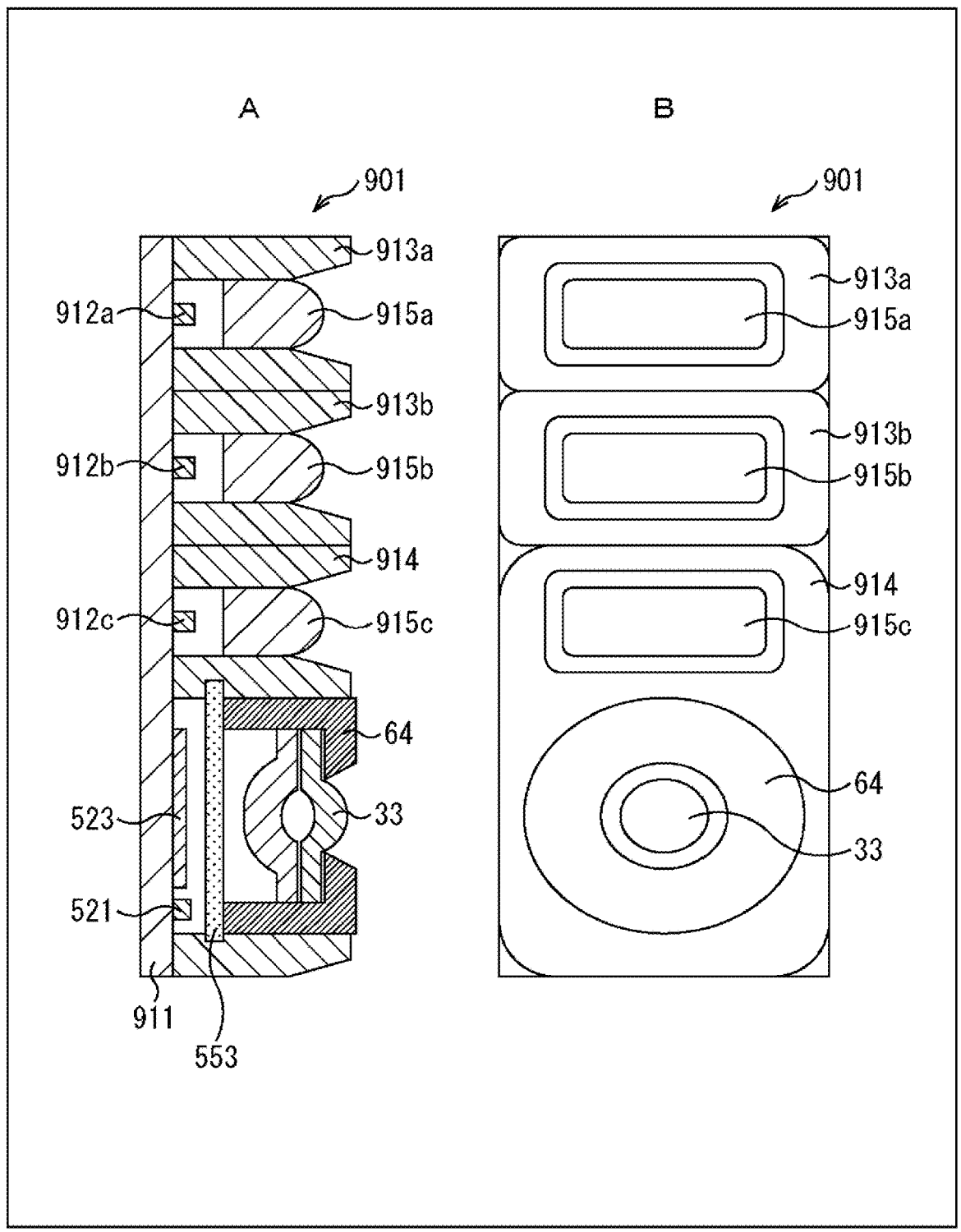
FIG. 37 is a cross-sectional view schematically illustrating an example of the configuration of a distance measurement module according to a fourth embodiment of the present technology.

FIG. 37 is a diagram illustrating an example of the configuration of a distance measurement module 901 according to the fourth embodiment of the present technology. A of FIG. 37 is a cross-sectional view schematically illustrating the distance measurement module 901 and B of FIG. 37 is a plan view schematically illustrating the distance measurement module 901. Note that, in FIG. 37, portions corresponding to those of the distance measurement module 511 illustrated in FIG. 27 are denoted by the same reference numerals and the description thereof will be appropriately omitted.

The distance measurement module 901 differs from the distance measurement module 511 in that light source units 912a to 912c, a substrate 911, a lens holder 913a, a lens holder 913b, a lens holder 914, and light source lenses 915a to 915c are provided instead of the light source unit 522, the substrate 551, the lens holder 552, and the light source lens 32.

Similarly to the substrate 551 of the distance measurement module 511, a printed wiring board or a printed circuit board is used as the substrate 911. The light source unit 521, the distance measurement sensor 523, the light source units 912a to 912c, the lens holder 913a, the lens holder 913b, and the lens holder 914 are mounted on a mounting surface of the substrate 911. The light source units 912a to 912c, the distance measurement sensor 523, and the light source unit 521 are arranged in a substantially straight line. The gap between the light source unit 912a and the light source unit 912b, the gap between the light source unit 912b and the light source unit 912c, and the gap between the light source unit 912c and the distance measurement sensor 523 are substantially equal to each other. The gap between the distance measurement sensor 523 and the light source unit 521 is less than the other gaps.

The light source units 912a to 912c have the same configuration as, for example, the light source unit 522a illustrated in FIG. 30 and can perform scanning with the emitted light for measurement in the two-dimensional direction. In contrast, the light source units 912a to 912c are different from each other in the emission range of the emitted light for measurement, particularly, the emission distance. Specifically, the light source unit 912c has the longest emission distance of the emitted light for measurement, followed by the light source unit 912b and the light source unit 912a in this order.

The light source unit 912a is provided substantially at the center of a rectangular opening portion of the lens holder 913a for mounting the light source lens 915a. The light source unit 912a is surrounded by the lens holder 913a and is shielded and separated from the surroundings.

The light source lens 915a is attached to (supported by) the lens holder 913a and is provided above the light source unit 912a. The optical axis of the light source unit 912a is aligned with the optical axis of the light source lens 915a.

The light source unit 912b is provided substantially at the center of a rectangular opening portion of the lens holder 913b for mounting the light source lens 915b. The light source unit 912b is surrounded by the lens holder 913b and is shielded and separated from the surroundings.

The light source lens 915b is attached to (supported by) the lens holder 913b and is provided above the light source unit 912b. The optical axis of the light source unit 912b is aligned with the optical axis of the light source lens 915b.

The light source unit 912c is provided substantially at the center of a rectangular opening portion of the lens holder 914 for mounting the light source lens 915c. The light source unit 912c is surrounded by the lens holder 914 and is shielded and separated from the surroundings.

The light source lens 915c is attached to (supported by) the lens holder 914 and is provided above the light source unit 912c. The optical axis of the light source unit 912c is aligned with the optical axis of the light source lens 915c.

The cover glass 553 is attached to (supported by) the lens holder 914. The cover glass 553 faces the mounting surface of the substrate 911 and is provided in parallel to the mounting surface of the substrate 911. In addition, the cover glass 553 is provided above the light source unit 521 and the distance measurement sensor 523 (on the side where the light for reference is emitted from the light source unit 521) with a gap therebetween and covers all of the light source unit 521 and (the light receiving unit 43 of) the distance measurement sensor 523.

A space including the light source unit 521 and the distance measurement sensor 523 between the mounting surface of the substrate 911 and the reflecting surface of the cover glass 553 is sealed by, for example, the lens holder 914 and a resin. Therefore, for example, dust or dirt is prevented from getting into the space in which the light source unit 521 and the distance measurement sensor 523 are present. In addition, for example, the space is filled with air or nitrogen or is vacuous, if necessary.

The lens barrel 64 is attached to (supported by) the lens holder 914 and is provided above the distance measurement sensor 523 on the incident surface of the cover glass 553. In addition, the imaging lens 33 is attached to (supported by) the lens barrel 64 and is provided above the distance measurement sensor 523.

Part of the light for reference emitted from the light source unit 521 is reflected from the reflecting surface of the cover glass 553 and part of the reference light which is the reflected light is incident on the light receiving unit 43 of the distance measurement sensor 523.

Part of the light for measurement (hereinafter, referred to as long-range light) emitted from the light source unit 912a is transmitted through the light source lens 915a and is emitted to the outside and the object 12 (not illustrated) is irradiated with the light. The imaging lens 33 focuses part of the measurement light (hereinafter, referred to as long-range measurement light) which is light obtained by the reflection of the long-range emitted light from the object 12 on the light receiving surface of the light receiving unit 43 of the distance measurement sensor 523.

Part of the light for measurement (hereinafter, referred to as intermediate-range light) emitted from the light source unit 912b is transmitted through the light source lens 915b and is emitted to the outside and the object 12 is irradiated with the light. The imaging lens 33 focuses part of the measurement light (hereinafter, referred to as intermediate-range measurement light) which is light obtained by the reflection of the intermediate-range emitted light from the object 12 on the light receiving surface of the light receiving unit 43 of the distance measurement sensor 523.

Part of the light for measurement (hereinafter, referred to as short-range light) emitted from the light source unit 912c is transmitted through the light source lens 915c and is emitted to the outside and the object 12 is irradiated with the light. The imaging lens 33 focuses part of the measurement light (hereinafter, referred to as short-range measurement light) which is light obtained by the reflection of the short-range emitted light from the object 12 on the light receiving surface of the light receiving unit 43 of the distance measurement sensor 523.

Here, a case in which the distance measurement module 901 performs imaging in a forward and obliquely downward direction and measures the distance will be described with reference to FIGS. 38 and 39.

Figure 38:
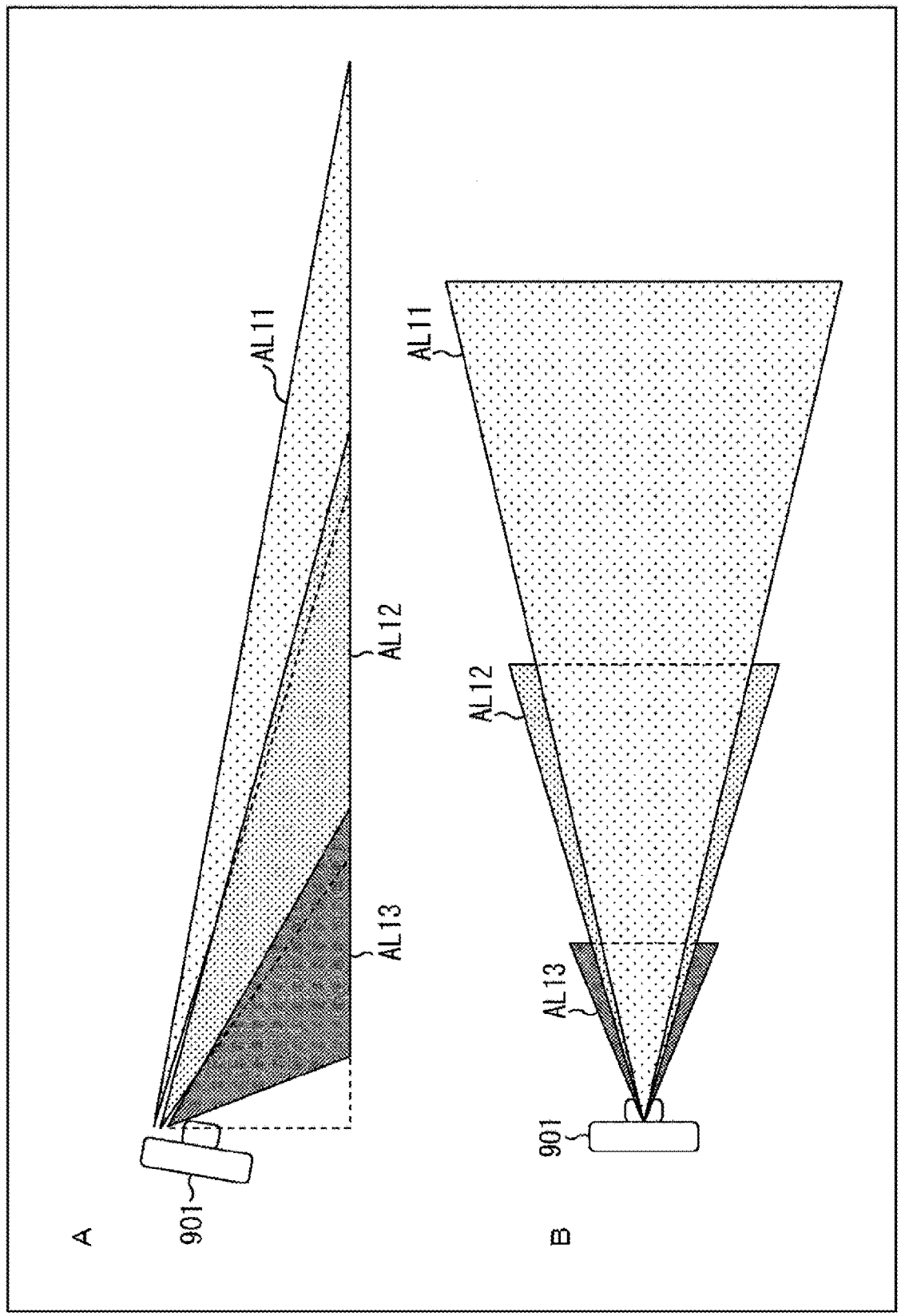
FIG. 38 is a diagram illustrating an example of an emission range of emitted light for measurement.

FIG. 38 illustrates an example of the emission range of the long-range emitted light, the intermediate-range emitted light, and the short-range emitted light. Specifically, an emission range AL11 indicates an example of the emission range of the long-range emitted light, an emission range AL12 indicates an example of the emission range of the intermediate-range emitted light, and an emission range AL13 indicates an example of the emission range of the short-range emitted light. A of FIG. 38 illustrates an example of the emission range of each emitted light component in the vertical direction (a height direction and a distance direction) and B of FIG. 38 illustrates an example of the emission range of each emitted light component in the horizontal direction.

As illustrated in A of FIG. 38, each emitted light component is emitted in the forward and obliquely downward direction. In contrast, the short-range emitted light has the largest emission angle with respect to the ground, followed by the intermediate-range emitted light and the long-range emitted light in this order. That is, the long-range emitted light is emitted in a direction closer to the horizontal direction than the other emitted light components and the short-range emitted light is emitted in a direction closer to the vertical direction than the other emitted light components. Therefore, the emission distance of the long-range emitted light is longer than that of the other emitted light components and the emission distance of the short-range emitted light is shorter than that of the other emitted light components.

In contrast, as illustrated in B of FIG. 38, the emission angles of the emitted light components in the width direction are substantially equal to each other.

Figure 39:
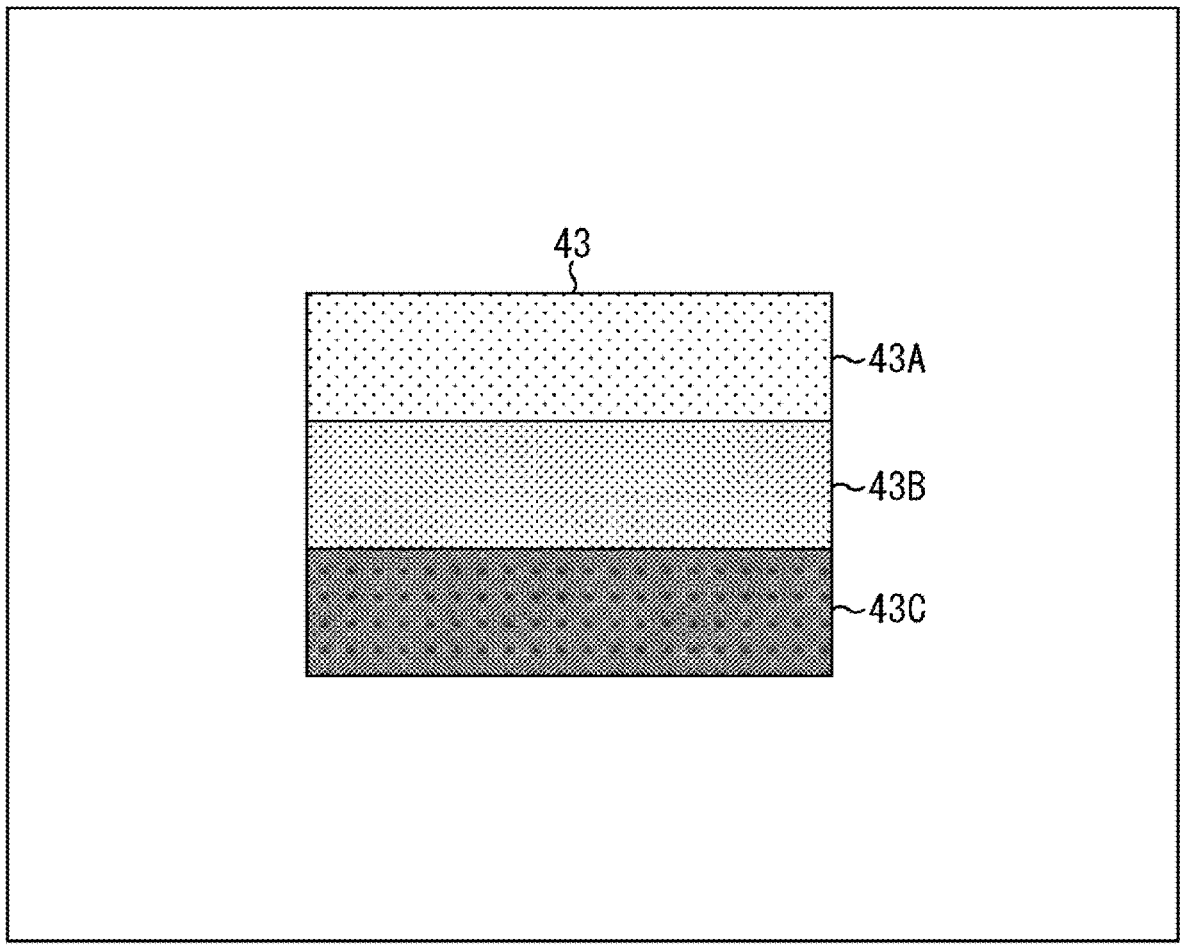
FIG. 39 is a diagram illustrating an example of the emission range of emitted light for measurement.

FIG. 39 illustrates an example of the range of the measurement light incident on the light receiving unit 43. In this example, the light receiving unit 43 is divided into three regions 43A to 43C in the vertical direction (up-down direction).

For example, the long-range measurement light which is the reflected light of the long-range emitted light is mainly incident on the uppermost region 43A. The intermediate-range measurement light which is the reflected light of the intermediate-range emitted light is mainly incident on the middle region 43B. The short-range measurement light which is the reflected light of the short-range emitted light is mainly incident on the lowest region 43C.

Here, in a case in which the amounts of emitted light components are equal to each other, the amounts of measurement light components satisfy the following relationship if only the attenuation of each emitted light component is considered and the reflection of the object is not considered: the amount of long-range measurement light< the amount of intermediate-range measurement light< the amount of short-range measurement light.

Here, in a case in which the amount of each emitted light component is increased in order to improve the accuracy of detecting the distance to the object that is further away, the amount of short-range measurement light increases and the pixel P in the region 43C of the light receiving unit 43 is likely to be saturated. In contrast, in a case in which the amount of each emitted light component is reduced in order to prevent the saturation of the pixel P in the region 43C of the light receiving unit 43, the amount of long-range measurement light is reduced and the accuracy of detecting the distance to the object that is far away is reduced.

For this reason, it is desirable that the amounts of emitted light components are set to satisfy the following relationship: the amount of long-range emitted light> the amount of intermediate-range emitted light> the amount of short-range emitted light.

As described above, the use of the light source units 912a to 912c with different emission ranges makes it possible to easily extend the distance measurement range in the distance direction. In addition, the type or number of light source units for measurement light can be increased to further extend the distance measurement range in the distance direction.

Note that, for example, the long-range emitted light, the intermediate-range emitted light, and the short-range emitted light may be used at the same time or may be differently used according to the purpose of use. In addition, since the emitted light components are differently used according to the purpose of use, it is possible to prevent an increase in power consumption or to reduce the amount of heat generated from the distance measurement module 901.

In addition, for example, the light receiving unit 43 is operated in the units of rows, the light source units 912a to 912c used according to an operation region of the light receiving unit are switched to control the emitted light, which makes it possible to further reduce power consumption and the amount of heat generated from the distance measurement module 901.

7. Fifth Embodiment

Next, a fifth embodiment of the present technology will be described with reference to FIGS. 40 and 41.

<Example of Configuration of Distance Measurement Module 1001>

Figure 40:
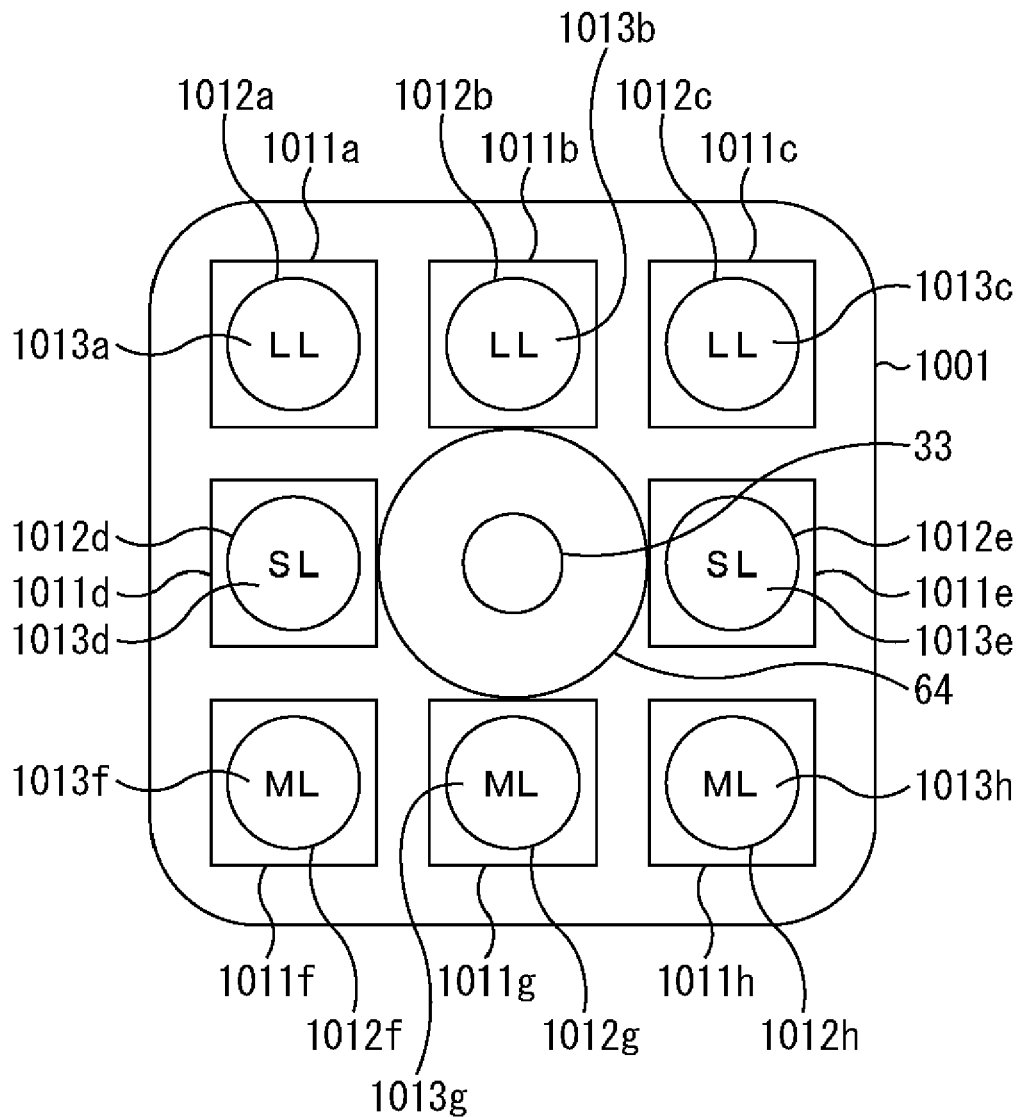
FIG. 40 is a cross-sectional view schematically illustrating an example of the configuration of a distance measurement module according to a fifth embodiment of the present technology.

FIG. 40 is a plan view schematically illustrating the imaging side of a distance measurement module 1001 according to the fifth embodiment of the present technology. Note that, in FIG. 40, portions corresponding to those of the distance measurement module 901 illustrated in FIG. 37 are denoted by the same reference numerals and the description thereof will be appropriately omitted. In this embodiment, an example of the configuration in which a plurality of circular emitted light sources are used instead of the linear emitted light sources in the fourth embodiment illustrated in FIG. 37 is illustrated.

The distance measurement module 1001 differs from the distance measurement module 901 in the number and arrangement of light source units for measurement light.

Specifically, in the distance measurement module 1001, eight light source units for measurement light, that is, light source units 1013a to 1013h (not illustrated) are arranged around the lens barrel 64 in a square shape. The light source units 1013a to 1013h have the same configuration as, for example, the light source unit 522 illustrated in FIG. 28 or the light source unit 522a illustrated in FIG. 30.

In addition, lens holders 1011a to 1011h and light source lenses 1012a to 1012h are provided so as to correspond to the light source units 1013a to 1013h, respectively.

In FIG. 40, the lens holder 1011a is provided on the upper left side of the lens barrel 64 and the light source lens 1012a is attached to (supported by) the lens holder 1011a. The light source unit 1013a is provided behind the light source lens 1012a and the optical axis of the light source unit 1013a is aligned with the optical axis of the light source lens 1012a.

In FIG. 40, the lens holder 1011b is provided on the upper side of the lens barrel 64 and the light source lens 1012b is attached to (supported by) the lens holder 1011b. The light source unit 1013b is provided behind the light source lens 1012b and the optical axis of the light source unit 1013b is aligned with the optical axis of the light source lens 1012b.

In FIG. 40, the lens holder 1011c is provided on the upper right side of the lens barrel 64 and the light source lens 1012c is attached to (supported by) the lens holder 1011c. The light source unit 1013c is provided behind the light source lens 1012c and the optical axis of the light source unit 1013c is aligned with the optical axis of the light source lens 1012c.

In FIG. 40, the lens holder 1011d is provided on the left side of the lens barrel 64 and the light source lens 1012d is attached to (supported by) the lens holder 1011d. The light source unit 1013d is provided behind the light source lens 1012d and the optical axis of the light source unit 1013d is aligned with the optical axis of the light source lens 1012d.

In FIG. 40, the lens holder 1011e is provided on the right side of the lens barrel 64 and the light source lens 1012e is attached to (supported by) the lens holder 1011e. The light source unit 1013e is provided behind the light source lens 1012e and the optical axis of the light source unit 1013e is aligned with the optical axis of the light source lens 1012e.

In FIG. 40, the lens holder 1011f is provided on the lower left side of the lens barrel 64 and the light source lens 1012f is attached to (supported by) the lens holder 1011f. The light source unit 1013f is provided behind the light source lens 1012f and the optical axis of the light source unit 1013f is aligned with the optical axis of the light source lens 1012f.

In FIG. 40, the lens holder 1011g is provided on the lower side of the lens barrel 64 and the light source lens 1012g is attached to (supported by) the lens holder 1011g. The light source unit 1013g is provided behind the light source lens 1012g and the optical axis of the light source unit 1013g is aligned with the optical axis of the light source lens 1012g.

In FIG. 40, the lens holder 1011h is provided on the lower right side of the lens barrel 64 and the light source lens 1012h is attached to (supported by) the lens holder 1011h. The light source unit 1013h is provided behind the light source lens 1012h and the optical axis of the light source unit 1013h is aligned with the optical axis of the light source lens 1012h.

Note that, in a case in which the light source units 1013a to 1013h do not need to be distinguished from each other, the light source units 1013a to 1013h are hereinafter simply referred to as light source units 1013.

Figure 41:
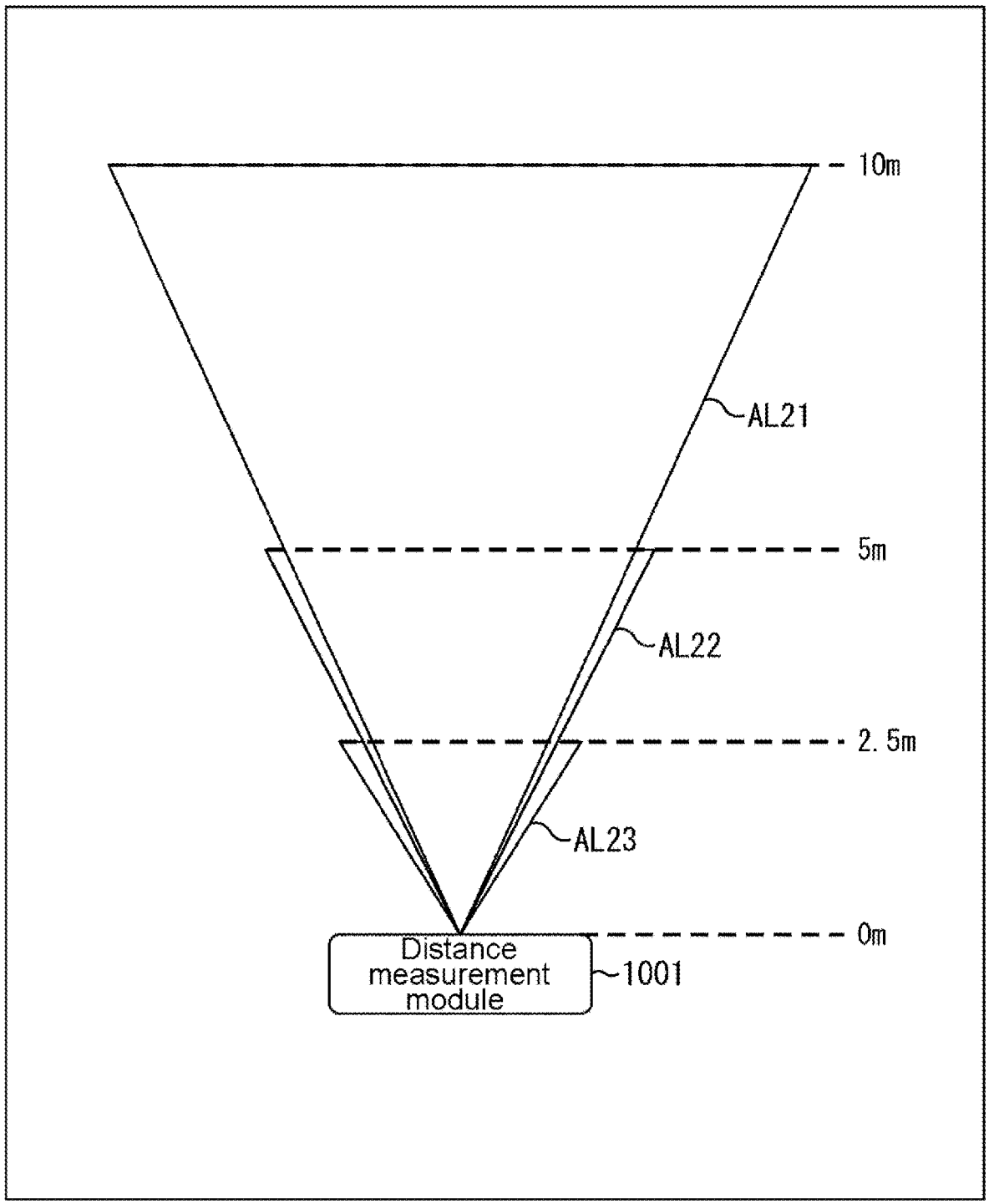
FIG. 41 is a diagram illustrating an example of an emission range of emitted light for measurement.

FIG. 41 illustrates the light emission range of each light source unit 1013 of the distance measurement module 1001 in the horizontal direction.

For example, the emission range of light (hereinafter, referred to as long-range light) emitted from the light source units 1013a to 1013c is an emission range AL21. For example, the long-range emitted light is used to measure the distance to the object that is 5 m to 10 m away from the distance measurement module 1001.

The emission range of light (hereinafter, referred to as intermediate-range light) emitted from the light source units 1013f to 1013h is an emission range AL22. For example, the intermediate-range emitted light is used to measure the distance to the object that is 2.5 m to 5 m away from the distance measurement module 1001.

The emission range of light (hereinafter, referred to as short-range light) emitted from the light source units 1013d and 1013e is an emission range AL23. For example, the short-range emitted light is used to measure the distance to the object that is 0 m to 2.5 m away from the distance measurement module 1001.

In this case, similarly to the example described with reference to FIG. 38, it is desirable that the amounts of light emitted from each light source unit 1013 are set such that the following relationship is satisfied: the amount of long-range emitted light> the amount of intermediate-range emitted light> the amount of short-range emitted light.

For example, the amount of light emitted from each of the light source units 1013a to 1013c for emitting long-range light is set to be more than the amount of light emitted from each of the light source units 1013f to 1013h for emitting intermediate-range light.

In contrast, the number of light source units 1013 for emitting short-range light is less than the number of light source units 1013 for emitting intermediate-range light. Therefore, for example, the amount of light emitted from each of the light source units 1013d and 1013e for emitting short-range light may be set to be equal to or less than the amount of light emitted from each of the light source units 1013f to 1013h for emitting intermediate-range light.

As such, the amount of light emitted from each light source unit or the number of light source units to be used is adjusted to control the emission range of the emitted light.

8. Sixth Embodiment

Next, a sixth embodiment of the present technology will be described with reference to FIGS. 42 and 43.
<Example of Configuration of Distance Measurement Module 1101>

Figure 42:
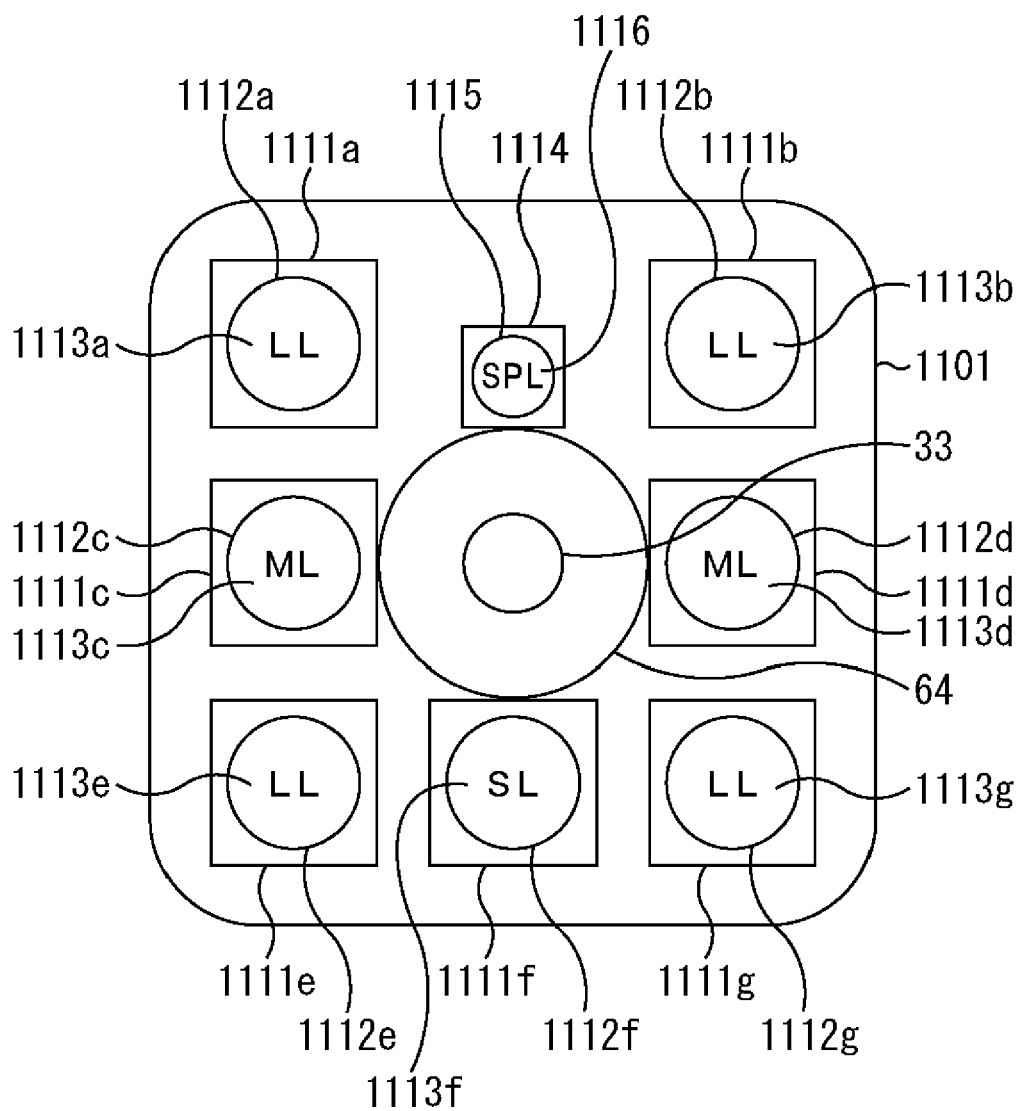
FIG. 42 is a cross-sectional view schematically illustrating an example of the configuration of a distance measurement module according to a sixth embodiment of the present technology.

FIG. 42 is a plan view schematically illustrating the imaging side of a distance measurement module 1101 according to a sixth embodiment of the present technology. Note that, in FIG. 42, portions corresponding to those of the distance measurement module 901 illustrated in FIG. 37 are denoted by the same reference numerals and the description thereof will be appropriately omitted.

The distance measurement module 1101 differs from the distance measurement module 901 in the number and arrangement of light source units for measurement light.

Specifically, in the distance measurement module 1101, eight light source units for measurement light, that is, light source units 1113a to 1113g (not illustrated) and a light source unit 1116 (not illustrated) are arranged around the lens barrel 64 in a square shape. The light source units 1113*a* to 1113*g* and the light source unit 1116 have the same configuration as, for example, the light source unit 522 illustrated in FIG. 28. However, for example, in the light source units 1113*a* to 1113*g*, an LED with a wide emission angle is used as a light emitting element. In the light source unit 1116, an LD that has a narrow emission angle and high directionality is used as a light emitting element.

In addition, lens holders 1111*a* to 1111*g* and light source lenses 1112*a* to 1112*g* are provided so as to correspond to the light source units 1113*a* to 1113*g*, respectively. Further, a lens holder 1114 and a light source lens 1115 are provided so as to correspond to the light source unit 1116.

In FIG. 42, the lens holder 1111*a* is provided on the upper left side of the lens barrel 64 and the light source lens 1112*a* is attached to (supported by) the lens holder 1111*a*. The light source unit 1113*a* is provided behind the light source lens 1112*a* and the optical axis of the light source unit 1113*a* is aligned with the optical axis of the light source lens 1112*a*.

In FIG. 42, the lens holder 1111*b* is provided on the upper right side of the lens barrel 64 and the light source lens 1112*b* is attached to (supported by) the lens holder 1111*b*. The light source unit 1113*b* is provided behind the light source lens 1112*b* and the optical axis of the light source unit 1113*b* is aligned with the optical axis of the light source lens 1112*b*.

In FIG. 42, the lens holder 1111*c* is provided on the left side of the lens barrel 64 and the light source lens 1112*c* is attached to (supported by) the lens holder 1111*c*. The light source unit 1113*c* is provided behind the light source lens 1112*c* and the optical axis of the light source unit 1113*c* is aligned with the optical axis of the light source lens 1112*c*.

In FIG. 42, the lens holder 1111*d* is provided on the right side of the lens barrel 64 and the light source lens 1112*d* is attached to (supported by) the lens holder 1111*d*. The light source unit 1113*d* is provided behind the light source lens 1112*d* and the optical axis of the light source unit 1113*d* is aligned with the optical axis of the light source lens 1112*d*.

In FIG. 42, the lens holder 1111*e* is provided on the lower left side of the lens barrel 64 and the light source lens 1112*e* is attached to (supported by) the lens holder 1111*e*. The light source unit 1113*e* is provided behind the light source lens 1112*e* and the optical axis of the light source unit 1113*e* is aligned with the optical axis of the light source lens 1112*e*.

In FIG. 42, the lens holder 1111*f* is provided on the lower side of the lens barrel 64 and the light source lens 1112*f* is attached to (supported by) the lens holder 1111*f*. The light source unit 1113*f* is provided behind the light source lens 1112*f* and the optical axis of the light source unit 1113*f* is aligned with the optical axis of the light source lens 1112*f*.

In FIG. 42, the lens holder 1111*g* is provided on the lower right side of the lens barrel 64 and the light source lens 1112*g* is attached to (supported by) the lens holder 1111*g*. The light source unit 1113*g* is provided behind the light source lens 1112*g* and the optical axis of the light source unit 1113*g* is aligned with the optical axis of the light source lens 1112*g*.

In FIG. 42, the lens holder 1114 is provided on the upper side of the lens barrel 64 and the light source lens 1115 is attached to (supported by) the lens holder 1114. The center position of the light source lens 1115 is closer to the lens barrel 64 than the center positions of the other light source lenses 1112*a* to 1112*g*. For example, the light source unit 1116 is provided behind the light source lens 1115 and the optical axis of the light source unit 1116 is aligned with the optical axis of the light source lens 1115.

Note that, in a case in which the light source units 1113*a* to 1113*g* do not need to be distinguished from each other, the light source units 1113*a* to 1113*g* are hereinafter simply referred to as light source units 1113.

Figure 43:
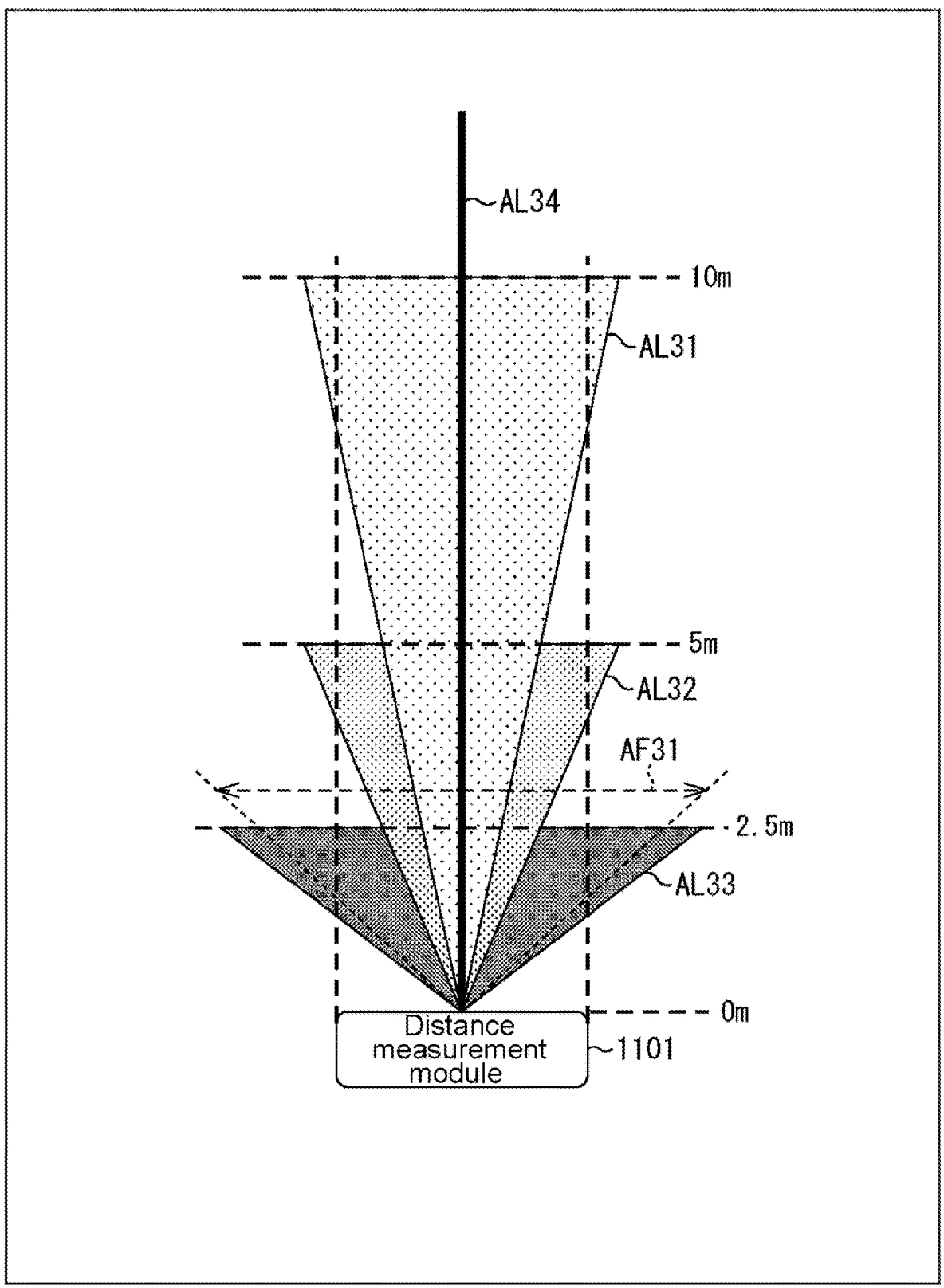
FIG. 43 is a diagram illustrating an example of an emission range of emitted light for measurement.

FIG. 43 illustrates the light emission ranges of each light source unit 1113 and the light source unit 1116 of the distance measurement module 1101 in the horizontal direction.

Here, the emission angles and emission distances of the light emitted from the light source units 1113 are different from each other. Specifically, the emission angles of the light from each light source unit 1113 satisfy the following relationship: the light emission angle of the light source unit 1113*a*=the light emission angle of the light source unit 1113*b*=the light emission angle of the light source unit 1113*e*=the light emission angle of the light source unit 1113*g*< the light emission angle of the light source unit 1113*c*=the light emission angle of the light source unit 1113*d*< the light emission angle of the light source unit 1113*f*. In contrast, the emission distances of the light from each light source unit 1113 satisfy the following relationship: the light emission distance of the light source unit 1113*a*=the light emission distance of the light source unit 1113*b*=the light emission distance of the light source unit 1113*e*=the light emission distance of the light source unit 1113*g*> the light emission distance of the light source unit 1113*c*=the light emission distance of the light source unit 1113*d*> the light emission distance of the light source unit 1113*f*.

For example, the emission range of the light (hereinafter, referred to as long-range light) emitted from the light source unit 1113*a*, the light source unit 1113*b*, the light source unit 1113*e*, and the light source unit 1113*g* is an emission range AL31. The long-range emitted light is used to measure the distance to the object that is 5 m to 10 m away from the distance measurement module 1101.

The emission range of the light (hereinafter, referred to as intermediate-range light) emitted from the light source unit 1113*c* and the light source unit 1113*d* is an emission range AL32. For example, the intermediate-range emitted light is used to measure the distance to the object that is 2.5 m to 5 m away from the distance measurement module 1101.

The emission range of the light (hereinafter, referred to as short-range light) emitted from the light source unit 1113*f* is an emission range AL33. For example, the short-range emitted light is used to measure the distance to the object that is 0 m to 2.5 m away from the distance measurement module 1101.

The light (hereinafter, referred to as ultra-long-range light) emitted from the light source unit 1116 is spot light with high directionality and is emitted in a substantially linear emission range AL34. The ultra-long-range emitted light is used to measure the distance to the object that is 10 m or more away from the distance measurement module 1101.

Here, the emission angles of each emitted light component satisfy the following relationship: the emission angle of the ultra-long-range emitted light< the emission angle of the long-range emitted light< the emission angle of the intermediate-range emitted light< the emission angle of the short-range emitted light. Therefore, the lengths of each emission range in the width direction satisfy the following relationship: the length of the emission range AL34< the length of the emission range AL31< the length of the emission range AL32< the length of the emission range AL33.

In contrast, in a case in which all of the light source units 1113 emit the same amount of light, the amounts of light emitted from each light source unit satisfy the following relationship according to the number of light source units corresponding to each emitted light component: the amount of long-range emitted light> the amount of intermediate-range emitted light> the amount of short-range emitted light. Therefore, in a case in which the reflectance of the object is the same, the amount of long-range measurement light corresponding to the long-range emitted light, the amount of intermediate-range measurement light corresponding to the intermediate-range emitted light, and the amount of short-range measurement light corresponding to the short-range emitted light in the light receiving unit 43 of the distance measurement module 1101 can be substantially equal to each other.

Note that, for example, the amount of ultra-long-range emitted light is set to be more than the amounts of other emitted light components.

With this configuration, since the emitted light components are differently used according to the purpose of use, it is possible to easily switch the width and distance of the distance measurement range.

For example, the distance measurement module 1101 may be mounted on a drone and the drone may be moved to a target position to transport baggage.

For example, in a case in which the distance to the target position is greater than 10 m, the drone is automatically operated or remotely operated while measuring the distance with the ultra-long-range emitted light.

In contrast, in a case in which the distance to the target position is equal to or less than 10 m, for example, the drone measures the distance with the long-range emitted light in order to avoid collision or contact with the surrounding objects or to accurately measure the distance to the target position.

In a case in which the distance to the target position is equal to or less than 5 m, for example, the drone measures the distance with the intermediate-range emitted light in order to monitor a wider range in the horizontal direction.

In a case in which the distance to the target position is equal to or less than 2.5 m, for example, the drone measures the distance with the short-range emitted light in order to reliably and rapidly search for a flat place where the drone can land.

As described above, since the light source units 1113*a* to 1113*g* and the light source unit 1116 having different emission ranges in the width direction and the distance direction are used, it is possible to easily extend the distance measurement range in the width direction and the distance direction. In addition, the type or number of light source units for measurement light can be increased to further extend the distance measurement range in the width direction and the distance direction.

Note that, for example, each type of emitted light may be used at the same time or may be differently used according to the purpose of use. Since each type of emitted light is differently used according to the purpose of use, it is possible to prevent an increase in power consumption or to reduce the amount of heat generated from the distance measurement module 1101.

9. Seventh Embodiment

Next, a seventh embodiment of the present technology will be described with reference to FIGS. 44 and 45.
<Example of Configuration of Distance Measurement Module 1201>

Figure 44:
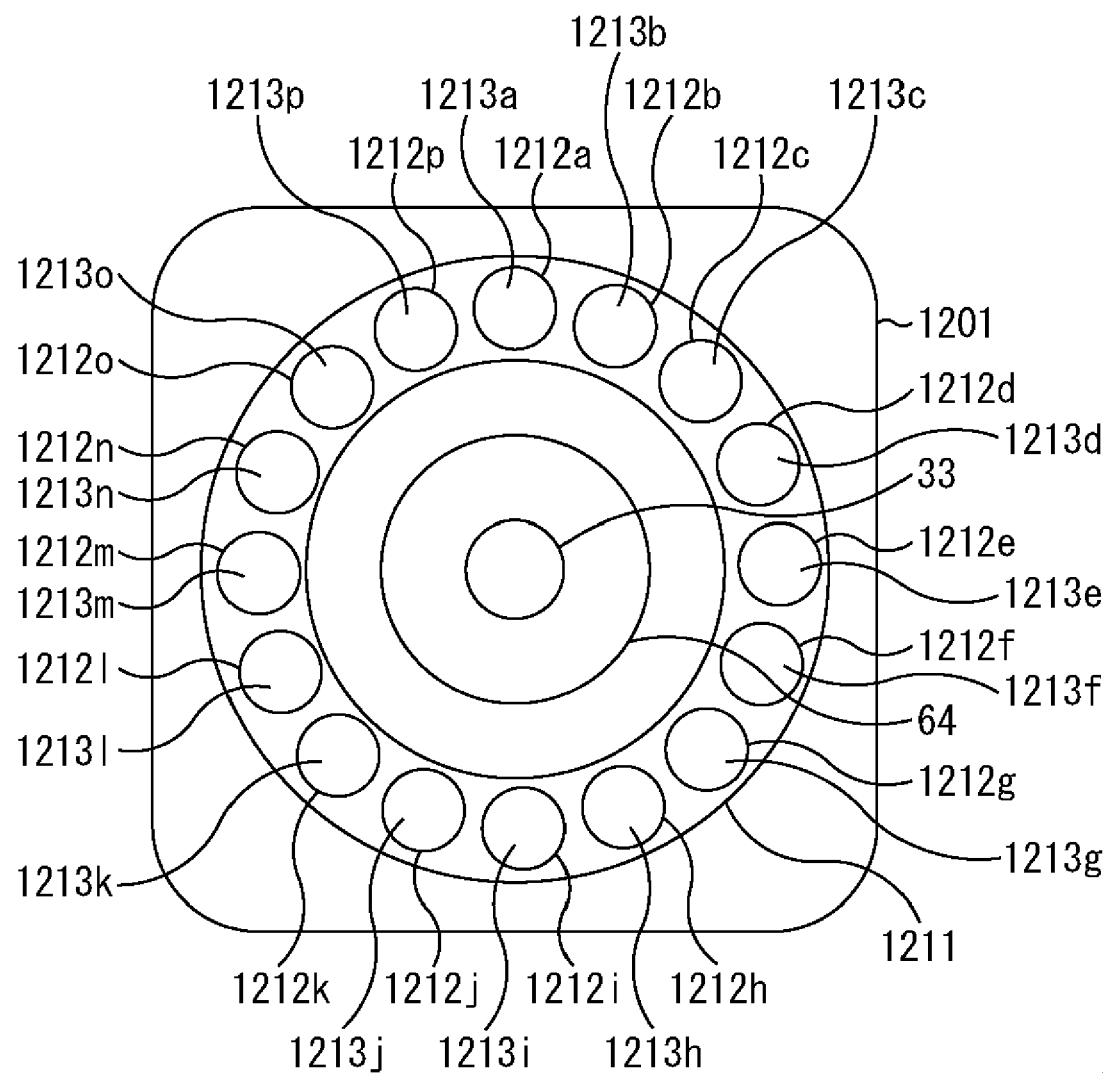
FIG. 44 is a cross-sectional view schematically illustrating an example of the configuration of a distance measurement module according to a seventh embodiment of the present technology.

FIG. 44 is a plan view schematically illustrating the imaging side of a distance measurement module 1201 according to the seventh embodiment of the present technology. Note that, in FIG. 44, portions corresponding to those of the distance measurement module 901 illustrated in FIG. 37 are denoted by the same reference numerals and the description thereof will be appropriately omitted.

The distance measurement module 1201 differs from the distance measurement module 901 in the number and arrangement of light source units for measurement light.

Specifically, in the distance measurement module 1201, 16 light source units for measurement light, that is, light source units 1213*a* to 1213*p* (not illustrated) are arranged around the lens barrel 64 in a circular shape. The light source units 1213*a* to 1213*p* have the same configuration as, for example, the light source unit 522 illustrated in FIG. 28.

In addition, light source lenses 1212*a* to 1212*p* are provided so as to correspond to the light source units 1213*a* to 1213*p*, respectively.

A lens holder 1211 surrounds the lens barrel 64 in a circular shape. The light source lenses 1212*a* to 1212*p* are arranged at regular intervals in the lens holder 1211 and surround the lens barrel 64. The light source units 1213*a* to 1213*p* are provided behind the light source lenses 1212*a* to 1212*p*, respectively, and the optical axes of the light source units 1213*a* to 1213*p* are aligned with the optical axes of the light source lenses 1212*a* to 1212*p*, respectively.

Note that, in a case in which the light source units 1213*a* to 1213*p* do not need to be distinguished from each other, the light source units 1213*a* to 1213*p* are hereinafter simply referred to as light source units 1213.

The emission angles and emission distances of the emission ranges of the light components emitted from the light source units 1213 are substantially equal to each other.

Therefore, the distance measurement module 1201 adjusts the distance of the distance measurement range according to the number of light source units 1213 to be used.

Figure 45:
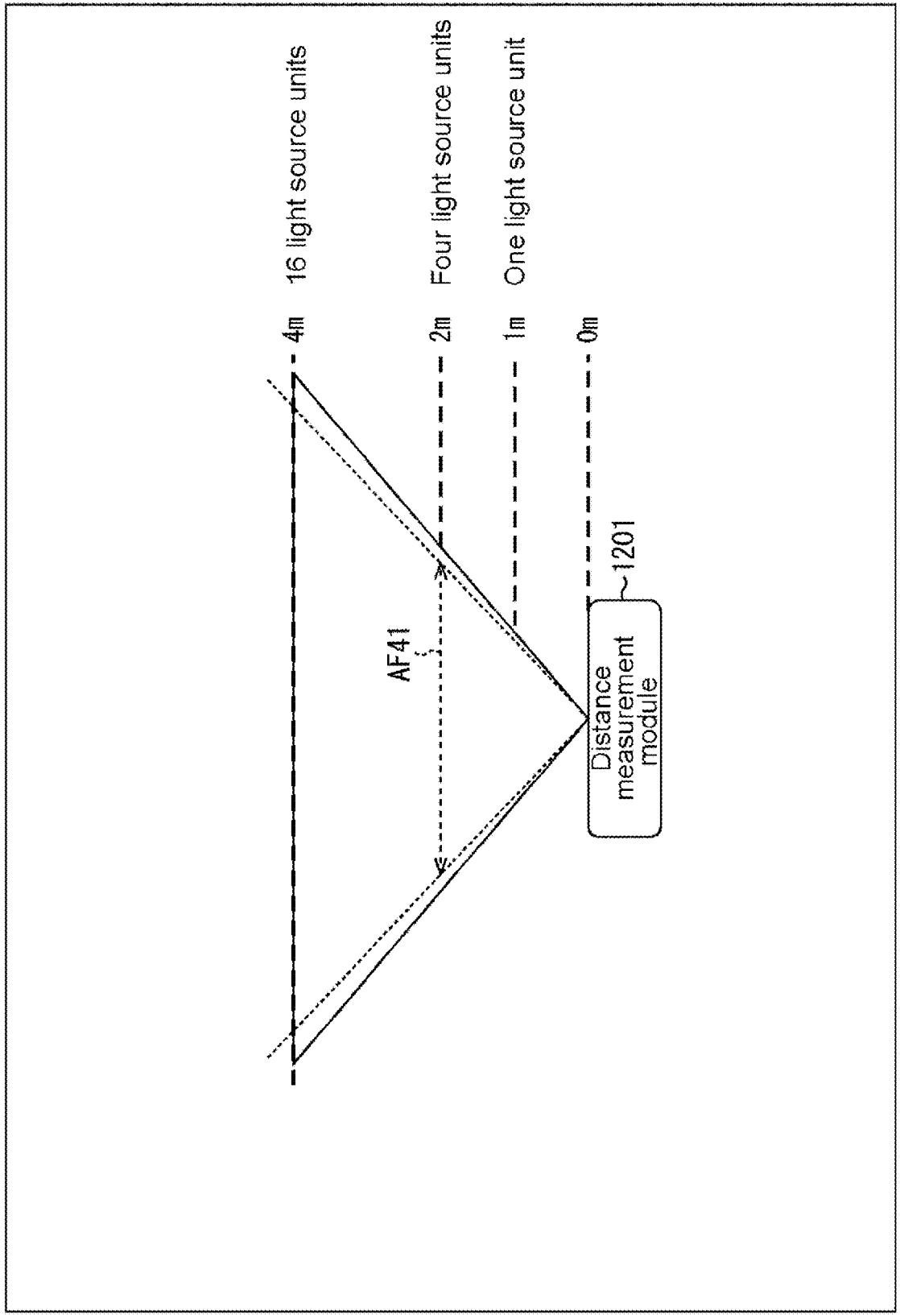
FIG. 45 is a diagram illustrating an example of an emission range of emitted light for measurement.

FIG. 45 illustrates an example of the emission range of light for measurement emitted from the distance measurement module 1201 in the horizontal direction.

For example, in a case in which one light source unit 1213 emits the light for measurement, the light for measurement is sufficiently emitted in a range of 1 m from the distance measurement module 1201. Therefore, in this case, the distance measurement range is set in the range of 1 m from the distance measurement module 1201.

For example, in a case in which four light source units 1213 emit the light for measurement, the light for measurement is sufficiently emitted in a range of 2 m from the distance measurement module 1201. Therefore, in this case, the distance measurement range is set in the range of 2 m from the distance measurement module 1201.

For example, in a case in which 16 light source units 1213 emit the light for measurement, the light for measurement is sufficiently emitted in a range of 4 m from the distance measurement module 1201. Therefore, in this case, the distance measurement range is set in the range of 4 m from the distance measurement module 1201.

As such, the number of light source units 1213 to be used is switched by one unit to easily and appropriately set the distance of the distance measurement range.

Note that, for example, 16 light source units 1213 may be used at the same time and the amounts of light emitted from 16 light source units 1213 may be changed at the same time to obtain appropriate measurement light.

10. Other Modification Examples

Hereinafter, modification examples other than the above will be described.

The above-described embodiments may be appropriately combined with each other.

For example, the embodiment illustrated in FIGS. 16 to 18 may be combined with the second to seventh embodiments.

In addition, for example, in the embodiments illustrated in FIG. 37, FIG. 40, FIG. 42, and FIG. 44, the light source unit for reference light may be omitted and one or more light components emitted from a plurality of light source units for measurement light may be used to generate the reference light as in the embodiment illustrated in FIG. 2.

In addition, for example, no anti-reflection films may be provided on the cover glass. Alternatively, for example, an anti-reflection film may be provided on the incident surface or the reflecting surface of the cover glass.

Further, for example, a vertical cavity surface emitting LASER (VCSEL) may be used as the LD for a light source element in the light source unit. In addition, for example, an array light source in which a plurality of VCSELs are one-dimensionally or two-dimensionally arranged may be used.

Furthermore, for example, the light source unit 522a illustrated in FIG. 30 may not perform two-dimensional scanning with the emitted light, but may perform scanning with the emitted light only in the one-dimensional direction.

In addition, for example, in a case in which the result of distance measurement is displayed, distance information may be displayed as three-dimensional data or distance information may be displayed so as to be superimposed on a color or monochrome image. In the latter case, the color or monochrome image may be captured by, for example, the same distance measurement module or different cameras.

Furthermore, for example, a transparent member other than glass or plastic may be used as the cover glass. However, it is desirable to use a member which is less deformed by heat, is strong, and has high durability.

In addition, for example, the pixels P may be one-dimensionally arranged in the light receiving unit 43 or only one pixel P may be provided in the light receiving unit 43.

Note that the embodiments of the present technology are not limited to the above-described embodiments and various modifications and changes of the embodiments can be made without departing from the scope and spirit of the present technology.

Further, for example, the present technology may have the following configurations.

According to some aspects, an electronic apparatus for detecting distances from the electronic apparatus to external objects is provided, the apparatus comprising a substrate, a light receiving sensor arranged over the substrate, one or more light sources arranged over the substrate, a first lens arranged over a first light source of the one or more light sources and arranged to direct light emitted by the first light source, a second lens arranged over the light receiving sensor and configured to direct light received by the second lens onto the light receiving sensor, and a transparent member arranged between the second lens and the light receiving sensor and configured to transmit the light directed by the second lens onto the light receiving sensor, and reflect light from at least one of the one or more light sources onto the light receiving sensor.

According to some embodiments, the light receiving sensor and/or the one or more light sources are arranged directly on the substrate.

According to some embodiments, the first lens is arranged to output said light emitted by the first light source from the electronic apparatus.

According to some embodiments, the electronic apparatus further comprises an anti-reflection film disposed on an incident surface of the transparent member, the incident surface being a surface of the transparent member onto which the light directed by the second lens is incident.

According to some embodiments, the electronic apparatus further comprises a reflective portion disposed on a reflection surface of the transparent member, the reflection surface opposing a surface of the transparent member onto which the light directed by the second lens is incident.

According to some embodiments, the one or more light sources, the light receiving sensor, the first lens, the second lens and the transparent member are part of a distance measurement module of the electronic apparatus.

According to some embodiments, the light directed by the second lens onto the light receiving sensor and the light reflected onto the light receiving sensor by the transparent member are both incident on the same surface of the light receiving sensor.

According to some embodiments, the one or more light sources comprise at least one vertical cavity surface emitting laser (VCSEL).

According to some embodiments, the transparent member is arranged directly above the at least one of the one or more light sources and directly above the light receiving sensor.

According to some embodiments, the light reflected onto the light receiving sensor by the transparent member is emitted by the first light source.

According to some embodiments, the transparent member is arranged between the first light source and the first lens and transmits the light emitted by the first light source to the first lens.

According to some embodiments, the one or more light sources further comprise a second light source, and the light reflected onto the light receiving sensor by the transparent member is emitted by the second light source.

According to some embodiments, the electronic apparatus further comprises an opaque structure arranged between the first light source and the second light source.

According to some embodiments, the first light source, the second light source, and the light receiving sensor are arranged directly on the substrate.

According to some aspects, an electronic apparatus for detecting distances from the electronic apparatus to external objects is provided, the apparatus comprising a substrate, a light receiving sensor arranged over the substrate, one or more light sources arranged over the substrate, the one or more light sources including a first light source and a second light source, a first lens holder, the first lens holder being opaque and comprising a first lens, the first lens holder arranged over the first light source, and the first lens arranged to direct light emitted by the first light source, a second lens holder, the second lens holder being opaque and comprising a second lens, the second lens holder arranged over the light receiving sensor and the second light source, and the second lens configured to direct light received by the second lens onto the light receiving sensor, and a transparent member arranged between the second lens and the light receiving sensor and configured to transmit the light directed by the second lens onto the light receiving sensor, and reflect light from at the second light source onto the light receiving sensor, wherein at least part of the first lens holder and at least part of the second lens holder are arranged between the first lens and the second lens.

According to some embodiments, the light receiving sensor and the one or more light sources are arranged directly on the substrate.

According to some embodiments, the substrate is a first substrate, the electronic apparatus further comprises a second substrate and a third substrate arranged over the first substrate, the light receiving sensor and the second light source are arranged over the second substrate, and the first light source is arranged over the third substrate.

According to some embodiments, a gap is arranged between the first and second lens holders.

According to some embodiments, the one or more first light sources and/or the one or more second light sources comprise at least one vertical cavity surface emitting laser (VCSEL).

According to some embodiments, the electronic apparatus further comprises an anti-reflection film disposed on an incident surface of the transparent member, the incident surface being a surface of the transparent member onto which the light directed by the second lens is incident.

According to some embodiments, the electronic apparatus further comprises a reflective portion disposed on a reflection surface of the transparent member, the reflection surface opposing a surface of the transparent member onto which the light directed by the second lens is incident.

According to some embodiments, the transparent member is arranged directly above the at least one of the one or more light sources and directly above the light receiving sensor.

According to some embodiments, the electronic apparatus further comprises an anti-reflection film arranged over the substrate between the first and second lens holders.

According to some embodiments, anti-reflection film is arranged directly on the substrate.

According to some embodiments, the electronic apparatus further comprises a light shielding wall arranged between the first and second lens holders.

According to some embodiments, the electronic apparatus further comprises a light shielding cushion member arranged in contact with the light shielding wall and in contact with the substrate.

(1)
A distance measurement module, including:
a first light source unit;
a light receiving unit including at least one pixel; and
a transparent member that covers the first light source unit and the light receiving unit with a gap therebetween on a side where first light is emitted from the first light source unit,
the at least one pixel being configured to receive reference light which is reflected light obtained by reflection of the first light from the transparent member and measurement light which is reflected light from an object as a measurement target.

(2)
The distance measurement module according to (1), in which
the transparent member includes one transparent plate.

(3)
The distance measurement module according to (2), further including
a substrate on which the first light source unit and the light receiving unit are mounted,
in which
the transparent plate faces a mounting surface of the substrate, the first light source unit and the light receiving unit being mounted on the mounting surface, and is provided in parallel to the mounting surface of the substrate.

(4)
The distance measurement module according to (3), further including:
a light source lens that is a lens for the first light source unit; and
an anti-reflection film that is provided around the first light source unit on the mounting surface of the substrate.

(5)
The distance measurement module according to any one of (2) to (4), in which the transparent plate includes a cover glass.

(6)
The distance measurement module according to any one of (1) to (5), further including
a reflective portion that is provided on the transparent member between the first light source unit and the light receiving unit.

(7)
The distance measurement module according to (6), further including
an anti-reflection film that is provided in a portion of the transparent member other than the reflective portion.

(8)
The distance measurement module according to (6), in which
a surface of the transparent member is unevenly processed in the reflective portion.

(9)
The distance measurement module according to (6), in which
the reflective portion includes a reflective film.

(10)
The distance measurement module according to any one of (1) to (9), further including:
a light source lens that is a lens for the first light source unit; and
an imaging lens that is a lens for the light receiving unit, in which
the transparent member is provided between the first light source unit and the light receiving unit, and the light source lens and the imaging lens.

(11)
The distance measurement module according to any one of (1) to (10), further including
a second light source unit,
in which
the measurement light is reflected light obtained by reflection of second light emitted from the second light source unit from the object.

(12)
The distance measurement module according to (11), further including
an imaging lens that is a lens for the light receiving unit, in which
the transparent member is provided between the imaging lens, and the first light source unit and the light receiving unit.

(13)
The distance measurement module according to (12) further including:
a light source lens that is a lens for the second light source unit; and
a first lens holder that supports the light source lens and shields and separates the first light source unit and the light receiving unit from the second light source unit.

(14)
The distance measurement module according to (13), further including:
a second lens holder that supports the imaging lens; and
a substrate on which the first light source unit, the second light source unit, the light receiving unit, the first lens holder, and the second lens holder are mounted.

(15)
The distance measurement module according to (14), further including
an anti-reflection film that is provided on a mounting surface of the substrate between the first lens holder and the second lens holder.

(16)
The distance measurement module according to (14), further including
a light shielding wall that is provided between the first lens holder and the second lens holder.

(17)
The distance measurement module according to any one of (1) to (10), in which
the measurement light is reflected light obtained by reflection of the first light from the object.

(18)
The distance measurement module according to any one of (1) to (17), in which
the light receiving unit includes a plurality of pixels, and
each of the pixels receives the reference light and the measurement light.

(19)
The distance measurement module according to any one of (1) to (18), further including
a time measurement unit that measures a distance measurement time which is a time from reception of the reference light by the at least one pixel to reception of the measurement light by the at least one pixel.

(20)
The distance measurement module according to (19), in which
the pixel outputs a pixel signal based on an integrated value of charge, and
the time measurement unit measures the distance measurement time on a basis of an amount of change in the pixel signal.

(21)
The distance measurement module according to (20), in which
the time measurement unit measures the distance measurement time on a basis of a differential signal of the pixel signal.

(22)
A distance measurement module, including:
a light source unit;
a light receiving unit including a plurality of pixels;
a transparent plate that covers the light source unit and the light receiving unit with a gap therebetween on a side where light is emitted from the light source unit; and
a time measurement unit that measures a distance measurement time for each pixel, the distance measurement time being a time from reception of reference light that is reflected light obtained by reflection of the emitted light from the transparent plate by each of the pixels to reception of measurement light that is reflected light from an object as a measurement target by each of the pixels.

(23)
A distance measurement method for a distance measurement device including a light source unit, a light receiving unit including at least one pixel, and a transparent member that covers the light source unit and the light receiving unit with a gap therebetween on a side where light is emitted from the light source unit, the method including
measuring a distance measurement time, which is a time from reception of reference light that is reflected light obtained by reflection of the emitted light from the transparent plate by the at least one pixel to reception of measurement light that is reflected light from an object as a measurement target by the at least one pixel.

(24)
An electronic apparatus, including:
a distance measurement module; and
a control unit that performs a process based on a measurement result of the distance measurement module,
the distance measurement module including:
a light source unit,
a light receiving unit including at least one pixel, and
a transparent member that covers the light source unit and the light receiving unit with a gap therebetween on a side where light is emitted from the light source unit,
the at least one pixel being configured to receive reference light which is reflected light obtained by reflection of the emitted light from the transparent member and measurement light which is reflected light from an object as a measurement target.

Note that the effects described in the specification are illustrative and are not limited to the above and other effects may be obtained.

It should be understood by those skilled in the art that various modifications, combinations, sub-combinations and alterations may occur depending on design requirements and other factors insofar as they are within the scope of the appended claims or the equivalents thereof.

REFERENCE SIGNS LIST

11 Electronic apparatus
12 Object
22 Control unit
23, 23a, 23b Distance measurement module
31 Light source unit
32 Light source lens
33 Imaging lens
34 Distance measurement sensor
42 Light source control circuit
43 Light receiving unit
44 Signal change detection circuit
45 Time measurement circuit
61 Substrate
62 Lens holder
63, 63a, 63b Cover glass
64 Lens barrel
151 Photoelectric conversion element
154 FD unit
301a, 301b Reflective portion
331 Anti-reflection film 332 Reflective film
351 Lens holder
353 Cover glass
354, 355 Reflective film
501 Electronic apparatus
511, 511a to 511c Distance measurement module
521, 522, 522a Light source unit
523 Distance measurement sensor
531 Light source control circuit
551 Substrate
552 Lens holder
553 Cover glass
701 to 703 Substrate
704, 705 Lens holder
706 Anti-reflection film
724 Light shielding wall
741 Light shielding cushion member
761 Distance measurement sensor
762 Light source unit
801 Distance measurement module
811 Substrate
812, 813 Light source unit
814, 815 Lens holder
816 Cover glass
817 Light source lens
901 Distance measurement module
911 Substrate
912a to 912c Light source unit
913a, 913b, 914 Lens holder
915a to 915c Light source lens
1001 Distance measurement module
1011a to 1011h Lens holder
1012a to 1012h Light source lens
1013a to 1013h Light source unit
1101 Distance measurement module
1111a to 1111g Lens holder
1112a to 1112g Light source lens
1113a to 1113g Light source unit
1114 Lens holder
1115 Light source lens
1116 Light source unit
1201 Distance measurement module
1211 Lens holder
1211a to 1211p Lens holder
1212a to 1212p Light source lens
1213a to 1213p Light source unit
P, Pa Pixel

The invention claimed is:

1. An electronic apparatus for detecting distances from the electronic apparatus to external objects, the apparatus comprising:
a substrate;
a light receiving sensor arranged over the substrate;
one or more light sources arranged over the substrate;
a first lens arranged over a first light source of the one or more light sources and arranged to direct light emitted by the first light source;
a second lens arranged over the light receiving sensor and configured to direct light received by the second lens onto the light receiving sensor;
a transparent member arranged between the second lens and the light receiving sensor and configured to:
transmit the light directed by the second lens onto the light receiving sensor; and
reflect light from at least one of the one or more light sources onto the light receiving sensor;
a signal change detection circuit coupled to the light receiving sensor and detecting a change in reception of the light reflected onto the light receiving sensor on the basis of a predetermined level;
at least one lens holder forming a seal of a space between a portion of the substrate and the transparent member, and shielding and separating the first light source from a second light source of the one or more light sources and the second lens and
a transparent cover glass attached to the at least one lens holder, facing a mounting surface of the substrate, and covering at least one of the one or more light sources.

2. The electronic apparatus of claim 1, wherein the light receiving sensor and/or the one or more light sources are arranged directly on the substrate.

3. The electronic apparatus of claim 1, wherein the first lens is arranged to output said light emitted by the first light source from the electronic apparatus.

4. The electronic apparatus of claim 1, further comprising an anti-reflection film disposed on an incident surface of the transparent member, the incident surface being a surface of the transparent member onto which the light directed by the second lens is incident.

5. The electronic apparatus of claim 1, further comprising a reflective portion disposed on a reflection surface of the transparent member, the reflection surface opposing a surface of the transparent member onto which the light directed by the second lens is incident.

6. The electronic apparatus of claim 1, wherein the one or more light sources, the light receiving sensor, the first lens, the second lens and the transparent member are part of a distance measurement module of the electronic apparatus.

7. The electronic apparatus of claim 1, wherein the light directed by the second lens onto the light receiving sensor and the light reflected onto the light receiving sensor by the transparent member are both incident on the same surface of the light receiving sensor.

8. The electronic apparatus of claim 1, wherein the one or more light sources comprise at least one vertical cavity surface emitting laser (VCSEL).

9. The electronic apparatus of claim 1, wherein the transparent member is arranged directly above the at least one of the one or more light sources and directly above the light receiving sensor.

10. The electronic apparatus of claim 1, wherein the light reflected onto the light receiving sensor by the transparent member is emitted by the first light source.

11. The electronic apparatus of claim 10, wherein the transparent member is arranged between the first light source and the first lens and transmits the light emitted by the first light source to the first lens.

12. The electronic apparatus of claim 1, wherein the one or more light sources further comprise a second light source, and wherein the light reflected onto the light receiving sensor by the transparent member is emitted by the second light source.

13. The electronic apparatus of claim 12, further comprising an opaque structure arranged between the first light source and the second light source.

14. The electronic apparatus of claim 12, wherein the first light source, the second light source, and the light receiving sensor are arranged directly on the substrate.

15. An electronic apparatus for detecting distances from the electronic apparatus to external objects, the apparatus comprising:
a substrate;
a light receiving sensor arranged over the substrate;

one or more light sources arranged over the substrate, the one or more light sources including a first light source and a second light source;

a first lens holder, the first lens holder being opaque and comprising a first lens, the first lens holder arranged over the first light source, and the first lens arranged to direct light emitted by the first light source;

a second lens holder, the second lens holder being opaque and comprising a second lens, the second lens holder arranged over the light receiving sensor and the second light source, and the second lens configured to direct light received by the second lens onto the light receiving sensor; and a transparent member arranged between the second lens and the light receiving sensor and configured to:

transmit the light directed by the second lens onto the light receiving sensor; and reflect light from at the second light source onto the light receiving sensor, a signal change detection circuit coupled to the light receiving sensor and detecting a change in reception of the light reflected onto the light receiving sensor on the basis of a predetermined level;

wherein at least part of the first lens holder and at least part of the second lens holder are arranged between the first lens and the second lens, wherein the second lens holder forms a seal of a space between a portion of the substrate and the transparent member, and wherein the first lens holder shields and separates the first light source from the second light source and the second lens and a transparent cover glass attached to the at least one lens holder, facing a mounting surface of the substrate, and covering at least one of the one or more light sources.

16. The electronic apparatus of claim 15, wherein the light receiving sensor and the one or more light sources are arranged directly on the substrate.

17. The electronic apparatus of claim 15,
wherein the substrate is a first substrate,
wherein the electronic apparatus further comprises a second substrate and a third substrate arranged over the first substrate,
wherein the light receiving sensor and the second light source are arranged over the second substrate, and
wherein the first light source is arranged over the third substrate.

18. The electronic apparatus of claim 15, wherein a gap is arranged between the first and second lens holders.

19. The electronic apparatus of claim 15, wherein the one or more first light sources and/or the one or more second light sources comprise at least one vertical cavity surface emitting laser (VCSEL).

20. The electronic apparatus of claim 15, further comprising an anti-reflection film disposed on an incident surface of the transparent member, the incident surface being a surface of the transparent member onto which the light directed by the second lens is incident.

21. The electronic apparatus of claim 20, further comprising a reflective portion disposed on a reflection surface of the transparent member, the reflection surface opposing a surface of the transparent member onto which the light directed by the second lens is incident.

22. The electronic apparatus of claim 15, wherein the transparent member is arranged directly above the at least one of the one or more light sources and directly above the light receiving sensor.

23. The electronic apparatus of claim 15, further comprising an anti-reflection film arranged over the substrate between the first and second lens holders.

24. The electronic apparatus of claim 23, wherein anti-reflection film is arranged directly on the substrate.

25. The electronic apparatus of claim 15, further comprising a light shielding wall arranged between the first and second lens holders.

26. The electronic apparatus of claim 25, further comprising a light shielding cushion member arranged in contact with the light shielding wall and in contact with the substrate.

* * * * *